US010254519B2

(12) United States Patent
Machida

(10) Patent No.: US 10,254,519 B2
(45) Date of Patent: Apr. 9, 2019

(54) VARIABLE-POWER OPTICAL SYSTEM, OPTICAL DEVICE, AND METHOD FOR MANUFACTURING VARIABLE-POWER OPTICAL SYSTEM

(71) Applicant: Nikon Corporation, Minato-ku, Tokyo (JP)

(72) Inventor: Kosuke Machida, Tokyo (JP)

(73) Assignee: Nikon Corporation, Tokyo (JP)

( * ) Notice: Subject to any disclaimer, the term of this patent is extended or adjusted under 35 U.S.C. 154(b) by 43 days.

(21) Appl. No.: 15/418,773

(22) Filed: Jan. 29, 2017

(65) Prior Publication Data

US 2017/0184828 A1 Jun. 29, 2017

Related U.S. Application Data

(63) Continuation of application No. PCT/JP2015/071581, filed on Jul. 30, 2015.

(30) Foreign Application Priority Data

| Jul. 30, 2014 | (JP) | 2014-154840 |
| Jul. 30, 2014 | (JP) | 2014-154841 |
| Jul. 30, 2014 | (JP) | 2014-154842 |

(51) Int. Cl.
*G02B 15/14* (2006.01)
*G02B 15/20* (2006.01)
(Continued)

(52) U.S. Cl.
CPC .............. *G02B 15/20* (2013.01); *G02B 15/14* (2013.01); *G02B 15/16* (2013.01); *G02B 15/173* (2013.01);
(Continued)

(58) Field of Classification Search
CPC .............. G02B 27/646; G02B 27/0025; G02B 15/177; G02B 15/20; G02B 13/009;
(Continued)

(56) References Cited

U.S. PATENT DOCUMENTS

| 5,000,549 A | 3/1991 | Yamazaki |
| 6,028,716 A | 2/2000 | Kato et al. |

(Continued)

FOREIGN PATENT DOCUMENTS

| JP | 07-151974 A | 6/1995 |
| JP | 08-050245 A | 2/1996 |

(Continued)

OTHER PUBLICATIONS

Extended European Search Report dated Feb. 22, 2018, in European Patent Application No. EP15826959.7.

(Continued)

*Primary Examiner* — Evelyn A Lester
(74) *Attorney, Agent, or Firm* — Shapiro, Gabor and Rosenberger, PLLC

(57) ABSTRACT

Composing, in order from an object side, a first lens group G1 having negative refractive power, a second lens group G2 having positive refractive power and at least one lens group G3; upon varying magnification, a distance between the first lens group G1 and the second lens group G2, a distance between the second lens group G2 and a lens group G3 at an image side of the second lens group G2 and adjacent thereto, being varied; and a given conditional expression being satisfied; thereby providing a variable magnification optical system having a superb optical performance upon focusing, an optical device and a method for manufacturing the variable magnification optical system.

61 Claims, 34 Drawing Sheets

(51) Int. Cl.
*G02B 15/16* (2006.01)
*G02B 15/173* (2006.01)
*H04N 5/225* (2006.01)
*G02B 13/18* (2006.01)
*G02B 5/00* (2006.01)
*G02B 15/177* (2006.01)
*G02B 27/00* (2006.01)
*G02B 13/00* (2006.01)
*G02B 15/15* (2006.01)
*G02B 13/04* (2006.01)
*G02B 27/64* (2006.01)
*G02B 15/167* (2006.01)

(52) U.S. Cl.
CPC ............. *H04N 5/225* (2013.01); *G02B 5/005* (2013.01); *G02B 13/009* (2013.01); *G02B 13/04* (2013.01); *G02B 13/18* (2013.01); *G02B 15/15* (2013.01); *G02B 15/167* (2013.01); *G02B 15/177* (2013.01); *G02B 27/0025* (2013.01); *G02B 27/646* (2013.01)

(58) Field of Classification Search
CPC ........ G02B 13/04; G02B 13/18; G02B 15/15; G02B 15/173; G02B 15/16; G02B 15/167; H04N 5/225
USPC ................ 359/557, 689, 716, 740, 753, 784
See application file for complete search history.

(56) References Cited

U.S. PATENT DOCUMENTS

| | | | |
|---|---|---|---|
| 6,236,517 | B1 | 5/2001 | Kato et al. |
| 2004/0070844 | A1 | 4/2004 | Sato |
| 2009/0244720 | A1* | 10/2009 | Yamaguchi .......... G02B 15/173 359/690 |
| 2013/0070114 | A1 | 3/2013 | Imaoka |
| 2013/0120640 | A1 | 5/2013 | Taki |

FOREIGN PATENT DOCUMENTS

| | | |
|---|---|---|
| JP | 2001-066501 A | 3/2001 |
| JP | 2003-161883 A | 6/2003 |
| JP | 2010-145831 A | 7/2010 |
| JP | 2013-068690 A | 4/2013 |
| JP | 2013-109013 A | 6/2013 |

OTHER PUBLICATIONS

English translation of International Preliminary Report on Patentability from International Patent Application No. PCT/JP2015/071581, dated Feb. 9, 2017.

* cited by examiner

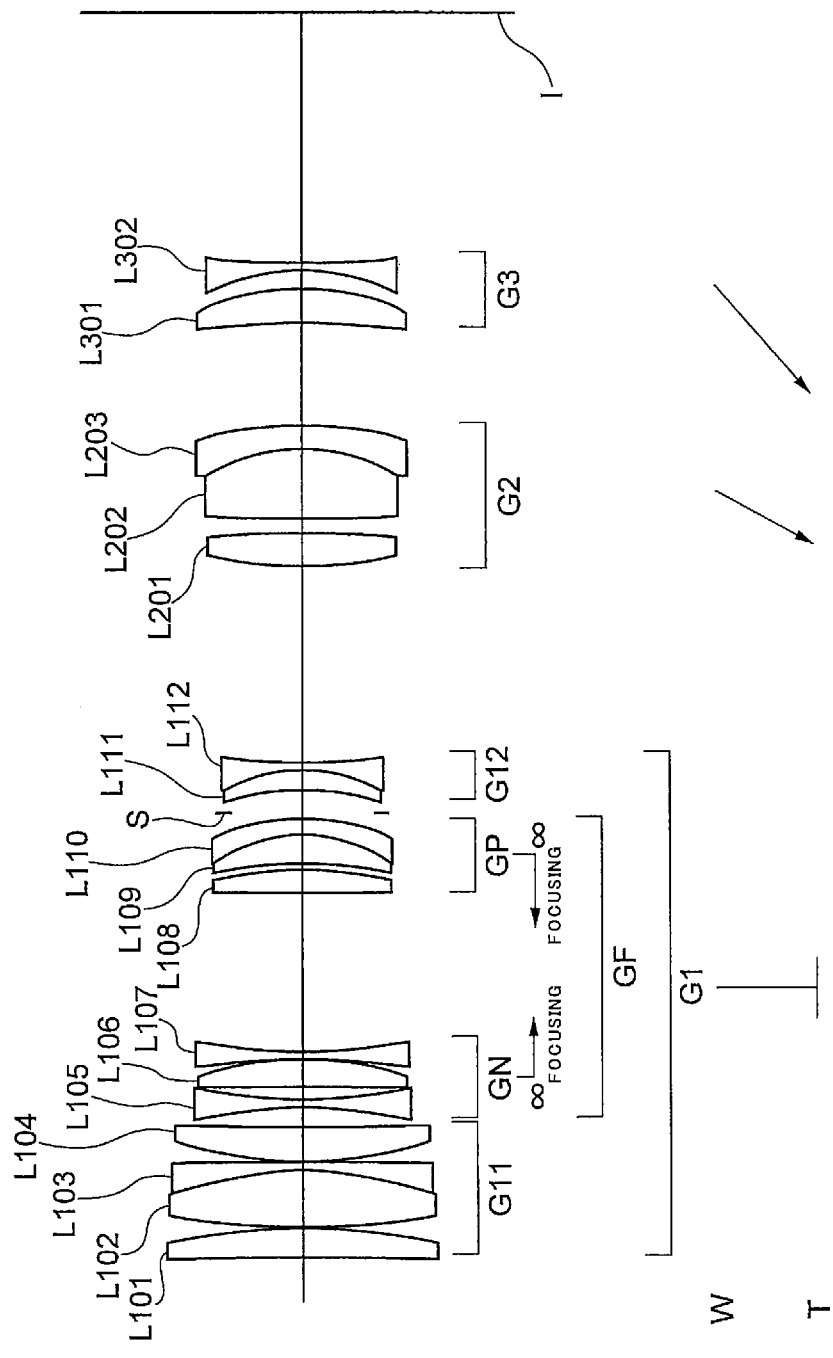

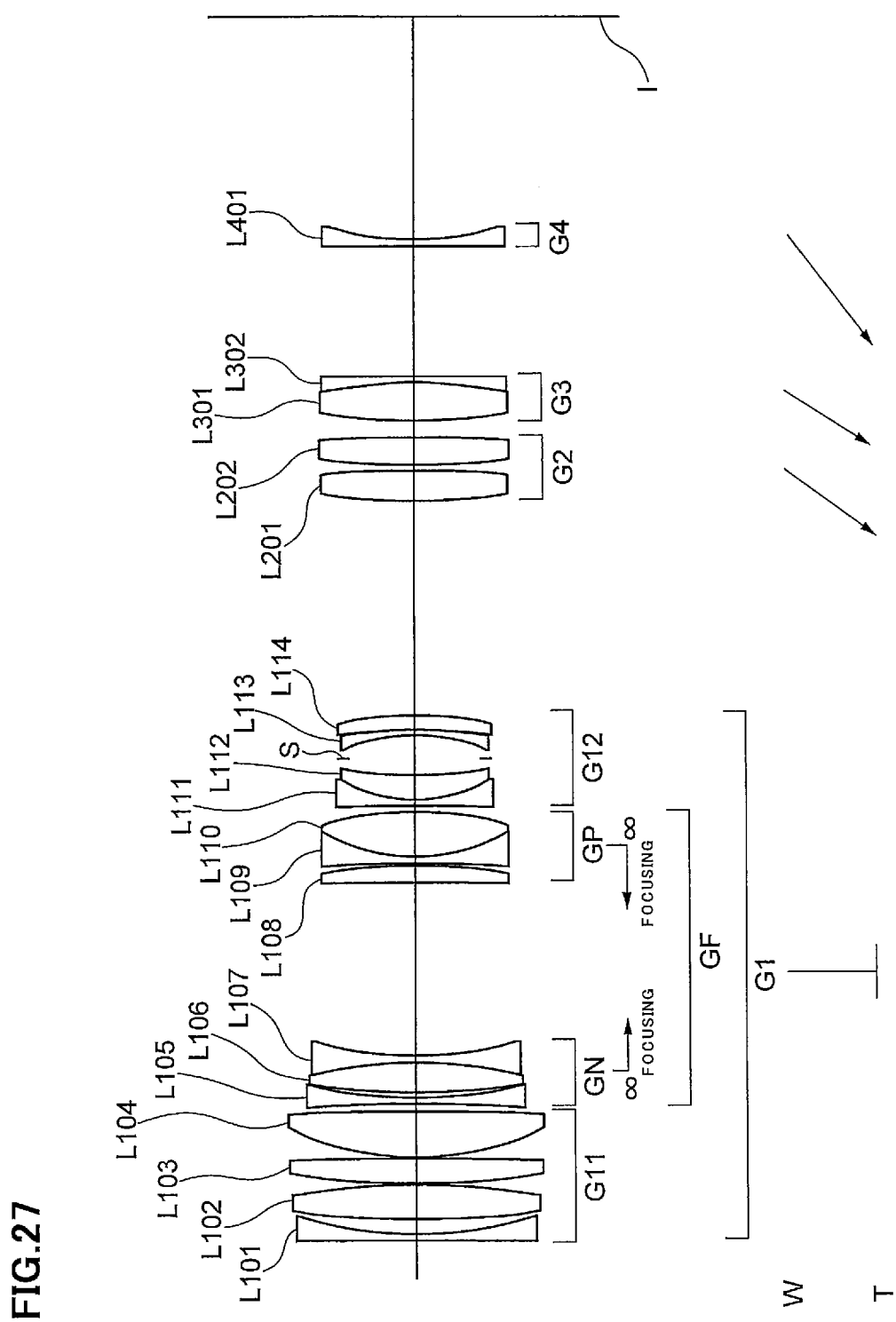

VARIABLE-POWER OPTICAL SYSTEM, OPTICAL DEVICE, AND METHOD FOR MANUFACTURING VARIABLE-POWER OPTICAL SYSTEM

TECHNICAL FIELD

The present inventions relate to a variable magnification optical system, an optical apparatus and a method for manufacturing the variable magnification optical system.

BACKGROUND ART

There have been proposed a variable magnification optical system suitable for a photographic camera, a digital still camera, a video camera or the like. For example, see Japanese Patent application Laid-Open No. 2013-109013.

PRIOR ART DOCUMENT

Patent Document

Patent Document 1: Japanese Patent application Laid-Open Gazette No. 2013-109013

SUMMARY OF THE INVENTION

Problem to be Solved by the Invention

However, the conventional variable magnification optical system as described above, has a problem that an optical performance upon focusing is insufficient.

The present invention was made in view of the above described problem and has an object to provide a variable magnification optical system having a superb optical performance upon focusing, an optical apparatus and a method for manufacturing the variable magnification optical system.

Means for Solving the Problem

According to a first aspect of the present application for solving the above mentioned problem, there is provided a variable magnification optical system comprising, in order from an object side, a first lens group having negative refractive power, a second lens group having positive refractive power and at least one lens group; upon varying magnification, an interval between the first lens group and the second lens group being varied, and an interval between the second lens group and a lens group at an image side of and adjacent to the second lens group being varied; said first lens group comprising, in order from the object side, a positive lens group having positive refractive power and a focusing lens group which is moved along the optical axis for focusing; and the following conditional expression being satisfied:

$$2.00 < (-f1)/f2 < 45.00$$

where f1 denotes a focal length of the first lens group, and f2 denotes a focal length of the second lens group.

According to a second aspect of the present application, there is provided a variable magnification optical system comprising, in order from an object side, a first lens group having negative refractive power, a second lens group having positive refractive power, and a third lens group having negative refractive power; upon varying magnification, an interval between the first lens group and the second lens group being varied, and an interval between the second lens group and the third lens group being varied; and said first lens group comprising, in order from the object side, a positive lens group having positive refractive power, and a focusing lens group which is moved along the optical axis for focusing.

According to a third aspect of the present application, there is provided a variable magnification optical system comprising, in order from an object side, a first lens group having negative refractive power and at least one lens group; upon varying magnification, an interval between the first lens group and a lens group at an image side of and adjacent to the first lens group being varied; said first lens group comprising a vibration reduction lens group that is movable to include a component in a direction perpendicular to the optical axis; and the following conditional expression being satisfied:

$$2.00 < |f1/fVR| < 50.00$$

where f1 denotes the focal length of the first lens group, and fVR denotes a focal length of said vibration reduction lens group.

According to the first to the third aspects of the present application, it is preferable that, upon varying magnification, position of the first lens group relative to an imaging plane is fixed.

According to the first to the third aspects of the present application, it is preferable that a most image side lens group has negative refractive power.

According to the first to the third aspects of the present application, it is preferable that the most image side lens group has negative refractive power, and the following conditional expression is satisfied:

$$0.20 < (-fR)/fW < 1.60$$

where fR denotes a focal length of the most image side lens group, and fW denotes a focal length of the variable magnification optical system upon focusing on an infinite distance object at a wide angle end state.

According to the first to the third aspects of the present application, it is preferable that the first lens group further comprises a focusing lens group that is movable for focusing and at least one lens group arranged at an image side of the focusing lens group.

According to the first to the third aspects of the present application, it is preferable that the following conditional expression is satisfied:

$$0.60 < |(1-\beta wvr) \cdot \beta wr| < 1.70$$

where ßwvr denotes a lateral magnification of the vibration reduction lens group at the wide angle end state, and ßwr denotes a composite lateral magnification of all lenses located at the image side of the vibration reduction lens group at the wide angle end state.

According to the first to the third aspects of the present application, it is preferable that said first lens group comprises, in order from the object side, a positive lens group having positive refractive power and a focusing lens group which is moved along the optical axis for focusing.

According to the first to the third aspects of the present application, it is preferable that said first lens group comprises, in order from the object side, a positive lens group having positive refractive power and a focusing lens group which is moved along the optical axis for focusing, and the following conditional expression is satisfied:

$$1.00 < (-f1)/f11 < 30.00$$

where f1 denotes the focal length of the first lens group, and f11 denotes a focal length of the positive lens group.

According to the first to the third aspects of the present application, it is preferable that the variable magnification optical system is provided with a first focusing group and a second focusing group, and that an interval between the first focusing group and the second focusing group is variable for focusing.

According to the first to the third aspects of the present application, it is preferable that the first lens group comprises a first focusing group and a second focusing group, and that an interval between the first focusing group and the second focusing group is variable for focusing.

According to the first to the third aspects of the present application, it is preferable that the variable magnification optical system comprises a first focusing group having negative refractive power and a second focusing group having positive refractive power; that an interval between the first focusing group and the second focusing group is variable for focusing; and that the following conditional expression is satisfied:

$$0.50 < (-fN)/fP < 1.80$$

where fN denotes a focal length of the first focusing group, and fP denotes a focal length of the second focusing group.

According to the first to the third aspects of the present application, it is preferable that the variable magnification optical system comprises the first lens group, a second lens group having positive refractive power and a third lens group having negative refractive power; and the following conditional expression is satisfied:

$$0.40 < f2/(-f3) < 1.20$$

where f2 denotes a focal length of the second lens group, and f3 denotes a focal length of the third lens group.

According to a fourth aspect of the present application, there is provided an optical apparatus equipped with the variable magnification optical system according to said first aspect of the present invention.

According to a fifth aspect of the present application, there is provided an optical apparatus equipped with the variable magnification optical system according to said second aspect of the present invention.

According to a sixth aspect of the present application, there is provided an optical apparatus equipped with the variable magnification optical system according to said third aspect of the present invention.

Further, according to a seventh aspect of the present application, there is provided a method for manufacturing a variable magnification optical system comprising, in order from an object side, a first lens group having negative refractive power, a second lens group having positive refractive power, and at least one lens group, the method comprising the steps of: constructing said first lens group to comprise, in order from the object side, a positive lens group having positive refractive power and a focusing lens group which is moved along the optical axis for focusing; constructing such that the variable magnification optical system satisfies the following conditional expression:

$$2.00 < (-f1)/f2 < 45.00$$

where f1 denotes a focal length of the first lens group, and f2 denotes a focal length of second lens group; and constructing such that an interval between the first lens group and the second lens group is varied and an interval between the second lens group and a lens group at the image side of and adjacent to the second lens group is varied.

Further, according to an eighth aspect of the present application, there is provided a method for manufacturing a variable magnification optical system comprising, in order from an object side, a first lens group having negative refractive power, a second lens group having positive refractive power, and a third lens group having negative refractive power, the method comprising the steps of: constructing such that said first lens group comprises, in order from the object side, a positive lens group having positive refractive power and a focusing lens group which is moved along the optical axis for focusing; and constructing such that, upon varying magnification, an interval between the first lens group and the second lens group is varied, and an interval between the second lens group and the third lens group is varied.

Further, according to a ninth aspect of the present application, there is provided a method for manufacturing a variable magnification optical system comprising, in order from an object side, a first lens group having negative refractive power and at least one lens group, the method comprising the steps of: constructing such that said first lens group comprises a vibration reduction lens group that is movable to include a component in a direction perpendicular to the optical axis; constructing such that the following conditional expression is satisfied:

$$2.00 < |f1/fVR| < 50.00$$

where f1 denotes the focal length of the first lens group, and fVR denotes a focal length of said vibration reduction lens group; and constructing such that, upon varying magnification, an interval between the first lens group and a lens group at an image side of and adjacent to the first lens group is varied.

Effect of the Invention

According to the first, the second, the fourth, the fifth, the seventh and the eighth aspects of the present invention, there can be provided a variable magnification optical system having a superb optical performance upon focusing, an optical apparatus and a method for manufacturing the variable magnification optical system.

According to the third, the sixth and the ninth aspects of the present invention, there can be provided a variable magnification optical system having a superb optical performance upon focusing and having a superb optical performance upon conducting vibration reduction, an optical apparatus and a method for manufacturing the variable magnification optical system.

BRIEF DESCRIPTION OF THE DRAWINGS

FIGS. 2A and 2B are graphs showing various aberrations upon focusing on an infinite distance object according to the First Example of the present application, in which FIG. 2A shows various aberrations in the wide-angle end state and FIG. 2B shows various aberrations in the telephoto end state.

FIGS. 3A and 3B are graphs showing coma aberrations at the time when vibration reduction is conducted upon focusing on an infinite distance object according to the First Example of the present application, in which FIG. 3A shows coma aberrations in the wide-angle end state and FIG. 3B shows coma aberrations in the telephoto end state.

FIGS. 4A and 4B are graphs showing various aberrations upon focusing on an intermediate distance object according to the First Example of the present application, in which FIG. 4A shows various aberrations in the wide-angle end state and FIG. 4B shows various aberrations in the telephoto end state.

FIGS. 5A and 5B are graphs showing various aberrations upon focusing on a close distance object according to the First Example of the present application, in which FIG. 5A shows various aberrations in the wide-angle end state and FIG. 5B shows various aberrations in the telephoto end state.

FIGS. 7A and 7B are graphs showing various aberrations upon focusing on an infinite distance object according to the Second Example of the present application, in which FIG. 7A shows various aberrations in the wide-angle end state and FIG. 7B shows various aberrations in the telephoto end state.

FIGS. 8A and 8B are graphs showing coma aberrations at the time when vibration reduction is conducted upon focusing on an infinite distance object according to the Second Example of the present application, in which FIG. 8A shows coma aberrations in the wide-angle end state and FIG. 8B shows coma aberrations in the telephoto end state.

FIGS. 9A and 9B are graphs showing various aberrations upon focusing on an intermediate distance object according to the Second Example of the present application, in which FIG. 9A shows various aberrations in the wide-angle end state and FIG. 9B shows various aberrations in the telephoto end state.

FIGS. 10A and 10B are graphs showing various aberrations upon focusing on a close distance object according to the Second Example of the present application, in which FIG. 10A shows various aberrations in the wide-angle end state and FIG. 10B shows various aberrations in the telephoto end state.

FIGS. 12A and 12B are graphs showing various aberrations upon focusing on an infinite distance object according to the Third Example of the present application, in which FIG. 12A shows various aberrations in the wide-angle end state and FIG. 12B shows various aberrations in the telephoto end state.

FIGS. 13A and 13B are graphs showing various aberrations upon focusing on an intermediate distance object according to the Third Example of the present application, in which FIG. 13A shows various aberrations in the wide-angle end state and FIG. 13B shows various aberrations in the telephoto end state.

FIGS. 14A and 14B are graphs showing various aberrations upon focusing on a close distance object according to the Third Example of the present application, in which FIG. 14A shows various aberrations in the wide-angle end state and FIG. 14B shows various aberrations in the telephoto end state.

FIG. 15 is a sectional view showing a configuration of a variable magnification optical system in the wide angle end state according to a Fourth Example that is common to the first and the second embodiments of the present application.

FIGS. 16A and 16B are graphs showing various aberrations upon focusing on an infinite distance object according to the Fourth Example of the present application, in which FIG. 16A shows various aberrations in the wide-angle end state and FIG. 16B shows various aberrations in the telephoto end state.

FIGS. 17A and 17B are graphs showing various aberrations upon focusing on an intermediate distance object according to the Fourth Example of the present application, in which FIG. 17A shows various aberrations in the wide-angle end state and FIG. 17B shows various aberrations in the telephoto end state.

FIGS. 18A and 18B are graphs showing various aberrations upon focusing on a close distance object according to the Fourth Example of the present application, in which FIG. 18A shows various aberrations in the wide-angle end state and FIG. 18B shows various aberrations in the telephoto end state.

FIGS. 20A and 20B are graphs showing various aberrations upon focusing on an infinite distance object according to the Fifth Example of the present application, in which FIG. 20A shows various aberrations in the wide-angle end state and FIG. 20B shows various aberrations in the telephoto end state.

FIGS. 21A and 21B are graphs showing various aberrations upon focusing on an intermediate distance object according to the Fifth Example of the present application, in which FIG. 21A shows various aberrations in the wide-angle end state and FIG. 21B shows various aberrations in the telephoto end state.

FIGS. 22A and 22B are graphs showing various aberrations upon focusing on a close distance object according to the Fifth Example of the present application, in which FIG. 22A shows various aberrations in the wide-angle end state and FIG. 22B shows various aberrations in the telephoto end state.

FIGS. 24A and 24B are graphs showing various aberrations upon focusing on an infinite distance object according to the Sixth Example of the present application, in which FIG. 24A shows various aberrations in the wide-angle end state and FIG. 24B shows various aberrations in the telephoto end state.

FIGS. 25A and 25B are graphs showing various aberrations upon focusing on an intermediate distance object according to the Sixth Example of the present application, in which FIG. 25A shows various aberrations in the wide-angle end state and FIG. 25B shows various aberrations in the telephoto end state.

FIGS. 26A and 26B are graphs showing various aberrations upon focusing on a close distance object according to the Sixth Example of the present application, in which FIG. 26A shows various aberrations in the wide-angle end state and FIG. 26B shows various aberrations in the telephoto end state.

FIG. 27 is a sectional view showing a configuration of a variable magnification optical system in the wide angle end state according to a Seventh Example of the first embodiment of the present application.

FIGS. 28A and 28B are graphs showing various aberrations upon focusing on an infinite distance object according to the Seventh Example of the present application, in which FIG. 28A shows various aberrations in the wide-angle end state and FIG. 28B shows various aberrations in the telephoto end state.

FIGS. 29A and 29B are graphs showing various aberrations upon focusing on an intermediate distance object according to the Seventh Example of the present application, in which FIG. 29A shows various aberrations in the wide-angle end state and FIG. 29B shows various aberrations in the telephoto end state.

FIGS. 30A and 30B are graphs showing various aberrations upon focusing on a close distance object according to the Seventh Example of the present application, in which FIG. 30A shows various aberrations in the wide-angle end state and FIG. 30B shows various aberrations in the telephoto end state.

EMBODIMENTS FOR CARRYING OUT THE INVENTION

Figure 1:
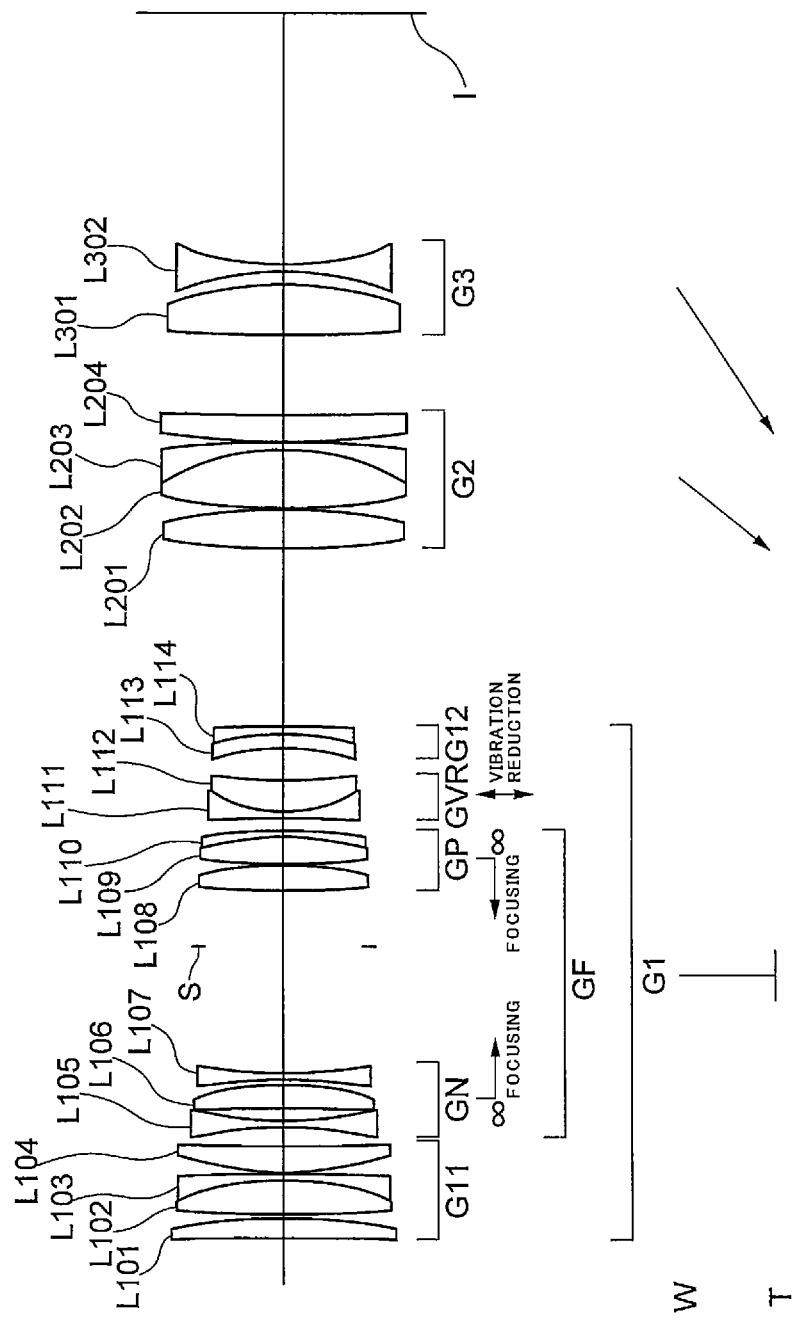
FIG. 1 is a sectional view showing a configuration of a variable magnification optical system in the wide angle end state according to a First Example that is common to a first to a third embodiments of the present application.

Hereinafter, a variable magnification optical system, an optical apparatus and a method for manufacturing the variable magnification optical system, according to the first embodiment of the present application are explained.

The variable magnification optical system according to the first embodiment of the present application comprises, in order from an object side, a first lens group having negative refractive power, a second lens group having positive refractive power and at least one lens group; upon varying magnification, an interval between the first lens group and the second lens group being varied, and an interval between the second lens group and a lens group at an image side of and adjacent to the second lens group being varied; said first lens group comprising, in order from the object side, a positive lens group having positive refractive power and a focusing lens group which is moved along the optical axis for focusing from an infinite distance object to a close distance object; and the following conditional expression (1-1) being satisfied:

$$2.00 < (-f1)/f2 < 45.00 \tag{1-1}$$

where f1 denotes a focal length of the first lens group, and f2 denotes a focal length of the second lens group.

As described above, in the variable magnification optical system according to the first embodiment of the present application, upon varying magnification from the wide angle end state to the telephoto end state, the interval between the first lens group and the second lens group being varied and the interval between the second lens group and the lens group at the image side of and adjacent to the second lens group being varied, thereby various aberrations being superbly corrected upon varying magnification. In particular, the variable magnification optical system according to the first embodiment of the present application reduce the interval between the first lens group and the second lens group upon varying magnification from the wide angle end state to the telephoto end state, thereby it being possible to secure a predetermined magnification varying ratio.

In the variable magnification optical system according to the first embodiment of the present application, said first lens group comprises a focusing lens group which is moved along the optical axis upon focusing from an infinitely distant object to a close distance object. With this configuration, it being possible to correct various aberrations superbly from upon focusing on an infinitely distance object to upon focusing on a close distance object.

The conditional expression (1-1) defines the focal length of the first lens group relative to the focal length of the focusing lens group. By satisfying the conditional expression (1-1), the variable magnification optical system according to the first embodiment of the present application can correct superbly various aberrations upon varying magnification from the wide angle end state to the telephoto end state.

When the value of (−f1)/f2 is equal to or exceeds the upper limit of the conditional expression (1-1) of the variable magnification optical system according to the first embodiment of the present application, refractive power of the second lens group becomes too large, and it becomes difficult to correct coma aberration at the wide angle end state. Meanwhile, in order to ensure the advantageous effect of the present embodiment, it is preferable to set the upper limit value of the conditional expression (1-1) to 40.00.

On the other hand, when the value of (−f1)/f2 is equal to or falls below the lower limit of the conditional expression (1-1) of the variable magnification optical system according to the first embodiment of the present application, refractive power of the first lens group becomes large, and it becomes difficult to correct spherical aberration and other various aberrations. Meanwhile, in order to ensure the advantageous effect of the present embodiment, it is preferable to set the lower limit value of the conditional expression (1-1) to 4.00.

By such a configuration as described above, it is possible to realize the variable magnification optical system having a high optical performance from upon focusing on an infinitely distance object to upon focusing on a close distance object.

In the variable magnification optical system according to the first embodiment of the present application, it is preferable that said focusing lens group comprises, in order from the object, a first focusing group having negative refractive power and a second focusing group having positive refractive power. With this configuration, it is possible to suppress variation in spherical aberration or the like upon focusing from an infinitely distance object to a close distance object.

Further, in the variable magnification optical system according to the first embodiment of the present application, it is preferable that the following conditional expression (1-2) is satisfied:

$$0.50 < (-fN)/fP < 1.80 \tag{1-2}$$

where fN denotes a focal length of the first focusing group, and fP denotes a focal length of the second focusing group.

The conditional expression (1-2) defines the focal length of the first focusing group relative to the focal length of the second focusing lens group in the focusing lens group. By satisfying the conditional expression (1-2), it is possible to correct superbly various aberrations upon varying magnification from the wide angle end state to the telephoto end state.

When the value of (−fN)/fP is equal to or exceeds the upper limit of the conditional expression (1-2) of the variable magnification optical system according to the first embodiment of the present application, refractive power of the second focusing group becomes too large, and negative spherical aberration is excessively generated in the focusing lens group, thereby variation in spherical aberration being increased upon focusing from an infinitely distance object to a close distance object. Meanwhile, in order to ensure the advantageous effect of the present embodiment, it is preferable to set the upper limit value of the conditional expression (1-2) to 1.60.

On the other hand, when the value of (−fN)/fP is equal to or falls below the lower limit of the conditional expression (1-2) of the variable magnification optical system according to the first embodiment of the present application, refractive power of the first focusing group becomes large, and negative spherical aberration is excessively generated in the focusing lens group, thereby variation in spherical aberration being increased upon focusing from an infinitely distance object to a close distance object. Meanwhile, in order to ensure the advantageous effect of the present embodiment, it is more preferable to set the lower limit value of the conditional expression (1-2) to 0.60.

In the variable magnification optical system according to the first embodiment of the present application, it is preferable that the lens located at the most object side has negative refractive power. With this configuration, it is possible to correct superbly curvature of field and coma aberration.

In the variable magnification optical system according to the first embodiment of the present application, it is preferable that the following conditional expression is satisfied:

$$0.20 < (-fR)/fW < 1.60 \quad (1\text{-}3)$$

where fR denotes a focal length of the most image side lens group, and fW denotes a focal length of the variable magnification optical system upon focusing on an infinite distance object at the wide angle end state.

The conditional expression (1-3) defines the focal length of the most image side lens group relative to the focal length of the variable magnification optical system upon focusing on an infinite distance object at the wide angle end state. By satisfying the conditional expression (1-3), it is possible to correct superbly various aberrations upon varying magnification from the wide angle end state to the telephoto end state.

When the value of (−fR)/fW is equal to or exceeds the upper limit of the conditional expression (1-3) of the variable magnification optical system according to the first embodiment of the present application, refractive power of the most image side lens group becomes small, and it becomes difficult to correct coma aberration at the wide angle end state. Meanwhile, in order to ensure the advantageous effect of the present embodiment, it is more preferable to set the upper limit value of the conditional expression (1-3) to 1.30.

On the other hand, when the value of (−fR)/fW is equal to or falls below the lower limit of the conditional expression (1-3) of the variable magnification optical system according to the first embodiment of the present application, refractive power of the most image side lens group becomes large, and coma aberration is generated excessively at the wide angle end state. Meanwhile, in order to ensure more surely the advantageous effect of the present embodiment, it is preferable to set the lower limit value of the conditional expression (1-3) to 0.30.

Further, in the variable magnification optical system according to the first embodiment of the present application, it is preferable that said first lens group comprises further a lens group at an image side of the focusing lens group. With this configuration, it is possible to suppress variation in spherical aberration or the like upon focusing from an infinitely distance object to a close distance object.

It is preferable that the variable magnification optical system according to the first embodiment of the present application comprises, in order from the object side, said first lens group, said second lens group and a third lens group having negative refractive power, and the following conditional expression (1-4) is satisfied:

$$0.40 < f2/(-f3) < 1.20 \quad (1\text{-}4)$$

where f2 denotes a focal length of the second lens group, and f3 denotes a focal length of the third lens group.

The conditional expression (1-4) defines the focal length of the second lens group relative to the focal length of the third lens group. By satisfying the conditional expression (1-4), the variable magnification optical system according to the first embodiment of the present application can correct superbly various aberrations from the wide angle end state to the telephoto end state.

When the value of f2/(−f3) is equal to or exceeds the upper limit of the conditional expression (1-4) of the variable magnification optical system according to the first embodiment of the present application, refractive power of the third lens group becomes too large, and it becomes difficult to correct coma aberration at the wide angle end state. Meanwhile, in order to ensure the advantageous effect of the present embodiment mere surely, it is preferable to set the upper limit value of the conditional expression (1-4) to 1.00.

On the other hand, when the value of f2/(−f3) is equal to or falls below the lower limit of the conditional expression (1-4) of the variable magnification optical system according to the first embodiment of the present application, refractive power of the second lens group becomes large, and it becomes difficult to correct spherical aberration. Meanwhile, in order to ensure the advantageous effect of the present embodiment more surely, it is preferable to set the lower limit value of the conditional expression (1-4) to 0.50.

In the variable magnification optical system according to the first embodiment of the present application, it is preferable that said first lens group comprises a vibration reduction lens group that is movable to include a component in a direction perpendicular to the optical axis, thereby correction of image blur caused by a camera shake or vibration, in other words, vibration reduction, can be conducted, so in particular various aberration superbly corrected upon carrying out vibration reduction.

An optical apparatus of the present application is characterized in comprising the variable magnification optical system having the above described configuration. By such configuration, it is possible to realize an optical apparatus having a superb optical performance from upon focusing on an infinitely distance object to upon focusing on a close distance object.

In a method for manufacturing the variable magnification optical system according to the first embodiment of the present application, which comprises, in order from an object side, a first lens group having negative refractive power, a second lens group having positive refractive power and at least one lens group, the method comprising the steps of constructing the first lens group to comprise, in order from object side, a positive lens having positive refractive power and a focusing lens group that is moved along the optical axis upon focusing on the an infinite distance object to a close distance object; constructing such that the variable magnification optical system satisfies the following conditional expression (1-1) being satisfied:

$$2.00 < (-f1)/f2 < 45.00 \qquad (1\text{-}1)$$

where f1 denotes a focal length of the first lens group, and f2 denotes a focal length of the second lens group; and constructing such that, upon varying magnification, an interval between the first lens group and the second lens group is varied, and an interval between the second lens group and a lens group at an image side of and adjacent to the second lens group is varied.

Hereinafter, a variable magnification optical system, an optical apparatus and a method for manufacturing the variable magnification optical system, according to the second embodiment of the present application are explained.

The variable magnification optical system according to the second embodiment of the present application comprises, in order from an object side, a first lens group having negative refractive power, a second lens group having positive refractive power and a third lens group having negative refractive power; upon varying magnification from the wide angle end state to the telephoto end state, the position of the first lens group being fixed, an interval between the first lens group and the second lens group being varied, and an interval between the second lens group and the third lens group being varied; said first lens group comprising, in order from the object side, a positive lens group having positive refractive power and a focusing lens group which is moved along the optical axis for focusing on from an infinite distance object to a close distance object.

As described above, in the variable magnification optical system according to the second embodiment of the present application, upon varying magnification from the wide angle end state to the telephoto end state, the interval between the first lens group and the second lens group is varied and the interval between the second lens group and the third lens group is varied, thereby various aberrations being superbly corrected upon varying magnification. In particular, the variable magnification optical system according to the second embodiment of the present application can reduce the interval between the first lens group and the second lens group and the interval between the second lens group and the third lens group upon varying magnification from the wide angle end state to the telephoto end state, thereby it being possible to secure a predetermined magnification varying ratio.

Further, in the variable magnification optical system according to the second embodiment of the present application, the first lens group comprises a focusing lens group which is moved along the optical axis upon focusing on from an infinitely distant object to a close distance object. With this configuration, it is possible to correct various aberrations superbly from upon focusing on an infinitely distance object to upon focusing on a close distance object.

Due to the aforementioned configuration, a variable magnification optical system having a superb optical performance from upon focusing on an infinite distance object to focusing on a close distance object, can be realized.

In the variable magnification optical system according to the second embodiment of the present application, it is preferable that the following conditional expression (2-1) is satisfied:

$$1.00 < (-f1)/f11 < 30.00 \qquad (2\text{-}1)$$

where f1 denotes a focal length of the first lens group, and f11 denotes a focal length of the positive lens group.

The conditional expression (2-1) defines the focal length of the first lens group relative to the focal length of the positive lens group. By satisfying the conditional expression (2-1), the variable magnification optical system according to the second embodiment of the present application can correct superbly various aberrations upon varying magnification from focusing on an infinite distance object to upon focusing on a close distance object.

When the value of $(-f1)/f11$ is equal to or exceeds the upper limit of the conditional expression (1-1) of the variable magnification optical system according to the second embodiment of the present application, refractive power of the positive lens group in the first lens group becomes large, and spherical aberration is excessively generated. For this reason, it becomes necessary to correct the spherical aberration in the focusing lens group. Accordingly, negative spherical aberration is generated excessively in the focusing lens group, so variation in spherical aberration is increased upon focusing on from an infinite distance object to a close distance object. Meanwhile, in order to ensure the advantageous effect of the present embodiment more surely, it is preferable to set the upper limit value of the conditional expression (2-1) to 20.00.

On the other hand, when the value of $(-f1)/f11$ is equal to or falls below the lower limit of the conditional expression (2-1) of the variable magnification optical system according to the second embodiment of the present application, refractive power of the first lens group becomes large, and it becomes difficult to correct spherical aberration and other various aberrations. Meanwhile, in order to ensure the advantageous effect of the present embodiment more surely, it is preferable to set the lower limit value of the conditional expression (2-1) to 3.00.

In the variable magnification optical system according to the second embodiment of the present application, it is preferable that said focusing lens group comprises, in order from the object, a first focusing group having negative refractive power and a second focusing group having positive refractive power. With this configuration, it is possible to suppress variation in spherical aberration or the like upon focusing on from an infinitely distance object to a close distance object.

In the variable magnification optical system according to the second embodiment of the present application, it is preferable that the following conditional expression (2-2) is satisfied:

$$0.50 < (-fN)/fP < 1.80 \qquad (2\text{-}2)$$

where fN denotes a focal length of the first focusing group, and fP denotes a focal length of the second focusing group.

The conditional expression (2-2) defines the focal length of the first focusing lens group relative to the focal length of the second focusing group in the focusing lens group. By satisfying the conditional expression (2-2), the variable magnification optical system according to the second embodiment of the present application can correct superbly various aberrations from upon focusing on an infinitely distant object to upon focusing on a close distance object.

When the value of $(-fN)/fP$ is equal to or exceeds the upper limit of the conditional expression (2-2) of the variable magnification optical system according to the second embodiment of the present application, refractive power of the second focusing group becomes large, thereby negative spherical aberration being excessively generated in the focusing lens group. Accordingly, variation in spherical aberration is increased upon focusing on from an infinite distance object to a close distance object. Meanwhile, in order to ensure the advantageous effect of the present embodiment more surely, it is preferable to set the upper limit value of the conditional expression (2-2) to 1.60.

On the other hand, when the value of (−fN)/fP is equal to or falls below the lower limit of the conditional expression (2-2) of the variable magnification optical system according to the second embodiment of the present application, refractive power of the first focusing group becomes large, and negative spherical aberration is excessively generated in the focusing lens group. Accordingly, variation in spherical aberration is increased upon focusing on from an infinite distance object to a close distance object. Meanwhile, in order to ensure the advantageous effect of the present embodiment more surely, it is preferable to set the lower limit value of the conditional expression (2-2) to 0.60.

In the variable magnification optical system according to the second embodiment of the present application, it is preferable that the following conditional expression (2-3) is satisfied:

$$0.40 < f2/(-f3) < 1.20 \tag{2-3}$$

where f2 denotes a focal length of the second lens group, and f3 denotes a focal length of the third lens group.

The conditional expression (2-3) defines the focal length of the second lens group relative to the focal length of the third lens group. By satisfying the conditional expression (2-3), the variable magnification optical system according to the second embodiment of the present application can correct superbly various aberrations from the wide angle end state to the telephoto end state.

When the value of f2/(−f3) is equal to or exceeds the upper limit of the conditional expression (2-3) of the variable magnification optical system according to the second embodiment of the present application, refractive power of the third lens group becomes too large, and it becomes difficult to correct coma aberration at the wide angle end state. Meanwhile, in order to ensure the advantageous effect of the present embodiment mere surely, it is preferable to set the upper limit value of the conditional expression (2-3) to 1.00.

On the other hand, when the value of f2/(−f3) is equal to or falls below the lower limit of the conditional expression (2-3) of the variable magnification optical system according to the second embodiment of the present application, refractive power of the second lens group becomes large, and it becomes difficult to correct spherical aberration. Meanwhile, in order to ensure the advantageous effect of the present embodiment more surely, it is preferable to set the lower limit value of the conditional expression (2-3) to 0.50.

Meanwhile, in the variable magnification optical system according to the second embodiment of the present application, it is preferable that said first lens group comprises a vibration reduction lens group that is movable to include a component in a direction perpendicular to the optical axis, thereby correction of image blur caused by a camera shake or vibration, in other words, vibration reduction, can be conducted, so in particular various aberration superbly corrected upon carrying out vibration reduction.

An optical apparatus of the present application is characterized in comprising the variable magnification optical system having the above described configuration according to the second embodiment. By such configuration, it is possible to realize an optical apparatus having a superb optical performance from upon focusing on an infinitely distance object to upon focusing on a close distance object.

In a method for manufacturing the variable magnification optical system according to the second embodiment of the present application, which comprises, in order from an object side, a first lens group having negative refractive power, a second lens group having positive refractive power and a third lens group having negative refractive power, the method comprising the steps of constructing the first lens group to comprise, in order from object side, a positive lens group having positive refractive power and a focusing lens group that is moved along the optical axis upon focusing on from an infinite distance object to a close distance object; constructing such that, upon varying magnification from an wide angle end state to a telephoto end state, position of the first lens group is fixed, an interval between the first lens group and the second lens group is varied, and an interval between the second lens group and the third lens group is varied. With this configuration, it is possible to manufacture a variable magnification optical system having a superb optical performance from upon focusing on an infinite distance object to a close distance object.

Hereinafter, a variable magnification optical system, an optical apparatus and a method for manufacturing the variable magnification optical system, according to the third embodiment of the present application are explained.

The variable magnification optical system according to the third embodiment of the present application comprises, in order from an object side, a first lens group having negative refractive power and at least one lens group; upon varying magnification from a wide angle end state to a telephoto end state, an interval between the first lens group and a lens group at an image side of and adjacent to the first lens group being varied; said first lens group comprising a vibration reduction lens group which is moved to have a component in a direction perpendicular to the optical axis; and the following conditional expression (3-1) being satisfied:

$$2.00 < |f1/fVR| < 50.00 \tag{3-1}$$

where f1 denotes the focal length of the first lens group, and fVR denotes a focal length of said vibration reduction lens group.

In the variable magnification optical system according to the third embodiment of the present application as described above, upon varying magnification from the wide angle end state to the telephoto end state, the interval between the first lens group and the lens group at the image side of and adjacent to the first lens group is varied, thereby various aberrations can be corrected superbly upon varying magnification. In particular, in the variable magnification optical system according to the third embodiment of the present application, upon varying magnification from the wide angle end state to the telephoto end state, the interval between the first lens group and the lens group at the image side of and adjacent to the first lens group is reduced, so it is possible to secure a predetermined magnification ratio.

Further, in the variable magnification optical system according to the third embodiment of the present application, as described above, the first lens group comprises a vibration reduction lens group that is movable to include a component in a direction perpendicular to the optical axis, thereby correction of image blur caused by a camera shake or vibration, in other words, vibration reduction, can be conducted, so in particular various aberrations can be superbly corrected upon carrying out vibration reduction.

The conditional expression (3-1) defines the focal length of the first lens group relative to the focal length of the vibration reduction lens group. By satisfying the conditional expression (3-1), the variable magnification optical system according to the third embodiment of the present application can correct superbly various aberrations upon carrying out vibration reduction.

When the value of |f1/fVR| is equal to or exceeds the upper limit of the conditional expression (3-1) of the variable magnification optical system according to the third embodiment of the present application, refractive power of the vibration reduction lens group becomes large, and eccentric aberration is generated excessively upon carrying out vibration reduction so that it becomes difficult to correct the eccentric aberration. Meanwhile, in order to ensure the advantageous effect of the present embodiment more surely, it is preferable to set the upper limit value of the conditional expression (3-1) to 30.00.

On the other hand, when the value of |f1/fVR| is equal to or falls below the lower limit of the conditional expression (3-1) of the variable magnification optical system according to the third embodiment of the present application, refractive power of the first lens group becomes large, and it becomes difficult to correct spherical aberration and other various aberrations. Further, refractive power of the vibration reduction lens group becomes small, and amount of movement of the vibration reduction lens group becomes too large. For this reason, eccentric aberration is excessively generated and it becomes difficult to correct the eccentric aberration. Meanwhile, in order to ensure the advantageous effect of the present embodiment more surely, it is preferable to set the lower limit value of the conditional expression (3-1) to 4.00.

By such a configuration as described above, it is possible to realize the variable magnification optical system having a high optical performance from upon focusing on an infinitely distance object to upon focusing on a close distance object, and also having superb optical performance even upon conducting vibration reduction.

Further, in the variable magnification optical system according to the third embodiment of the present application, it is preferable that the following conditional expression (3-2) is satisfied:

$$0.60 < |(1-\beta wvr)\cdot\beta wr| < 1.70 \quad (3\text{-}2)$$

where ßwvr denotes a lateral magnification of the vibration reduction lens group at the wide angle end state, and ßwr denotes a composite lateral magnification of all lenses located at the image side of the vibration reduction lens group in the wide angle end state.

The conditional expression (3-2) defines a ratio of amount of movement of an image on an image plane relative to amount of movement of the vibration reduction lens group in the direction perpendicular to the optical axis. By satisfying the conditional expression (3-2), the variable magnification optical system according to the third embodiment of the present application can correct superbly various aberrations upon carrying out vibration reduction.

When the value of |(1−ßwvr)·ßwr| is equal to or exceeds the upper limit of the conditional expression (3-2) of the variable magnification optical system according to the third embodiment of the present application, refractive power of the vibration reduction lens group becomes large, and eccentric aberration is generated excessively upon carrying out vibration reduction. Meanwhile, in order to ensure the advantageous effect of the present embodiment more surely, it is preferable to set the upper limit value of the conditional expression (3-2) to 1.50.

On the other hand, when the value of |(1−ßwvr)·ßwr| is equal to or falls below the lower limit of the conditional expression (3-2) of the variable magnification optical system according to the third embodiment of the present application, amount of movement of the vibration reduction lens group required for vibration reduction becomes large. Therefore, eccentric coma is excessively generated and size of lens barrel becomes large. Meanwhile, in order to ensure the advantageous effect of the present embodiment more surely, it is preferable to set the lower limit value of the conditional expression (3-2) to 0.80.

Further, in the variable magnification optical system according to the third embodiment of the present application, it is preferable that the first lens group comprises, in order from the object, a positive lens group having positive refractive power and a focusing lens group that is moved along the optical axis upon focusing from an infinite distance object to a close distance object, thereby it is possible to correct superbly various aberrations from upon focusing on an infinite distance object to upon focusing on a close distance object.

Further, in the variable magnification optical system according to the third embodiment of the present application, it is preferable that the following conditional expression (3-3) is satisfied:

$$1.00 < (-f1)/f11 < 30.00 \quad (3\text{-}3)$$

where f1 denotes a focal length of the first lens group, and f1 denotes a focal length of the positive lens group.

The conditional expression (3-3) defines the focal length of the first lens group relative to the focal length of the positive lens group in the first lens group. By satisfying the conditional expression (3-3), the variable magnification optical system according to the third embodiment of the present application can correct superbly various aberrations upon varying magnification from upon focusing on an infinite distance object to upon focusing on a close distance object.

When the value of (−f1)/f11 is equal to or exceeds the upper limit of the conditional expression (3-3) of the variable magnification optical system according to the third embodiment of the present application, refractive power of the positive lens group in the first lens group becomes large, and spherical aberration is excessively generated. For this reason, it becomes necessary to correct the spherical aberration in the focusing lens group. Accordingly, negative spherical aberration is generated excessively in the focusing lens group, so variation in spherical aberration is increased upon focusing on from an infinite distance object to a close distance object. Meanwhile, in order to ensure the advantageous effect of the present embodiment more surely, it is preferable to set the upper limit value of the conditional expression (3-3) to 20.00.

On the other hand, when the value of (−f1)/f11 is equal to or falls below the lower limit of the conditional expression (3-3) of the variable magnification optical system according to the third embodiment of the present application, refractive power of the first lens group becomes large, and it becomes difficult to correct spherical aberration and other various aberrations. Meanwhile, in order to ensure the advantageous effect of the present embodiment more surely, it is preferable to set the lower limit value of the conditional expression (3-3) to 3.00.

In the variable magnification optical system according to the third embodiment of the present application, it is preferable that said focusing lens group comprises, in order from the object, a first focusing group having negative refractive power and a second focusing group having positive refractive power. With this configuration, it is possible to suppress variation in spherical aberration or the like upon focusing on from an infinitely distance object to a close distance object.

In the variable magnification optical system according to the third embodiment of the present application, it is preferable that the following conditional expression (3-4) is satisfied:

$$0.50 < (-fN)/fP < 1.80 \qquad (3-4)$$

where fN denotes a focal length of the first focusing group, and fP denotes a focal length of the second focusing group.

The conditional expression (3-4) defines the focal length of the first focusing group relative to the focal length of the second focusing group in the focusing lens group. By satisfying the conditional expression (3-4), the variable magnification optical system according to the third embodiment of the present application, can correct superbly various aberrations from upon focusing on an infinitely distant object to upon focusing on a close distance object.

When the value of (−fN)/fP is equal to or exceeds the upper limit of the conditional expression (3-4) of the variable magnification optical system according to the third embodiment of the present application, refractive power of the second focusing group becomes large, thereby negative spherical aberration being excessively generated in the focusing lens group. Accordingly, variation in spherical aberration is increased upon focusing on from an infinite distance object to a close distance object. Meanwhile, in order to ensure the advantageous effect of the present embodiment more surely, it is preferable to set the upper limit value of the conditional expression (3-4) to 1.60.

On the other hand, when the value of (−fN)/fP is equal to or falls below the lower limit of the conditional expression (3-4) of the variable magnification optical system according to the third embodiment of the present application, refractive power of the first focusing group becomes large, and negative spherical aberration is excessively generated in the focusing lens group. Accordingly, variation in spherical aberration is increased upon focusing on from an infinite distance object to a close distance object. Meanwhile, in order to ensure the advantageous effect of the present embodiment more surely, it is preferable to set the lower limit value of the conditional expression (3-4) to 0.60.

Further, it is preferable that the variable magnification optical system according to the third embodiment of the present application comprises, in order from the object side, the first lens group, a second lens group having positive refractive power and a third lens group having negative refractive power, and that the following conditional expression (3-5) is satisfied:

$$0.40 < f2/(-f3) < 1.20 \qquad (3-5)$$

where f2 denotes a focal length of the second lens group, and f3 denotes a focal length of the third lens group.

The conditional expression (3-5) defines the focal length of the second lens group relative to the focal length of the third lens group. By satisfying the conditional expression (3-5), the variable magnification optical system according to the third embodiment of the present application can correct superbly various aberrations from the wide angle end state to the telephoto end state.

When the value of f2/(−f3) is equal to or exceeds the upper limit of the conditional expression (3-5) of the variable magnification optical system according to the third embodiment of the present application, refractive power of the third lens group becomes large, and it becomes difficult to correct coma aberration at the wide angle end state. Meanwhile, in order to ensure the advantageous effect of the present embodiment more surely, it is preferable to set the upper limit value of the conditional expression (3-5) to 1.00.

On the other hand, when the value of f2/(−f3) is equal to or falls below the lower limit of the conditional expression (3-5) of the variable magnification optical system according to the third embodiment of the present application, refractive power of the second lens group becomes large, and it becomes difficult to correct spherical aberration. Meanwhile, in order to ensure the advantageous effect of the present embodiment more surely, it is preferable to set the lower limit value of the conditional expression (3-5) to 0.50.

An optical apparatus of the present application is characterized in comprising the variable magnification optical system having the above described configuration according to the third embodiment. By such configuration, it is possible to realize an optical apparatus having a superb optical performance from upon focusing on an infinitely distance object to upon focusing on a close distance object and also an superb optical performance upon conducting vibration reduction.

A method for manufacturing a variable magnification optical system according to the third embodiment of the present application, is a method for manufacturing a variable magnification optical system comprising, in order from an object side, a first lens group having negative refractive power and at least one lens group, the method being characterized in comprising the steps of constructing the first lens group to comprise a vibration reduction lens group that is movable to include a component in a direction perpendicular to the optical axis; constructing the variable magnification optical system to satisfy the following conditional expression (3-1):

$$2.00 < |f1/fVR| < 50.00 \qquad (3-1)$$

where f1 denotes the focal length of the first lens group, and fVR denotes a focal length of said vibration reduction lens group; and constructing such that, upon varying magnification from an wide angle end state to a telephoto end state, an interval between the first lens group and a lens group at an image side of and adjacent to the first lens group is varied. With this configuration, it is possible to manufacture a variable magnification optical system having a superb optical performance from upon focusing on an infinite distance object to a close distance object and also having a superb optical performance upon conducting vibration reduction.

Hereinafter, variable magnification optical systems relating to numerical examples according to the first to the third embodiments of the present application will be explained with reference to the accompanying drawings. Meanwhile, the First and Second Examples are common to all of the first to the third embodiments, the Third to Fifth Examples are common to the first and second embodiments, and the Sixth and Seventh Examples are examples of the first embodiment.

First Example

FIG. 1 is a sectional view showing a variable magnification optical system according to the First Example of the first to the third embodiments of the present application, in a wide-angle end state. Meanwhile, arrows shown in FIG. 1, and FIGS. 6, 11, 15, 19, 23 and 27 described later, show movement trajectories of respective lens groups upon varying magnification.

The variable magnification optical system according to the present Example, is composed of, in order from an object side, a first lens group G1 having negative refractive power, a second lens group G2 having positive refractive power and a third lens group G3 having negative refractive power.

The first lens group G1 consists of, in order from the object side, a first fixed lens group G11 having positive refractive power, a focusing lens group GF having positive refractive power, a vibration reduction lens group GVR having negative refractive power, and a second fixed lens group G12 having negative refractive power.

The first fixed lens group G11 consists of, in order from the object side, a plano-convex positive lens L101 having a convex surface facing the image side, a cemented negative lens constructed by a double convex positive lens L102 cemented with a negative meniscus lens L103 having a concave surface facing the object side, and a positive meniscus lens L104 having a convex surface facing the object side.

The focusing lens group GF consists of, in order from the object side, a first focusing group GN having negative refractive power, an aperture stop S and a second focusing group GP having positive refractive power.

The first focusing group GN consists of, in order from the object side, a double concaved negative lens L105, a positive meniscus lens L106 having a concave surface facing the object side, and a double concave negative lens L107.

The second focusing group GP consists of, in order from the object side, a double convex positive lens L108, and a cemented positive lens constructed by a double convex positive lens L109 cemented with a negative meniscus lens L110 having a concave surface facing the object side.

The vibration reduction lens group GVR consists of, in order from the object side, a cemented negative lens constructed by a double concave negative lens L111 cemented with a positive meniscus lens L112 having a convex surface facing the object side.

The second fixed lens group G12 consists of, in order from the object side, a cemented negative lens constructed by a positive meniscus lens L113 having a concave surface facing the object side cemented with a negative meniscus lens L114 having a concave surface facing the object side.

The second lens group G2 consists of, in order from the object side, a double convex positive lens L201, a cemented positive lens constructed by a double convex positive lens L202 cemented with a negative meniscus lens L203 having a concave surface facing the object side, and a positive meniscus lens L204 having a convex surface facing the object side.

The third lens group G3 consists of, in order from the object side, a double convex positive lens L301 and a double concave negative lens L302.

In the variable magnification optical systems of the present Example, as configured above, upon varying magnification from a wide angle end state to a telephoto end state, the second lens group G2 and the third lens group G3 are moved along the optical axis toward the object side such that an interval between the first lens group G1 and the second lens group G2 is decreased and an interval between the second lens group G2 and the third lens group G3 is decreased. At this time, position of the first lens group G1 is fixed.

Further, in the variable magnification optical systems of the present Example, focusing from an infinite distance object to a close distance object is conducted by moving the first focusing group GN along the optical axis toward the image side and by moving the second focusing group GP along the optical axis toward the object side.

Further, in the variable magnification optical systems of the present Example, vibration reduction is conducted by moving the vibration reduction lens group GVR in the first lens group G1 to have a component in a direction perpendicular to the optical axis.

In a lens having a focal length of f, a vibration reduction coefficient, which is a ratio of a moving amount of an image on the image plane I to that of the vibration reduction lens group upon conducting vibration reduction, of K, in order to correct rotational camera shake of an angle θ, the vibration reduction lens group may be moved by the amount of (f·tan θ)/K perpendicularly to the optical axis. Accordingly, in the variable magnification optical systems of the present Example, the vibration reduction coefficient is 1.28 in the wide angle end state, and the focal length is 110.6 (mm), so that the moving amount of the vibration reduction lens group GVR for correcting a rotational camera shake of 0.30 degrees is 0.45 (mm). Further, in the telephoto end state, the vibration reduction coefficient is 1.92, and the focal length is 166.4 (mm), so that the moving amount of the vibration reduction lens group GVR for correcting a rotational camera shake of 0.20 degrees is 0.30 (mm).

Various values associated with the variable magnification optical system according to the present Example are listed in Table 1.

In Table 1, f denotes a focal length, and BF denotes a back focal length (a distance between a most image side lens surface and the image plane I along the optical axis).

In [Surface Data], Surface number shows an order of an optical surface counted in order from the object side, r shows a radius of curvature, d shows a face to face distance (that is, an interval between the n-th surface (n is an integer) to the (n+1)-th surface), nd shows refractive index of the material at d-line (wavelength λ=587.6 nm), and νd shows Abbe number of the material at d-line (wavelength λ=587.6 nm). Further, Object surface denotes a surface of an object, Variable denotes a variable face to face distance, Stop S denotes an aperture stop S and Image Plane denotes the image plane I. Meanwhile, r=∞ denotes a plane surface. An aspherical surface is expressed by attaching "*" to the surface number, and value of paraxial radius of curvature is shown in the column showing the radius of curvature. Refractive index of the air nd=1.000000 is omitted.

In [Aspherical Data], with respect to an aspherical surface shown in [Surface Data], the shape thereof is exhibited by the following expression:

$$X=(h^2/r)/[1+\{1-\kappa(h/r)^2\}^{1/2}]+A4h^4+A6h^6+A8h^8+A10h^{10}$$

where h denotes a vertical height from the optical axis, X denotes a sag amount which is a distance along the optical axis from the tangent surface at the vertex of the aspherical surface to the aspherical surface at the vertical height h from the optical axis, κ denotes a conical coefficient, A4, A6, A8 and A10 denote aspherical coefficients, and r denotes a radius of curvature of a reference sphere (a paraxial radius of curvature). Meanwhile, "E-n" (n is an integer) denotes "×10$^{-n}$", for example, "1.23456E-07" denotes "1.23456×10$^{-7}$". Aspherical coefficient A2 of the second order is 0 and omitted.

In [Various Data], FNO denotes an f-number, 2ω denotes an angle of view in degrees, Ymax denotes the maximum image height, TL denotes a total lens length (a distance from the first surface to the image plane I), and do denotes a variable interval between the n-th surface and the (n+1)-th surface. Meanwhile, W denotes a wide-angle end state, T denotes a telephoto end state, INF denotes time upon focusing an infinite distance object, INT denotes time upon focusing on an intermediate distance object and CLO denotes time upon focusing on a close distance object.

In [Lens Group Data], a starting surface number and a focal length of each lens group are shown.

In [Values for Conditional Expressions], respective values with respect to conditional expressions are shown.

In the Table 1, "mm" is generally used for the unit of length such as the focal length, the radius of curvature and the others. However, since similar optical performance can be obtained by an optical system proportionally enlarged or reduced its dimension, the unit is not necessarily to be limited to "mm", and any other suitable unit can be used.

The explanation of reference symbols used in Table 1 is the same in the other Examples described hereinafter, so that duplicated explanations are omitted.

TABLE 1

First Example
[Surface Data]

| Surface number | r | d | nd | vd |
|---|---|---|---|---|
| Object surface | ∞ | | | |
| 1 | ∞ | 3.232 | 1.77250 | 49.62 |
| 2 | −117.2840 | 0.615 | | |
| 3 | 183.4691 | 5.431 | 1.60300 | 65.44 |
| 4 | −49.0947 | 1.000 | 1.84666 | 23.78 |
| 5 | −781.7692 | 0.200 | | |
| 6 | 53.0162 | 3.922 | 1.77250 | 49.62 |
| 7 | 241.4189 | Variable | | |
| 8 | −74.2911 | 1.000 | 1.60300 | 65.44 |
| 9 | 59.8555 | 1.791 | | |
| 10 | −2925.1885 | 3.681 | 1.84666 | 23.78 |
| 11 | −53.9778 | 0.754 | | |
| 12 | −111.1262 | 1.000 | 1.71999 | 50.27 |
| 13 | 63.0840 | Variable | | |
| 14 (Stop S) | ∞ | Variable | | |
| 15 | 139.6294 | 3.997 | 1.58913 | 61.22 |
| 16 | −57.1874 | 0.200 | | |
| 17 | 108.0583 | 4.171 | 1.60311 | 60.69 |
| 18 | −55.6665 | 1.000 | 1.85026 | 32.35 |
| 19 | −100.8644 | Variable | | |
| 20 | −301.4327 | 1.000 | 1.80400 | 46.60 |
| 21 | 20.9724 | 4.749 | 1.75520 | 27.57 |
| 22 | 66.4034 | 4.908 | | |
| 23 | −43.8660 | 2.280 | 1.84666 | 23.78 |
| 24 | −40.8133 | 1.000 | 1.80610 | 40.97 |
| 25 | −765.3278 | Variable | | |
| 26 | 102.9356 | 6.000 | 1.69680 | 55.52 |
| 27 | −102.5453 | 0.200 | | |
| 28 | 85.7151 | 9.000 | 1.60300 | 65.44 |
| 29 | −41.4295 | 1.000 | 1.84666 | 23.78 |
| 30 | −246.1076 | 0.200 | | |
| 31 | 119.0023 | 4.065 | 1.74950 | 35.25 |
| 32 | 468.9658 | Variable | | |
| 33 | 192.6932 | 7.780 | 1.84666 | 23.78 |
| 34 | −58.8364 | 1.817 | | |
| 35 | −52.9154 | 1.000 | 1.80100 | 34.92 |
| 36 | 40.5350 | BF | | |
| Image plane | ∞ | | | |

[Various Data]
Variable magnification ratio (zoom ratio) 1.50

| | W | T |
|---|---|---|
| f | 110.63 | 166.41 |
| FNO | 3.78 | 5.69 |
| 2ω | 22.54° | 14.58° |
| Ymax | 21.60 | 21.60 |
| TL | 189.54 | 189.54 |
| BF | 38.79 | 71.93 |

| | W INF | T INF | W INT | T INT | W CLO | T CLO |
|---|---|---|---|---|---|---|
| β | 0 | 0 | −0.332 | −0.500 | −0.665 | −1.000 |
| d0 | ∞ | ∞ | 371.288 | 371.288 | 210.221 | 210.221 |
| d7 | 3.000 | 3.000 | 9.698 | 9.698 | 16.557 | 16.557 |
| d13 | 20.266 | 20.266 | 13.568 | 13.568 | 6.709 | 6.709 |
| d14 | 8.658 | 8.658 | 5.710 | 5.710 | 2.692 | 2.692 |
| d19 | 2.003 | 2.003 | 4.950 | 4.950 | 7.968 | 7.968 |

TABLE 1-continued

| d25 | 27.546 | 3.958 | 27.546 | 3.958 | 27.546 | 3.958 |
|---|---|---|---|---|---|---|
| d32 | 12.291 | 2.741 | 12.291 | 2.741 | 12.291 | 2.741 |

[Lens Group data]

| Group | Starting surface | f |
|---|---|---|
| 1 | 1 | −311.530 |
| 2 | 26 | 45.056 |
| 3 | 33 | −68.896 |

[Values for Conditional Expressions]

| (1-1) | $(-f1)/f2 = 6.914$ |
|---|---|
| (1-2) | $(-fN)/fP = 1.123$ |
| (1-3) | $(-fR)/fw = 0.623$ |
| (1-4) | $f2/(-f3) = 0.654$ |
| (2-1) | $(-f1)/f11 = 5.347$ |
| (2-2) | $(-fN)/fP = 1.123$ |
| (2-3) | $f2/(-f3) = 0.654$ |
| (3-1) | $|f1/fVR| = 5.153$ |
| (3-2) | $|(1 - \beta wvr) \cdot \beta wr| = 1.279$ |
| (3-3) | $(-f1)/f11 = 5.347$ |
| (3-4) | $(-fN)/fP = 1.123$ |
| (3-5) | $f2/(-f3) = 0.654$ |

Figure 2A:
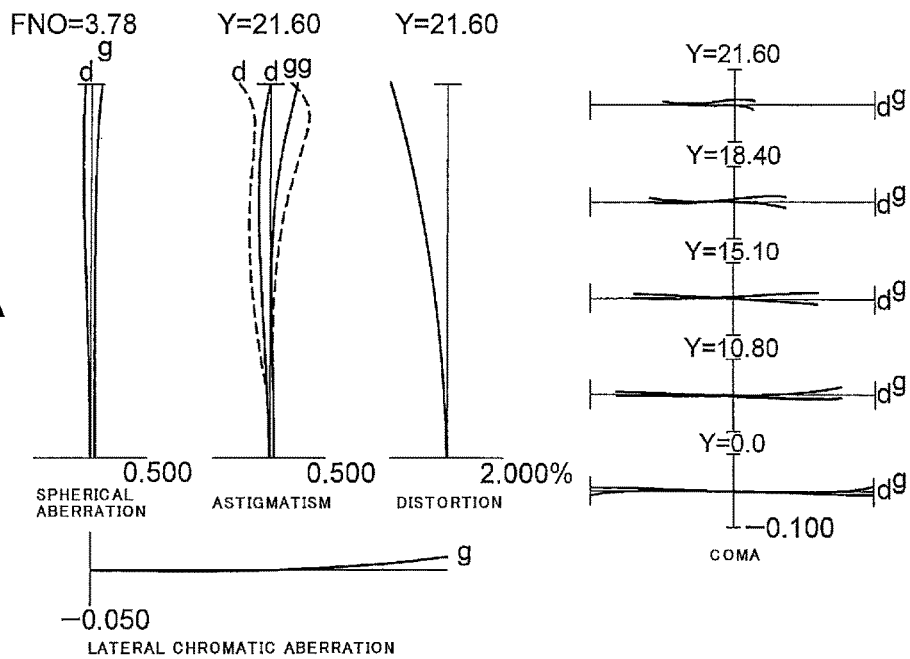
Figure 2B:
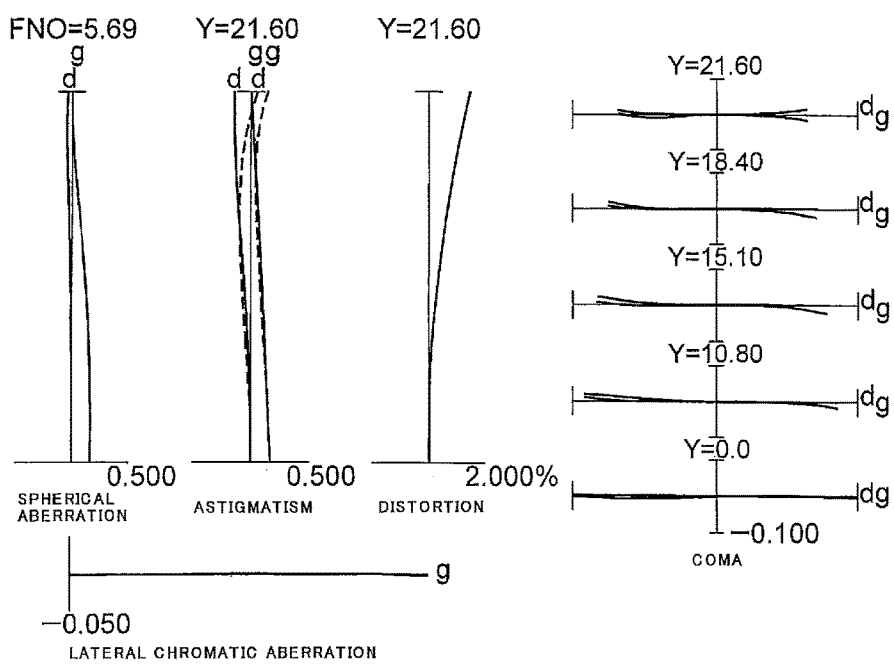

FIGS. 2A and 2B are graphs showing various aberrations of the variable magnification optical system according to the First Example of the present application upon focusing on an infinite distance object in the wide-angle end state and in the telephoto end state.

Figure 3A:
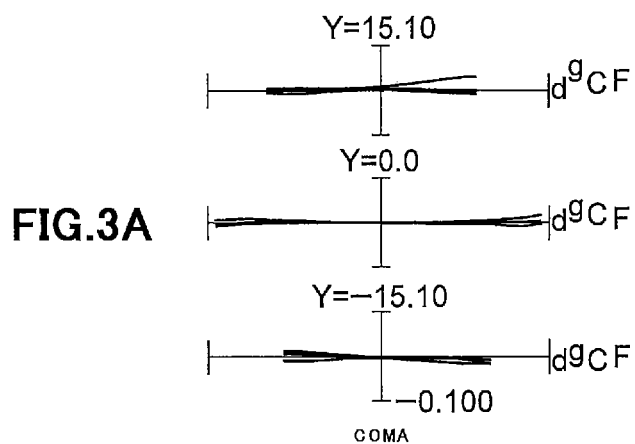
Figure 3B:
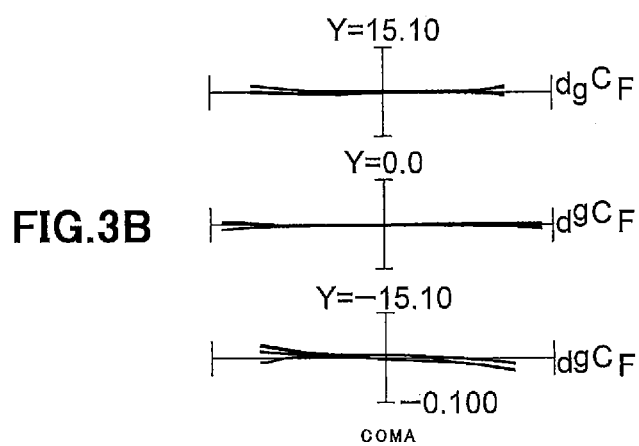

FIGS. 3A and 3B are, respectively, graphs showing coma aberrations of the variable magnification optical system according to the First Example of the present application upon focusing on an infinite distance object in the wide-angle end state and in the telephoto end state, in which FIG. 3A shows coma aberrations upon performing vibration reduction with respect to a rotational camera shake of 0.30 degrees, and FIG. 3B shows coma aberrations upon performing vibration reduction with respect to a rotational camera shake of 0.20 degrees.

Figure 4A:
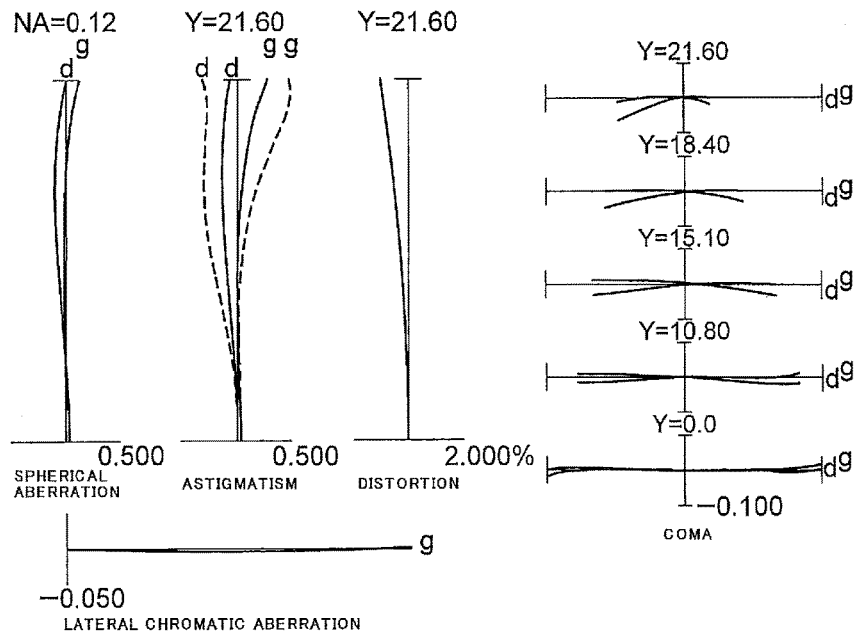
Figure 4B:
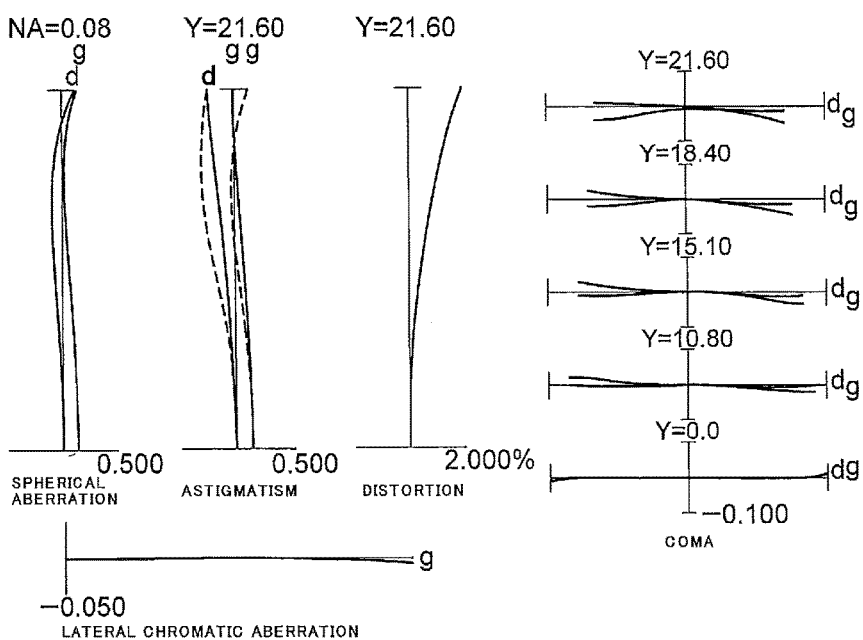

FIGS. 4A and 4B are graphs showing various aberrations of the variable magnification optical system according to the First Example of the present application upon focusing on an intermediate distance object in the wide-angle end state and in the telephoto end state, respectively.

Figure 5A:
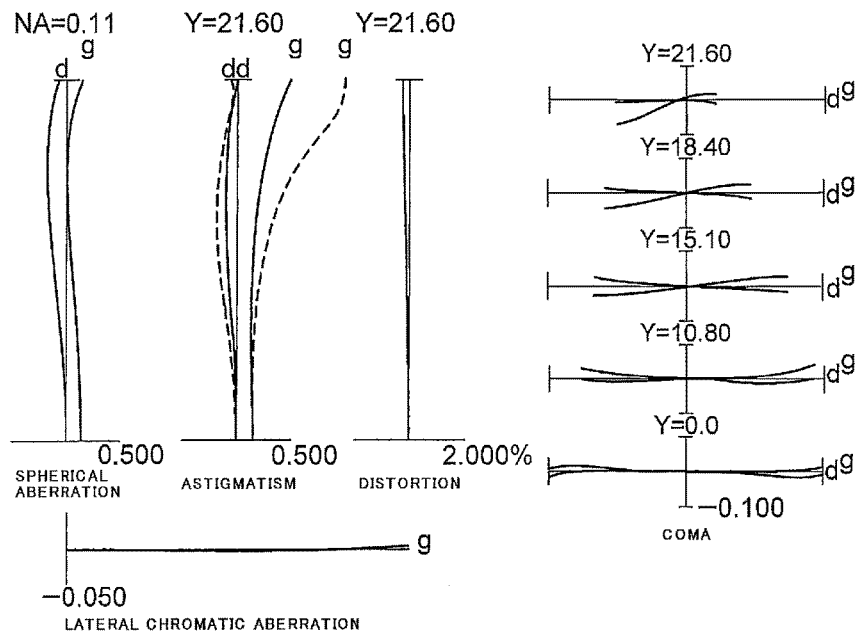
Figure 5B:
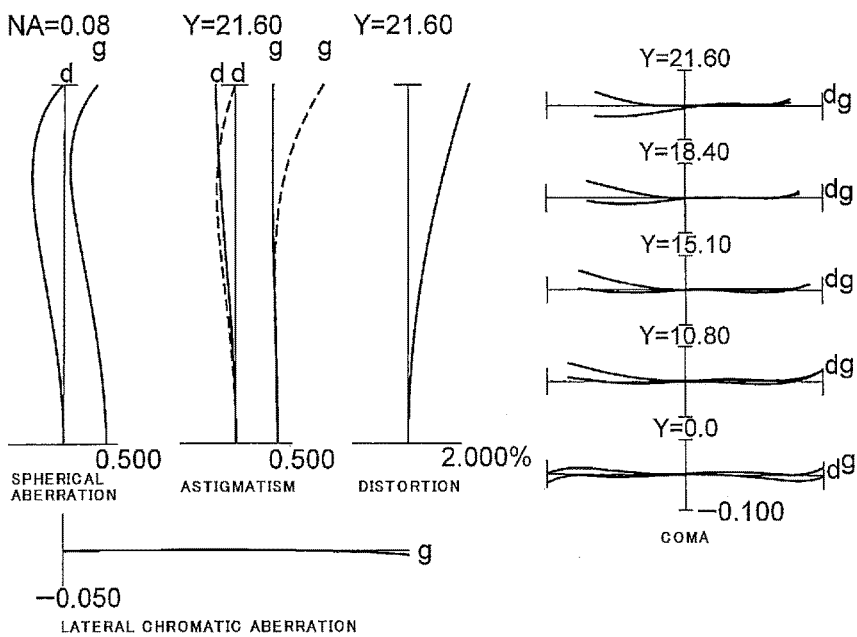

FIGS. 5A and 5B are graphs showing various aberrations of the variable magnification optical system according to the First Example of the present application upon focusing on a close distance object in the wide-angle end state and in the telephoto end state, respectively.

In respective graphs, FNO denotes an f-number, Y denotes an image height, NA denotes a numerical aperture. In graphs showing spherical aberration, f-number FNO with respect to the maximum aperture or the maximum numerical aperture NA is shown. In graphs showing astigmatism and distortion, the maximum value of the image height Y is shown. In graphs showing coma aberration, value with respect to each image height is shown. In respective graphs, d denotes aberration curve at d-line (wavelength λ=587.6 nm), g denotes aberration curve at g-line (wavelength λ=435.8 nm), F denotes aberration curve at F-line (wavelength λ=486.1 nm), and C denotes aberration curve at C-line (wavelength λ=656.3 nm). In graphs showing astigmatism, a solid line indicates a sagittal image plane, and a broken line indicates a meridional image plane. In graphs showing coma aberrations, coma aberration in each image height Y is shown. Meanwhile, the above-described explanations regarding various aberration graphs are the same as the other Examples.

As is apparent from the respective graphs, the variable magnification optical system according to the present Example shows a superb optical performance from upon focusing an infinite distance object to upon focusing on a close distance object, and further a superb optical performance even upon conducting vibration reduction.

Second Example

Figure 6:
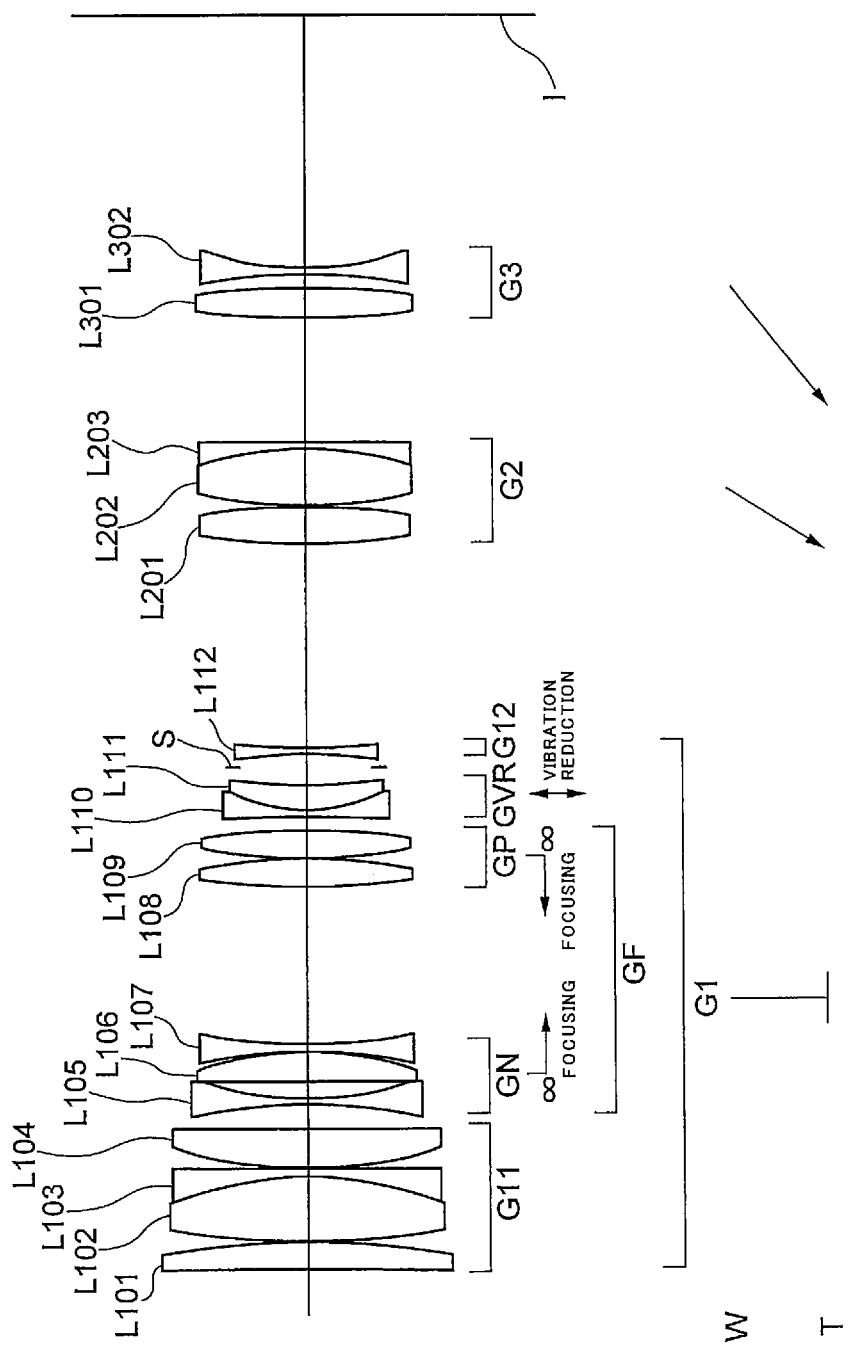
FIG. 6 is a sectional view showing a configuration of a variable magnification optical system in the wide angle end state according to a Second Example that is common to the first to the third embodiments of the present application.

FIG. 6 is a sectional view showing a variable magnification optical system according to the Second Example of the first to the third embodiments of the present application, in a wide-angle end state.

The variable magnification optical system according to the present Example, is composed of, in order from an object side, a first lens group G1 having negative refractive power, a second lens group G2 having positive refractive power and a third lens group G3 having negative refractive power.

The first lens group G1 consists of, in order from the object side, a first fixed lens group G11 having positive refractive power, a focusing lens group GF having positive refractive power, a vibration reduction lens group GVR having negative refractive power, and a second fixed lens group G12 having negative refractive power.

The first fixed lens group G11 consists of, in order from the object side, a plano-convex positive lens L101 having a convex surface facing the image side, a cemented negative lens constructed by a double convex positive lens L102 cemented with a double concave negative lens L103, and a positive meniscus lens L104 having a convex surface facing the object side.

The focusing lens group GF consists of, in order from the object side, a first focusing group GN having negative refractive power and a second focusing group GP having positive refractive power.

The first focusing group GN consists of, in order from the object side, a double concave negative lens L105, a double concave positive lens L106 and a double concave negative lens L107.

The second focusing group GP consists of, in order from the object side, a double convex positive lens L108 and a double convex positive lens L109.

The vibration reduction lens group GVR consists of, in order from the object side, a cemented negative lens constructed by a double concave negative lens L110 cemented with a positive meniscus lens L111 having a convex surface facing the object side.

The second fixed lens group G12 consists of a double concave negative meniscus lens L112.

The second lens group G2 consists of, in order from the object side, a double convex positive lens L201 and a cemented positive lens constructed by a double convex positive lens L202 cemented with a negative meniscus lens L203 having a concave surface facing the object side.

The third lens group G3 consists of, in order from the object side, a double convex positive lens L301 and a double concave negative lens L302.

In the variable magnification optical systems of the present Example, as configured above, upon varying magnification from a wide angle end state to a telephoto end state, the second lens group G2 and the third lens group G3 are moved along the optical axis toward the object side such that an interval between the first lens group G1 and the second lens group G2 is decreased and an interval between the second lens group G2 and the third lens group G3 is decreased. At this time, position of the first lens group G1 is fixed.

Further, in the variable magnification optical systems of the present Example, focusing from an infinite distance object to a close distance object is conducted by moving the first focusing group GN in the first lens group G1 along the optical axis toward the image side and by moving the second focusing group GP along the optical axis toward the object side.

Further, in the variable magnification optical system of the present Example, vibration reduction is conducted by moving the vibration reduction lens group GVR in the first lens group G1 to have a component in a direction perpendicular to the optical axis.

In the variable magnification optical systems of the present Example, the vibration reduction coefficient is 1.22 in the wide angle end state, and the focal length is 123.2 (mm), so that the moving amount of the vibration reduction lens group GVR for correcting a rotational camera shake of 0.30 degrees is 0.53 (mm). Further, in the telephoto end state, the vibration reduction coefficient is 1.83, and the focal length is 185.3 (mm), so that the moving amount of the vibration reduction lens group GVR for correcting a rotational camera shake of 0.20 degrees is 0.35 (mm).

In Table 2 below, various values of the variable magnification optical systems of the present Example are listed.

TABLE 2

Second Example

[Surface Data]

| Surface number | r | d | nd | vd |
|---|---|---|---|---|
| Object surface | ∞ | | | |
| 1 | ∞ | 4.255 | 1.77250 | 49.62 |
| 2 | −149.7393 | 0.200 | | |
| 3 | 115.7960 | 10.155 | 1.60300 | 65.44 |
| 4 | −58.7006 | 1.000 | 1.84666 | 23.78 |
| 5 | 433.9357 | 0.200 | | |

TABLE 2-continued

Second Example

| | | | | |
|---|---|---|---|---|
| 6 | 62.0332 | 6.238 | 1.77250 | 49.62 |
| 7 | 738.5282 | Variable | | |
| 8 | −100.5363 | 1.000 | 1.60300 | 65.44 |
| 9 | 52.2943 | 2.602 | | |
| 10 | 551.0548 | 4.504 | 1.84666 | 23.78 |
| 11 | −58.8580 | 0.200 | | |
| 12 | −82.6298 | 1.000 | 1.71999 | 50.27 |
| 13 | 72.9681 | Variable | | |
| 14 | 95.9148 | 4.281 | 1.58913 | 61.22 |
| 15 | −102.6625 | 0.200 | | |
| 16 | 75.7503 | 4.344 | 1.60311 | 60.69 |
| 17 | −114.4692 | Variable | | |
| 18 | −672.3722 | 1.000 | 1.80400 | 46.60 |
| 19 | 24.7527 | 3.928 | 1.75520 | 27.57 |
| 20 | 66.7085 | 2.861 | | |
| 21 (Stop S) | ∞ | 2.000 | | |
| 22 | −85.9304 | 1.000 | 1.80610 | 40.97 |
| 23 | 95.3522 | Variable | | |
| 24 | 95.3673 | 5.651 | 1.69680 | 55.52 |
| 25 | −118.9467 | 0.200 | | |
| 26 | 66.6897 | 8.716 | 1.60300 | 65.44 |
| 27 | −54.4336 | 1.000 | 1.84666 | 23.78 |
| 28 | −696.6117 | Variable | | |
| 29 | 120.5984 | 4.728 | 1.84666 | 23.78 |
| 30 | −117.3765 | 1.901 | | |
| 31 | −101.1736 | 1.000 | 1.80100 | 34.92 |
| 32 | 43.5585 | BF | | |
| Image plane | ∞ | | | |

[Various Data]
Variable magnification ratio 1.50

| | W | T |
|---|---|---|
| f | 123.22 | 185.31 |
| FNO | 3.88 | 5.84 |
| 2ω | 20.20° | 13.10° |
| Ymax | 21.60 | 21.60 |
| TL | 193.67 | 193.67 |
| BF | 38.73 | 83.74 |

| | W INF | T INF | W INT | T INT | W CLO | T CLO |
|---|---|---|---|---|---|---|
| β | 0 | 0 | −0.332 | −0.500 | −0.665 | −1.000 |
| d0 | ∞ | ∞ | 415.646 | 415.646 | 237.274 | 37.274 |
| d7 | 3.807 | 3.807 | 11.206 | 11.206 | 18.708 | 18.708 |
| d13 | 24.576 | 24.576 | 14.292 | 14.292 | 3.864 | 3.864 |
| d17 | 2.000 | 2.000 | 4.886 | 4.886 | 7.811 | 7.811 |
| d23 | 31.434 | 2.924 | 31.434 | 2.924 | 31.434 | 2.924 |
| d28 | 18.957 | 2.461 | 18.957 | 2.461 | 18.957 | 2.461 |

[Lens Group data]

| Group | Starting surface | f |
|---|---|---|
| 1 | 1 | −502.059 |
| 2 | 24 | 52.570 |
| 3 | 29 | −91.264 |

[Values for Conditional Expressions]

Figure 7A:
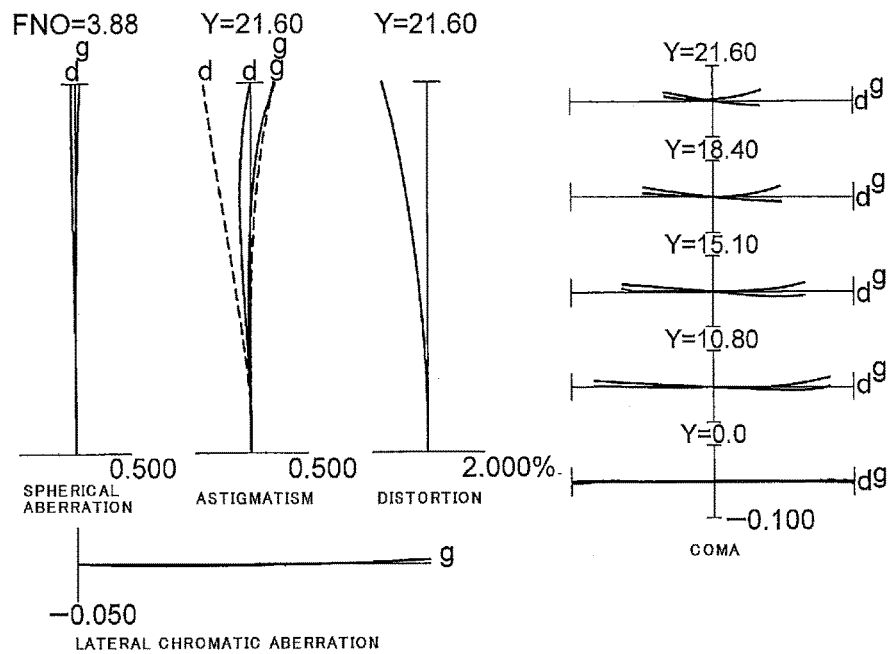
Figure 7B:
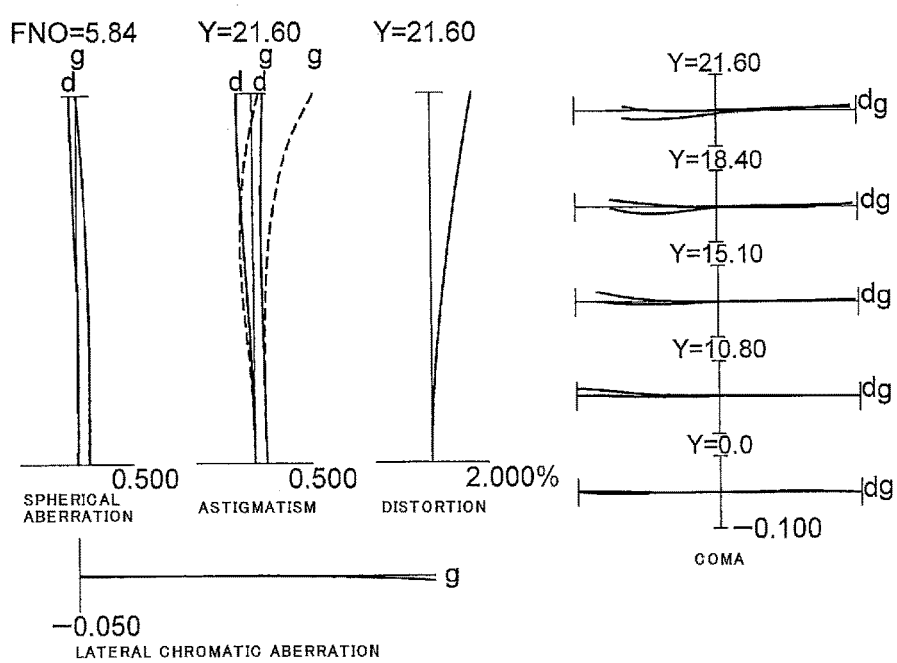

(1-1) $(-f1)/f2 = 9.550$
(1-2) $(-fN)/fP = 1.190$
(1-3) $(-fR)/fw = 0.741$
(1-4) $f2/(-f3) = 0.576$
(2-1) $(-f1)/f11 = 7.696$
(2-2) $(-fN)/fP = 1.190$
(2-3) $f2/(-f3) = 0.576$
(3-1) $|f1/fVR| = 7.319$
(3-2) $|(1-\beta wvr) \cdot \beta wr| = 1.218$
(3-3) $(-f1)/f11 = 7.696$
(3-4) $(-fN)/fP = 1.190$
(3-5) $f2/(-f3) = 0.576$ FIGS. 7A and 7B are graphs showing various aberrations of the variable magnification optical system according to the Second Example of the present application upon focusing on an infinite distance object in the wide-angle end state and in the telephoto end state.

Figure 8A:
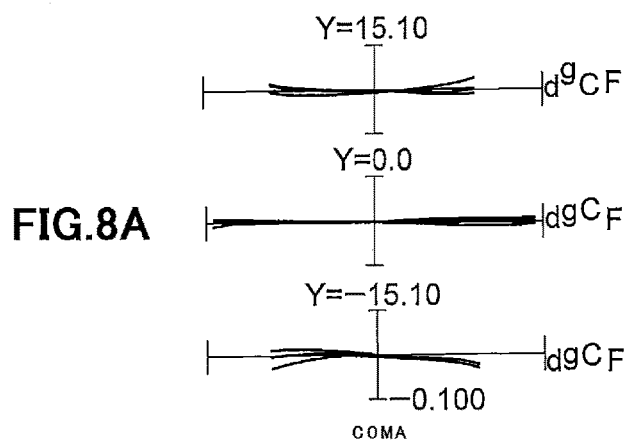
Figure 8B:
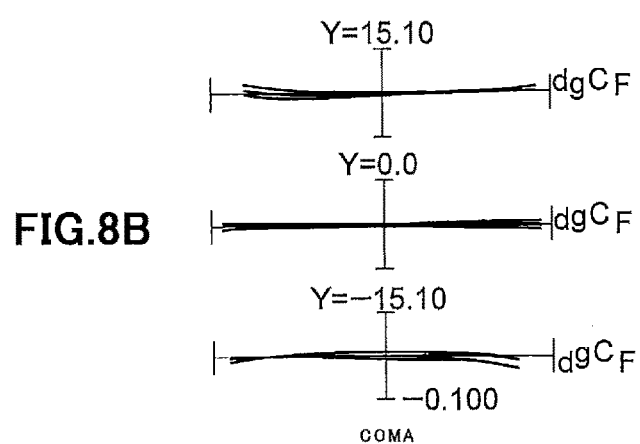

FIGS. 8A and 8B are, respectively, graphs showing coma aberrations of the variable magnification optical system according to the Second Example of the present application upon focusing on an infinite distance object in the wide-angle end state and in the telephoto end state, in which FIG. 8A shows coma aberrations upon performing vibration reduction with respect to a rotational camera shake of 0.30 degrees, and FIG. 8B shows coma aberrations upon performing vibration reduction with respect to a rotational camera shake of 0.20 degrees.

Figure 9A:
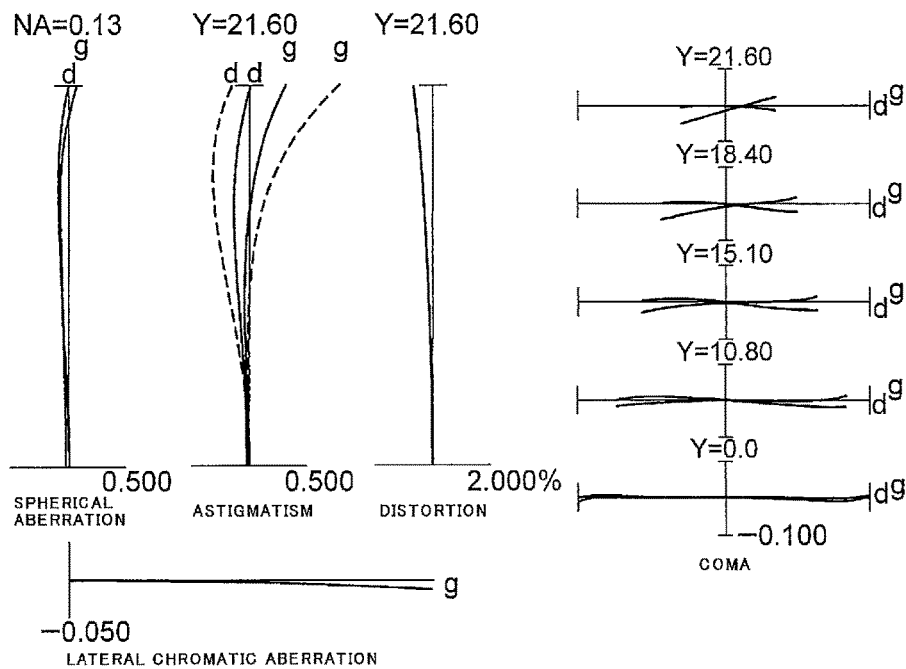
Figure 9B:
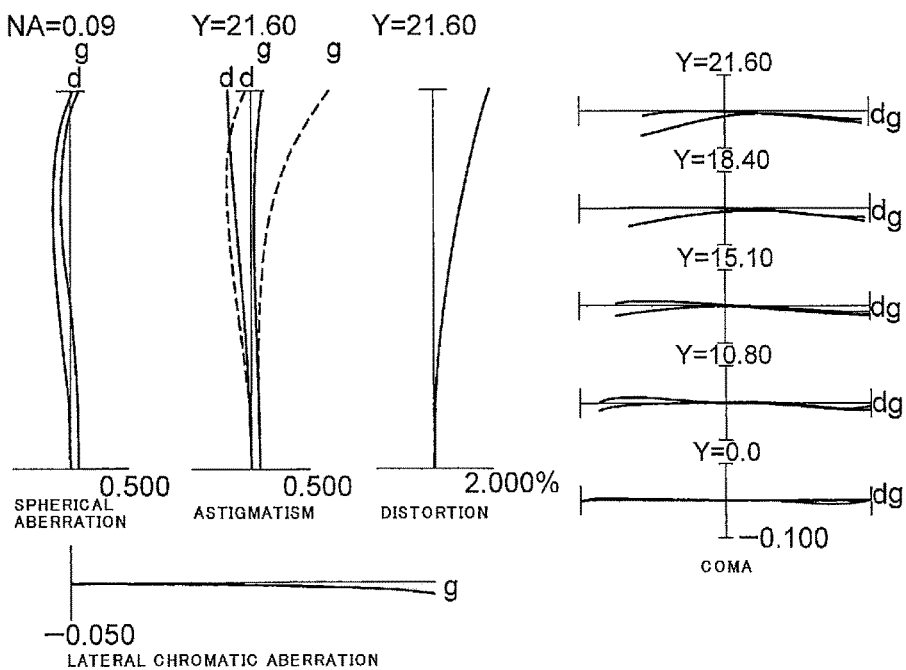

FIGS. 9A and 9B are graphs showing various aberrations of the variable magnification optical system according to the Second Example of the present application upon focusing on an intermediate distance object in the wide-angle end state and in the telephoto end state, respectively.

Figure 10A:
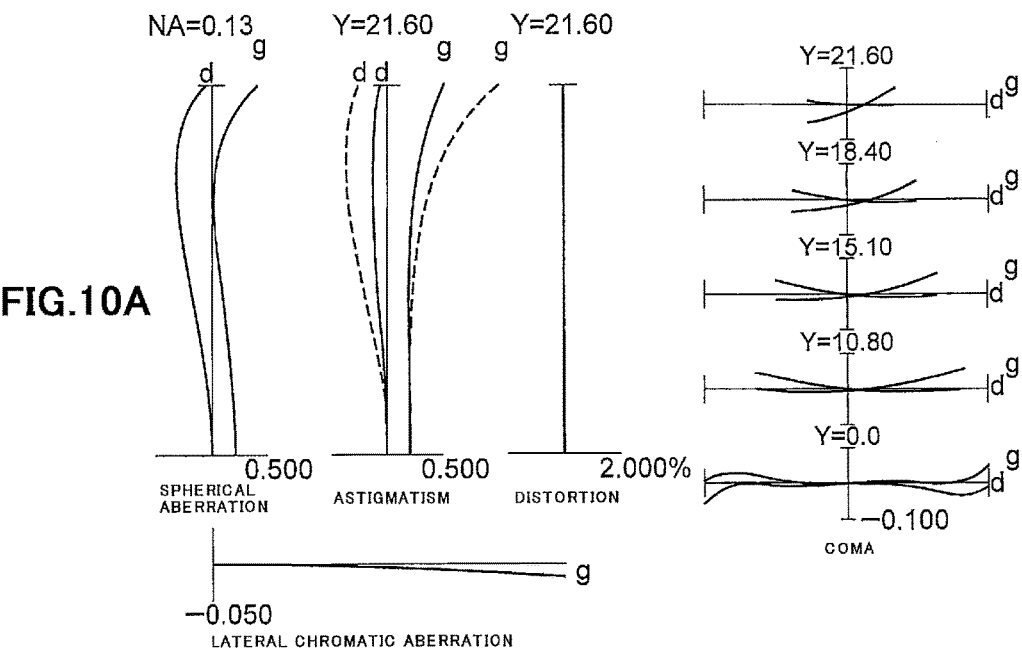
Figure 10B:
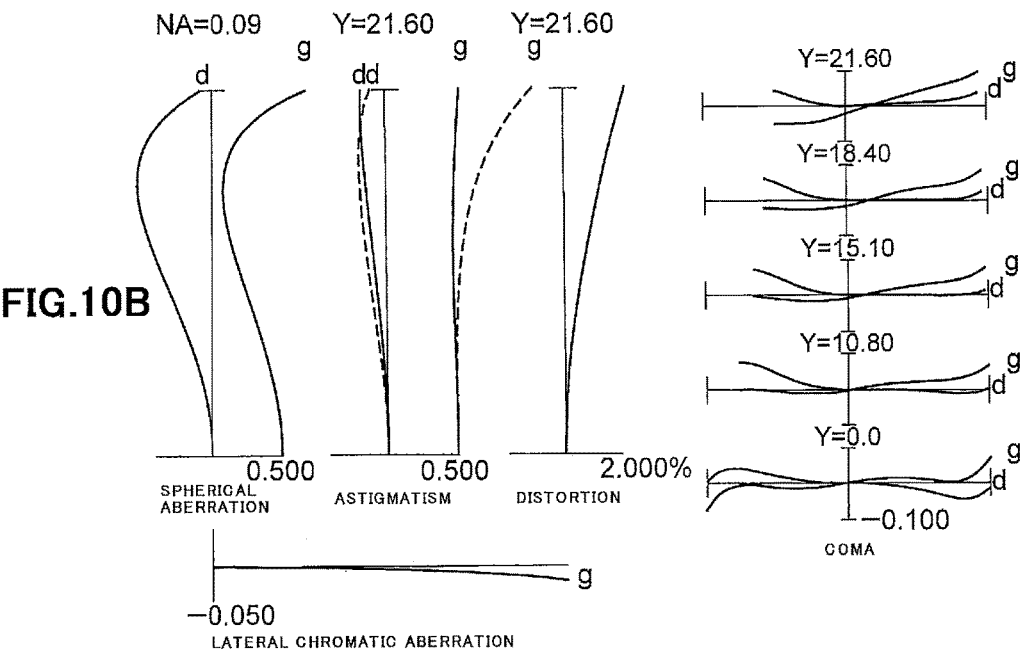

FIGS. 10A and 10B are graphs showing various aberrations of the variable magnification optical system according to the Second Example of the present application upon focusing on a close distance object in the wide-angle end state and in the telephoto end state, respectively.

As is apparent from the respective graphs, the variable magnification optical system according to the present Example shows a superb optical performance from upon focusing an infinite distance object to upon focusing on a close distance object, and further a superb optical performance even upon conducting vibration reduction.

Third Example

Figure 11:
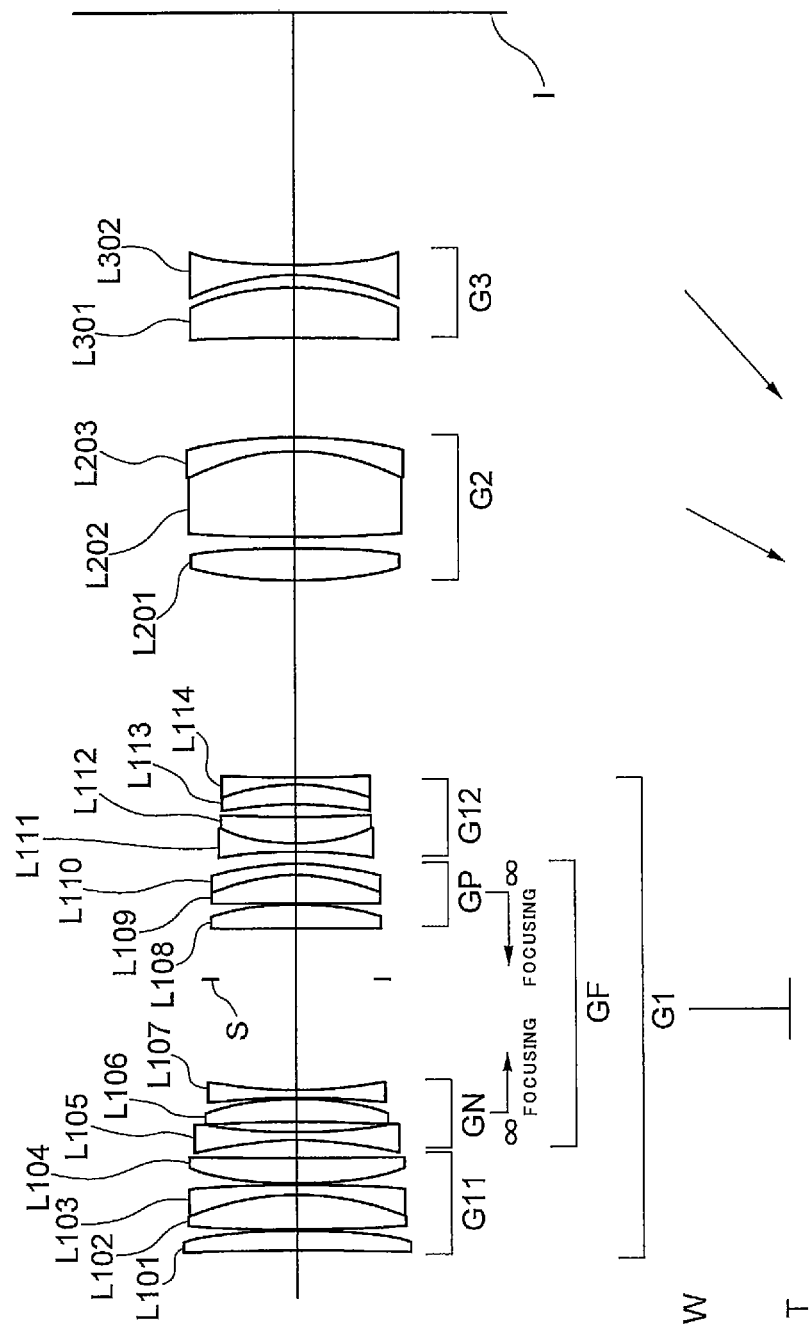
FIG. 11 is a sectional view showing a configuration of a variable magnification optical system in the wide angle end state according to a Third Example that is common to the first and the second embodiments of the present application.

FIG. 11 is a sectional view showing a variable magnification optical system according to the First Example of the first and the second embodiments of the present application, in a wide-angle end state.

The variable magnification optical system according to the present Example, is composed of, in order from an object side, a first lens group G1 having negative refractive power, a second lens group G2 having positive refractive power and a third lens group G3 having negative refractive power.

The first lens group G1 consists of, in order from the object side, a first fixed lens group G11 having positive refractive power, a focusing lens group GF having positive refractive power, and a second fixed lens group G12 having negative refractive power.

The first fixed lens group G11 consists of, in order from the object side, a plano-convex positive lens L101 having a convex surface facing the image side, a cemented positive lens constructed by a double convex positive lens L102 cemented with a negative meniscus lens L103 having a concave surface facing the object side, and a positive meniscus lens L104 having a convex surface facing the object side.

The focusing lens group GF consists of, in order from the object side, a first focusing group GN having negative refractive power, an aperture stop S and a second focusing group GP having positive refractive power.

The first focusing group GN consists of, in order from the object side, a double concave negative lens L105, a positive meniscus lens L106 having a concave surface facing the object side, and a double concave negative lens L107.

The second focusing group GP consists of, in order from the object side, a double convex positive lens L108, and a cemented positive lens constructed by a double convex positive lens L109 cemented with a negative meniscus lens L110 having a concave surface facing the object side.

The second fixed lens group G12 consists of, in order from the object side, a cemented negative lens constructed by a double concave negative lens L111 cemented with a positive meniscus lens L112 having a convex surface facing the object side and a cemented negative lens constructed by a positive meniscus lens L113 cemented with a double concave negative lens L114.

The second lens group G2 consists of, in order from the object side, a double convex positive lens L201, and a cemented positive lens constructed by a double convex positive lens L202 cemented with a negative meniscus lens L203 having a concave surface facing the object side.

The third lens group G3 consists of, in order from the object side, a positive meniscus lens L301 and a double concave negative lens L302.

In the variable magnification optical systems of the present Example, as configured above, upon varying magnification from a wide angle end state to a telephoto end state, the second lens group G2 and the third lens group G3 are moved along the optical axis toward the object side such that an interval between the first lens group G1 and the second lens group G2 is decreased and an interval between the second lens group G2 and the third lens group G3 is decreased. At this time, position of the first lens group G1 is fixed.

Further, in the variable magnification optical systems of the present Example, focusing from an infinite distance object to a close distance object is conducted by moving the first focusing group GN in the first lens group G1 along the optical axis toward the image side and by moving the second focusing group GP along the optical axis toward the object side.

In Table 3 below, various values of the variable magnification optical systems of the present Example are listed.

TABLE 3

Third Example

[Surface Data]

| Surface number | r | d | nd | vd |
|---|---|---|---|---|
| Object surface | ∞ | | | |
| 1 | ∞ | 3.131 | 1.77250 | 49.62 |
| 2 | −129.8581 | 0.200 | | |
| 3 | 159.2004 | 5.581 | 1.60300 | 65.44 |
| 4 | −50.4624 | 1.580 | 1.84666 | 23.78 |
| 5 | −423.0263 | 0.200 | | |
| 6 | 55.7159 | 3.900 | 1.77250 | 49.62 |
| 7 | 243.5757 | Variable | | |
| 8 | −69.8452 | 1.006 | 1.60300 | 65.44 |
| 9 | 73.1240 | 1.682 | | |
| 10 | −827.3615 | 3.653 | 1.84666 | 23.78 |
| 11 | −55.8752 | 0.200 | | |
| 12 | −201.3067 | 1.000 | 1.71999 | 50.27 |
| 13 | 54.7447 | Variable | | |
| 14 (Stop S) | ∞ | Variable | | |
| 15 | 626.2833 | 3.492 | 1.58913 | 61.22 |
| 16 | −60.5344 | 0.225 | | |
| 17 | 275.4572 | 4.538 | 1.60311 | 60.69 |
| 18 | −36.3111 | 1.690 | 1.85026 | 32.35 |
| 19 | −55.7777 | Variable | | |
| 20 | −79.7866 | 1.156 | 1.80400 | 46.60 |
| 21 | 28.1558 | 4.209 | 1.84666 | 23.78 |
| 22 | 113.8989 | 1.972 | | |
| 23 | −73.0265 | 3.127 | 1.83400 | 37.18 |
| 24 | −38.5145 | 1.000 | 1.66446 | 35.87 |
| 25 | 136.1590 | Variable | | |

TABLE 3-continued

Third Example

| | | | | |
|---|---|---|---|---|
| *26 | 58.3764 | 5.000 | 1.59255 | 67.86 |
| 27 | −196.5180 | 1.638 | | |
| 28 | 160.7431 | 13.067 | 1.64000 | 60.20 |
| 29 | −37.6541 | 1.956 | 1.84666 | 23.78 |
| 30 | −95.8035 | Variable | | |
| 31 | −1973.3196 | 7.846 | 1.84666 | 23.78 |
| 32 | −46.2978 | 2.030 | | |
| 33 | −40.3836 | 1.338 | 1.80100 | 34.92 |
| 34 | 62.1261 | BF | | |
| Image plane | ∞ | | | |

[Aspherical Data]
26th surface

K = −0.2596
A4 = −2.88791E−07
A6 = 5.11555E−10
A8 = 9.51239E−13
A10 = −4.65932E−15

[Various Data]
Variable magnification ratio 1.50

| | W | T |
|---|---|---|
| f | 116.39 | 175.13 |
| FNO | 3.83 | 5.77 |
| 2ω | 21.46° | 13.90° |
| Ymax | 21.60 | 21.60 |
| TL | 191.21 | 191.21 |
| BF | 38.52 | 79.19 |

| | W INF | T INF | W INT | T INT | W CLO | T CLO |
|---|---|---|---|---|---|---|
| β | 0 | 0 | −0.332 | −0.500 | −0.665 | −1.000 |
| d0 | ∞ | ∞ | 389.828 | 389.828 | 218.664 | 218.664 |
| d7 | 3.000 | 3.000 | 9.745 | 9.745 | 16.621 | 16.621 |
| d13 | 17.552 | 17.552 | 10.807 | 10.807 | 3.931 | 3.931 |
| d14 | 7.816 | 7.816 | 4.983 | 4.983 | 2.096 | 2.096 |
| d19 | 2.000 | 2.000 | 4.833 | 4.833 | 7.721 | 7.721 |
| d25 | 30.403 | 2.199 | 30.403 | 2.199 | 30.403 | 2.199 |
| d30 | 15.509 | 3.040 | 15.509 | 3.040 | 15.509 | 3.040 |

[Lens Group data]

| Group | Starting surface | f |
|---|---|---|
| 1 | 1 | −488.762 |
| 2 | 26 | 51.428 |
| 3 | 31 | −72.888 |

[Values for Conditional Expressions]

(1-1) (−f1)/f2 = 9.504
(1-2) (−fN)/fP = 1.057
(1-3) (−fR)/fw = 0.626
(1-4) f2/(−f3) = 0.706
(2-1) (−f1)/f11 = 8.502
(2-2) (−fN)/fP = 1.057
(2-3) f2/(−f3) = 0.706

Figure 12A:
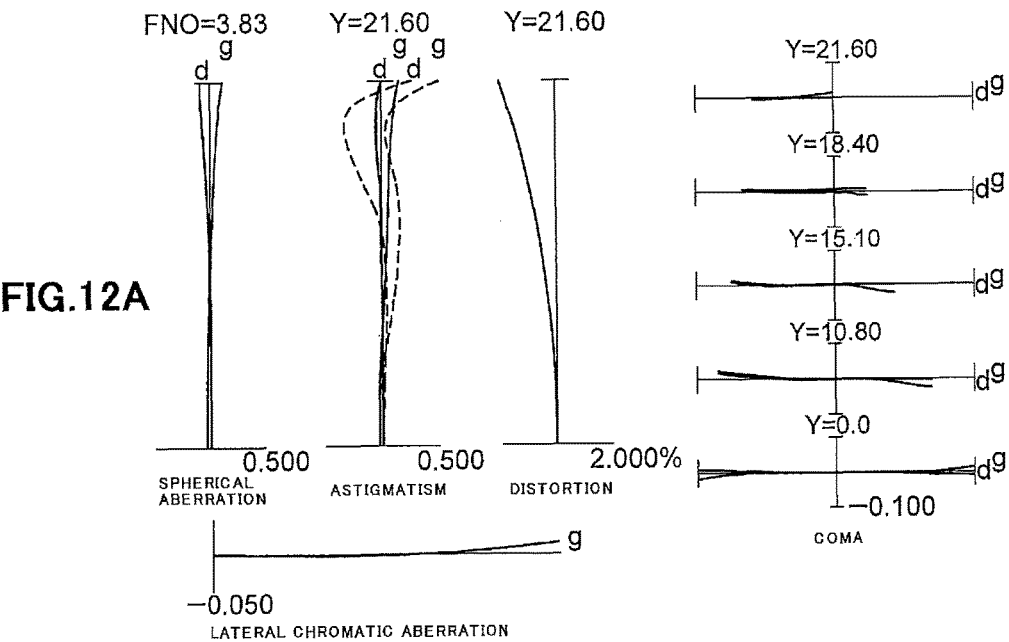
Figure 12B:
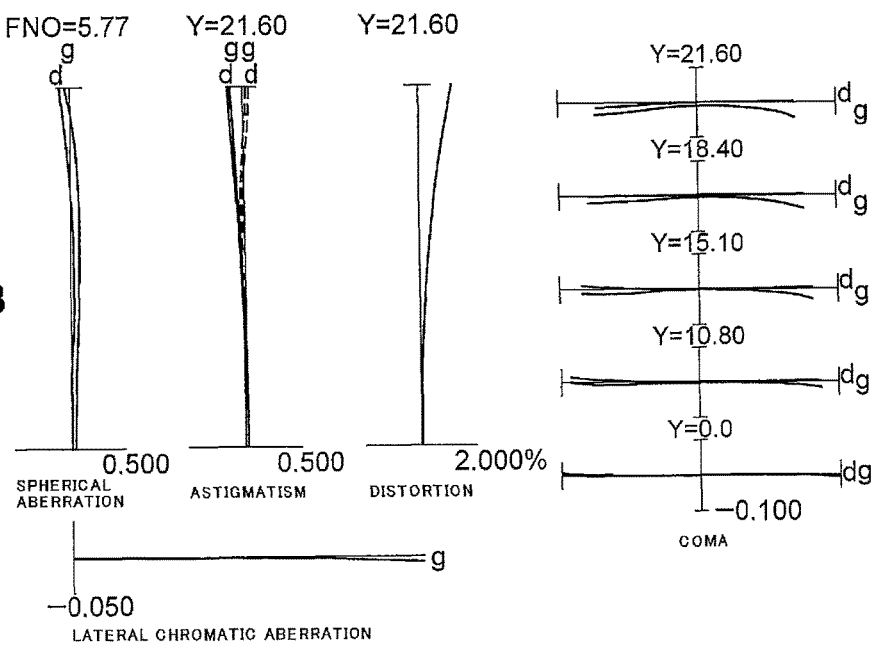

FIGS. 12A and 12B are graphs showing various aberrations of the variable magnification optical system according to the Third Example of the present application upon focusing on an infinite distance object in the wide-angle end state and in the telephoto end state.

Figure 13A:
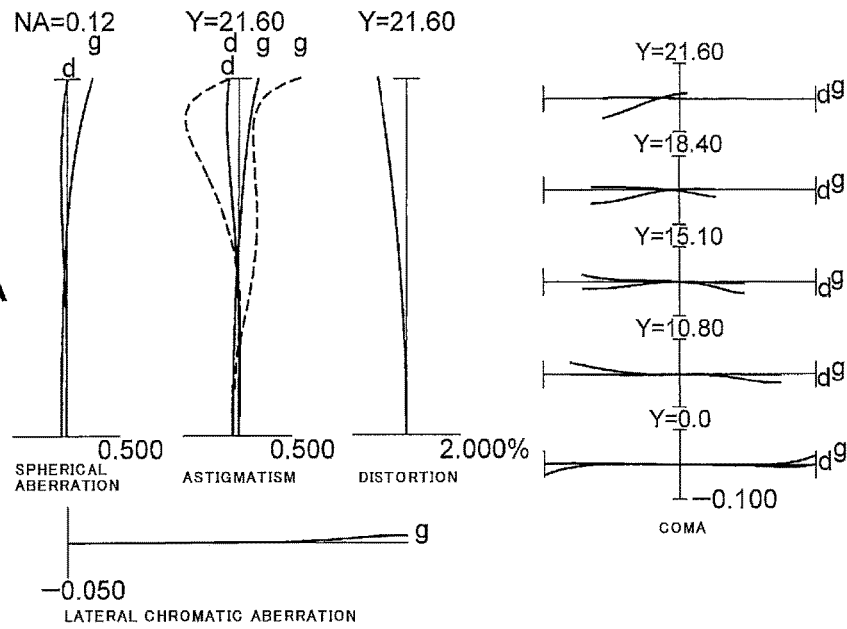
Figure 13B:
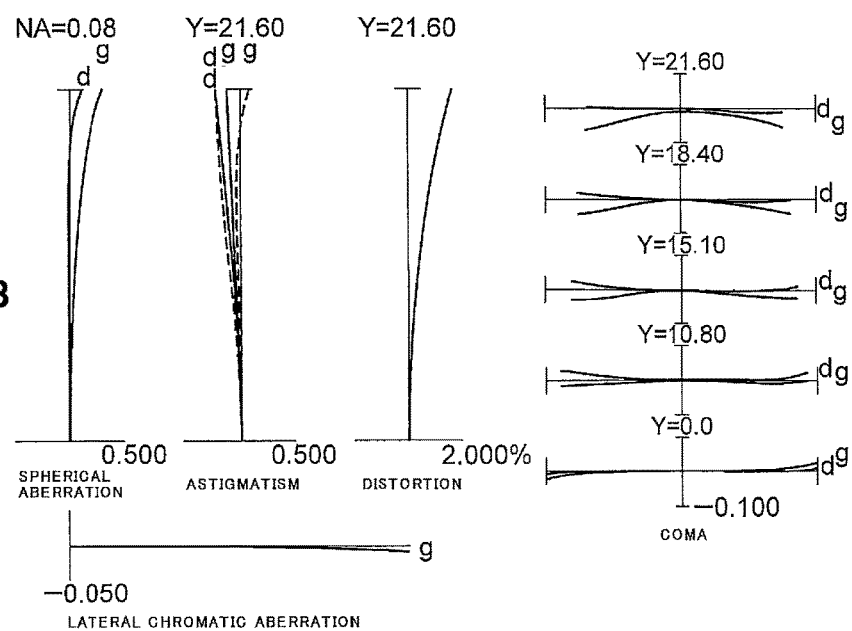

FIGS. 13A and 13B are, respectively, graphs showing various aberrations of the variable magnification optical system according to the Third Example of the present application upon focusing on an intermediate distance object in the wide-angle end state and in the telephoto end state.

Figure 14A:
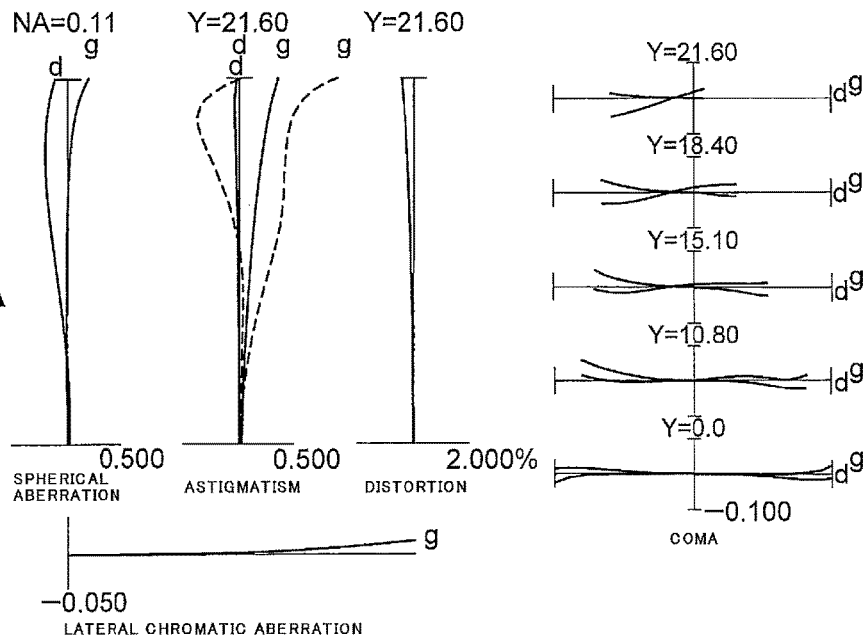
Figure 14B:
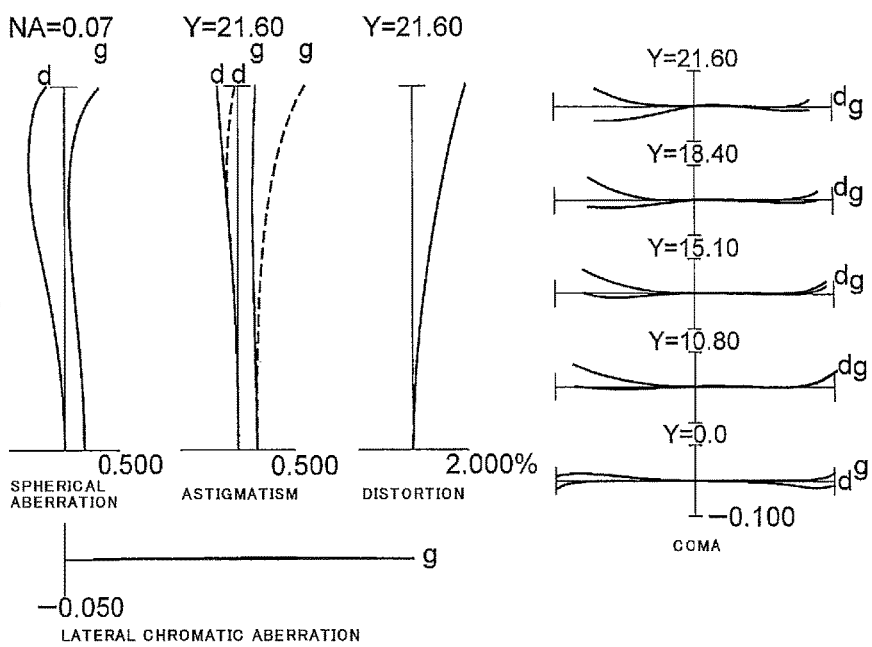

FIGS. 14A and 14B are graphs showing various aberrations of the variable magnification optical system according to the Third Example of the present application upon focusing on a close distance object in the wide-angle end state and in the telephoto end state, respectively.

As is apparent from the respective graphs, the variable magnification optical system according to the present Example shows a superb optical performance from upon focusing on an infinite distance object to upon focusing on a close distance object.

Fourth Example

FIG. 15 is a sectional view showing a variable magnification optical system according to the Fourth Example of the first and the second embodiments of the present application, in a wide-angle end state.

The variable magnification optical system according to the present Example is composed of, in order from an object side, a first lens group G1 having negative refractive power, a second lens group G2 having positive refractive power and a third lens group G3 having negative refractive power.

The first lens group G1 consists of, in order from the object side, a first fixed lens group G11 having positive refractive power, a focusing lens group GF having positive refractive power, an aperture stop S and a second fixed lens group G12 having negative refractive power.

The first fixed lens group G11 consists of, in order from the object side, a double convex positive lens L101, a cemented positive lens constructed by a double convex positive lens L102 cemented with a double concave negative lens L103, and a positive meniscus lens L104 having a convex surface facing the object side.

The focusing lens group GF consists of, in order from the object side, a first focusing group GN having negative refractive power and a second focusing group GP having positive refractive power.

The first focusing group GN consists of, in order from the object side, a double concave negative lens L105, a double convex positive lens L106 and a double concave negative lens L107.

The second focusing group GP consists of, in order from the object side, a double convex positive lens L108, and a cemented positive lens constructed by a positive meniscus lens L109 cemented with a negative meniscus lens L110 having a concave surface facing the object side.

The second fixed lens group G12 consists of, in order from the object side, a cemented negative lens constructed by a positive meniscus lens L111 having a concave surface facing the object side cemented with a double concave negative lens L112.

The second lens group G2 consists of, in order from the object side, a double convex positive lens L201, and a cemented positive lens constructed by a double convex positive lens L202 cemented with a negative meniscus lens L203 having a concave surface facing the object side. Meanwhile, the positive lens L201 is an aspherical lens whose an object side lens surface is aspherical.

The third lens group G3 consists of, in order from the object side, a positive meniscus lens L301 having a concave surface facing the object side and a double concave negative lens L302.

In the variable magnification optical system of the present Example, as configured above, upon varying magnification from a wide angle end state to a telephoto end state, the second lens group G2 and the third lens group G3 are moved along the optical axis toward the object side such that an interval between the first lens group G1 and the second lens group G2 is decreased and an interval between the second lens group G2 and the third lens group G3 is decreased. At this time, position of the first lens group G1 is fixed.

Further, in the variable magnification optical systems of the present Example, focusing from an infinite distance object to a close distance object is conducted by moving the first focusing group GN in the first lens group G1 along the optical axis toward the image side and by moving the second focusing group GP along the optical axis toward the object side.

In Table 4 below, various values of the variable magnification optical systems of the present Example are listed.

TABLE 4

Fourth Example

[Surface Data]

| Surface number | r | d | nd | vd |
|---|---|---|---|---|
| Object surface | ∞ | | | |
| 1 | 6376.5923 | 4.428 | 1.72916 | 54.61 |
| 2 | −128.2117 | 0.200 | | |
| 3 | 102.7234 | 9.148 | 1.60300 | 65.44 |
| 4 | −63.2808 | 1.000 | 1.80518 | 25.45 |
| 5 | 744.5864 | 0.200 | | |
| 6 | 60.4723 | 5.272 | 1.74400 | 44.81 |
| 7 | 308.9542 | Variable | | |
| 8 | −76.5992 | 1.000 | 1.64000 | 60.20 |
| 9 | 61.2952 | 2.164 | | |
| 10 | 4222.7376 | 4.111 | 1.84666 | 23.78 |
| 11 | −58.0587 | 0.200 | | |
| 12 | −130.6820 | 1.000 | 1.77250 | 49.62 |
| 13 | 71.4489 | Variable | | |
| 14 | 261.5468 | 3.751 | 1.59319 | 67.90 |
| 15 | −63.3134 | 0.755 | | |
| 16 | −77.7049 | 4.739 | 1.60300 | 65.44 |
| 17 | −24.2435 | 2.329 | 1.85026 | 32.35 |
| 18 | −36.1636 | Variable | | |
| 19 (Stop S) | ∞ | 3.401 | | |
| 20 | −43.4120 | 3.116 | 1.84666 | 23.78 |
| 21 | −26.6018 | 1.000 | 1.67790 | 55.35 |
| 22 | 75.2323 | Variable | | |
| *23 | 55.1799 | 5.000 | 1.59255 | 67.86 |
| 24 | −270.1302 | 2.293 | | |
| 25 | 165.7491 | 10.749 | 1.63854 | 55.34 |
| 26 | −31.0516 | 3.516 | 1.84666 | 23.78 |
| 27 | −72.1497 | Variable | | |
| 28 | −142.2048 | 5.236 | 1.80518 | 25.45 |
| 29 | −38.0134 | 2.703 | | |
| 30 | −33.9659 | 1.000 | 1.80610 | 40.97 |
| 31 | 88.2424 | BF | | |
| Image plane | ∞ | | | |

[Aspherical Surface Data]
23th surface

K = −0.0509
A4 = −1.50426E−07
A6 = 1.75966E−09
A8 = −1.52697E−11
A10 = 3.52037E−14

[Various Data]
Variable magnification ratio 1.50

| | W | T |
|---|---|---|
| f | 115.93 | 174.15 |
| FNO | 3.80 | 5.71 |
| 2ω | 20.58° | 13.98° |
| Ymax | 21.60 | 21.60 |
| TL | 192.08 | 192.08 |
| BF | 38.52 | 76.27 |

TABLE 4-continued

Fourth Example

| | W INF | T INF | W INT | T INT | W CLO | T CLO |
|---|---|---|---|---|---|---|
| β | 0 | 0 | −0.333 | −0.500 | −0.666 | −1.000 |
| d0 | ∞ | ∞ | 397.269 | 397.269 | 226.160 | 226.160 |
| d7 | 3.270 | 3.270 | 11.579 | 11.579 | 19.846 | 19.846 |
| d13 | 24.949 | 24.979 | 13.897 | 13.897 | 2.902 | 2.902 |
| d18 | 1.000 | 1.000 | 3.742 | 3.742 | 6.470 | 6.470 |
| d22 | 30.219 | 2.532 | 30.219 | 2.532 | 30.219 | 2.532 |
| d27 | 15.815 | 5.756 | 15.815 | 5.756 | 15.815 | 5.756 |

[Lens Group data]

| Group | Starting surface | f |
|---|---|---|
| 1 | 1 | −508.476 |
| 2 | 23 | 49.034 |
| 3 | 28 | −61.853 |

[Values for Conditional Expressions]

(1-1) $(-f1)/f2 = 10.370$
(1-2) $(-fN)/fP = 1.062$
(1-3) $(-fR)/fw = 0.534$
(1-4) $f2/(-f3) = 0.793$
(2-1) $(-f1)/f11 = 8.634$
(2-2) $(-fN)/fP = 1.062$
(2-3) $f2/(-f3) = 0.793$

Figure 16A:
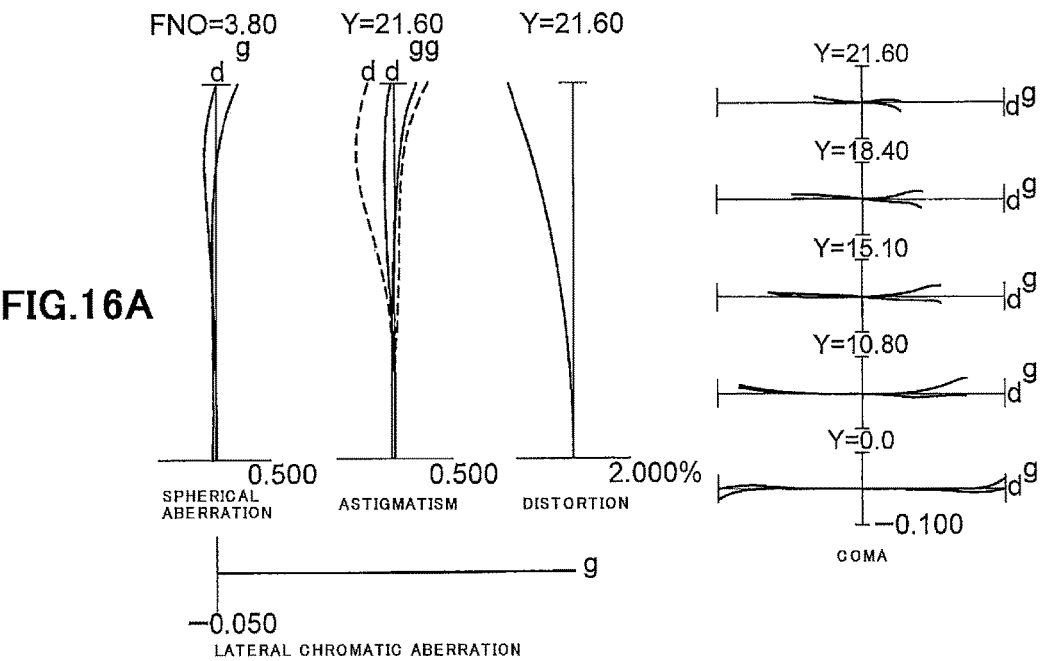
Figure 16B:
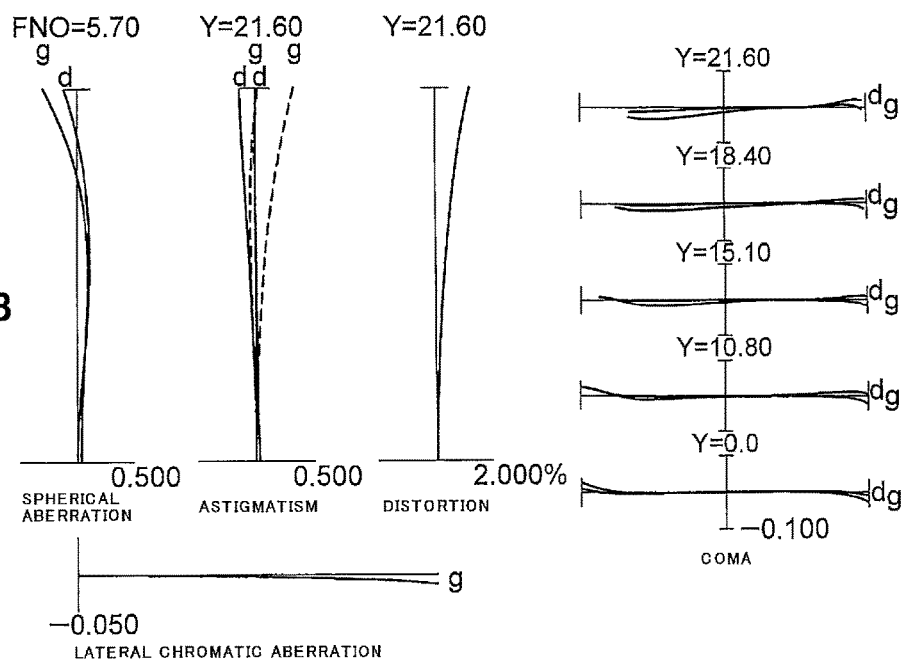

FIGS. 16A and 16B are graphs showing various aberrations of the variable magnification optical system according to the Fourth Example of the present application upon focusing on an infinite distance object in the wide-angle end state and in the telephoto end state.

Figure 17A:
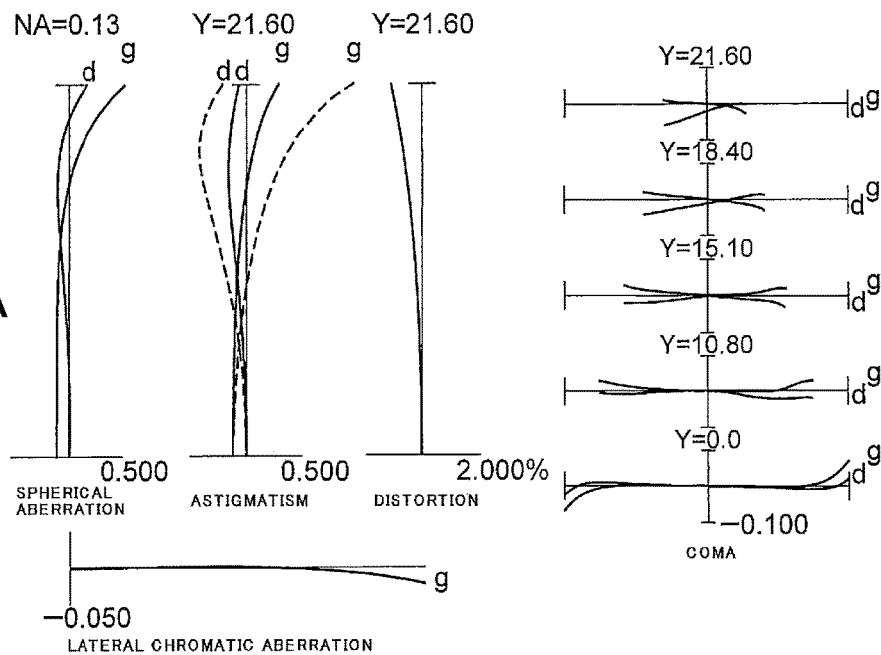
Figure 17B:
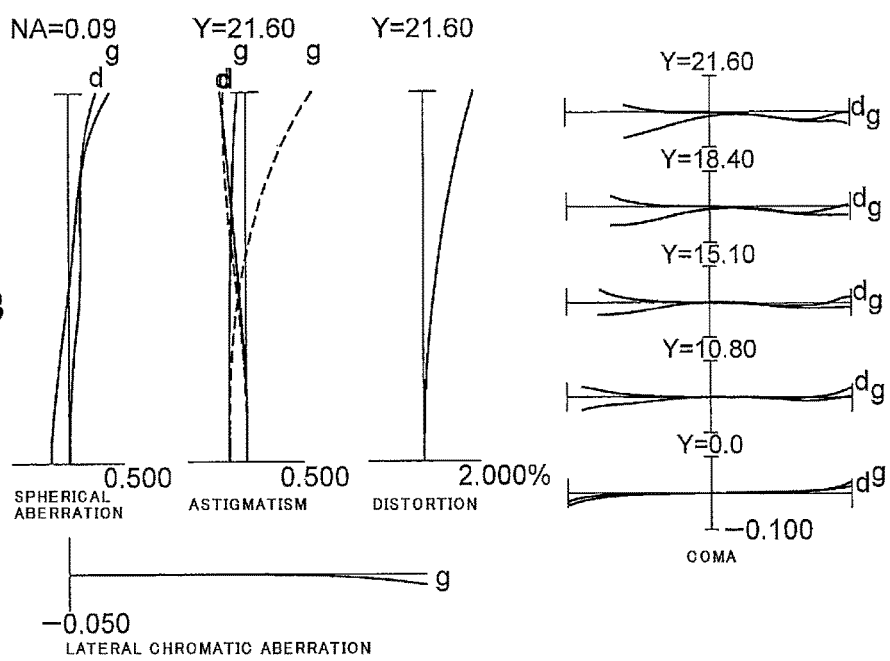

FIGS. 17A and 17B are graphs showing various aberrations of the variable magnification optical system according to the Fourth Example of the present application upon focusing on an intermediate distance object in the wide-angle end state and in the telephoto end state, respectively.

Figure 18A:
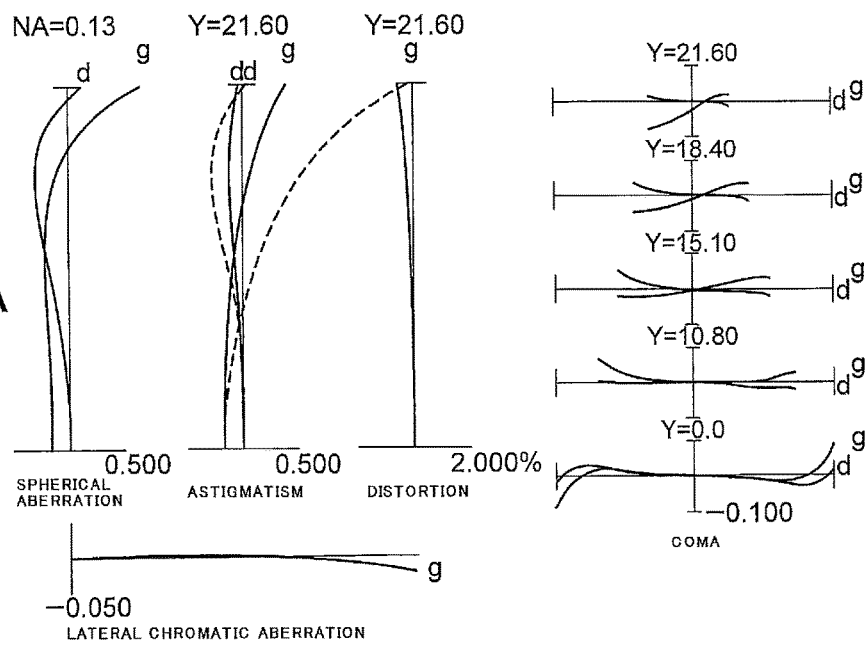
Figure 18B:
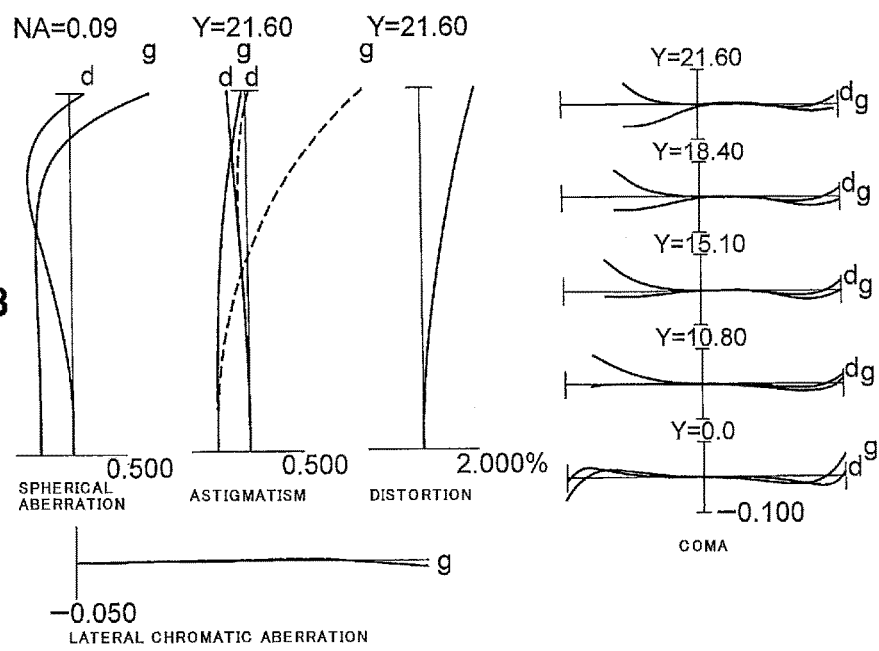

FIGS. 18A and 18B are graphs showing various aberrations of the variable magnification optical system according to the Fourth Example of the present application upon focusing on a close distance object in the wide-angle end state and in the telephoto end state, respectively.

As is apparent from the respective graphs, the variable magnification optical system according to the present Example shows a superb optical performance from upon focusing on an infinite distance object to upon focusing on a close distance object.

Fifth Example

Figure 19:
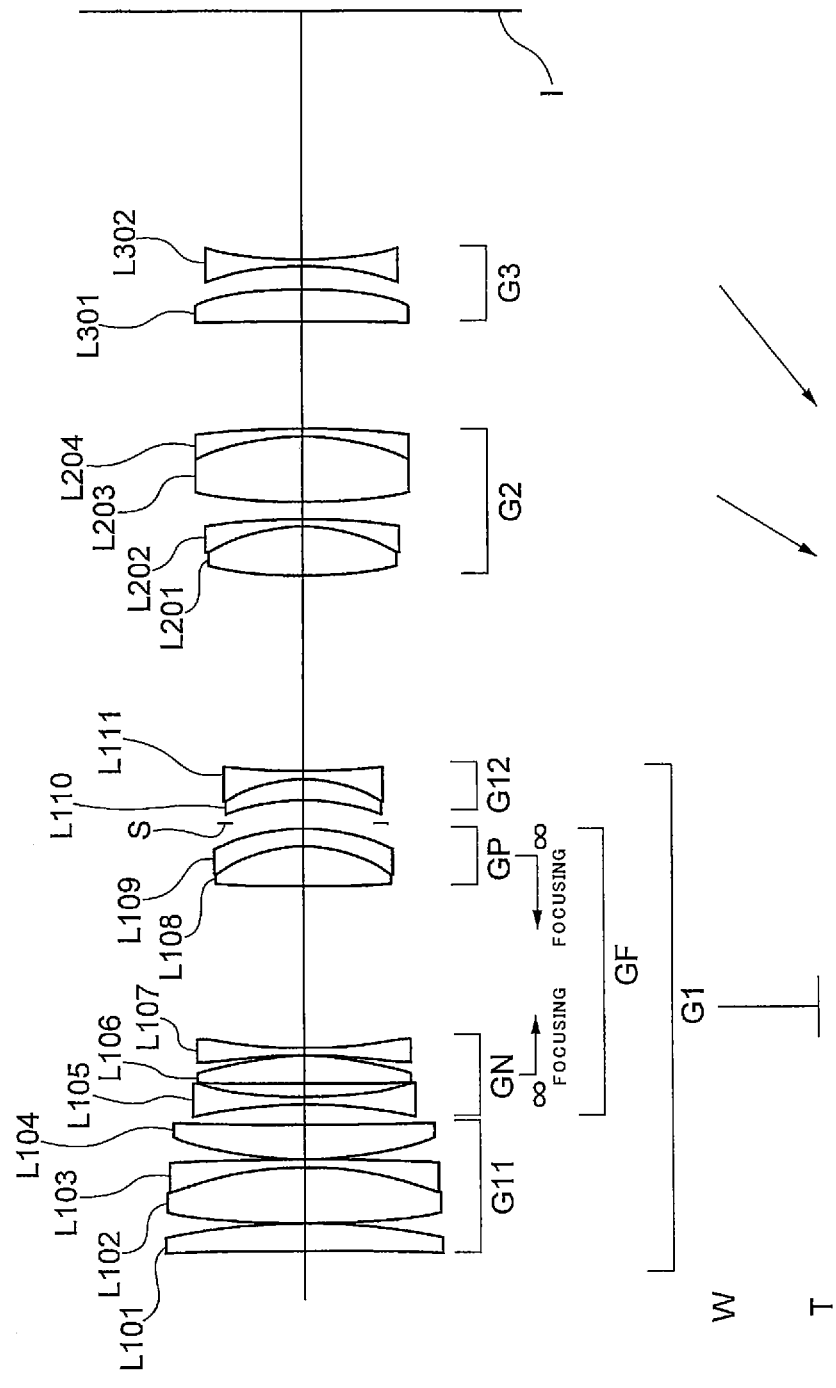
FIG. 19 is a sectional view showing a configuration of a variable magnification optical system in the wide angle end state according to a Fifth Example that is common to the first and the second embodiments of the present application.

FIG. 19 is a sectional view showing a variable magnification optical system according to the Fifth Example of the first and the second embodiments of the present application, in a wide-angle end state.

The variable magnification optical system according to the present Example, is composed of, in order from an object side, a first lens group G1 having negative refractive power, a second lens group G2 having positive refractive power and a third lens group G3 having negative refractive power.

The first lens group G1 consists of, in order from the object side, a first fixed lens group G11 having positive refractive power, a focusing lens group GF having positive refractive power, an aperture stop S and a second fixed lens group G12 having negative refractive power.

The first fixed lens group G11 consists of, in order from the object side, a plano-convex positive lens L101 having a convex surface facing the image side, a cemented positive lens constructed by a double convex positive lens L102 cemented with a negative meniscus lens L103 having a concave surface facing the object side, and a positive meniscus lens L104 having a convex surface facing the object side.

The focusing lens group GF consists of, in order from the object side, a first focusing group GN having negative refractive power and a second focusing group GP having positive refractive power.

The first focusing group GN consists of, in order from the object side, a double concave negative lens L105, a double convex positive lens L106 and a double concave negative lens L107.

The second focusing group GP consists of, in order from the object side, a cemented positive lens constructed by a double convex positive lens L108 cemented with a negative meniscus lens 09 having a concave surface facing the object side.

The second lens group G2 consists of, in order from the object side, a cemented lens constructed by a double convex positive lens L201 cemented with a negative meniscus lens L202 having a concave surface facing the object side, and a cemented positive lens constructed by a double convex positive lens L203 cemented with a negative meniscus lens L204 having a concave surface facing the object side.

The third lens group G3 consists of, in order from the object side, a double convex positive lens L301 and a double concave negative lens L302.

In the variable magnification optical systems of the present Example, as configured above, upon varying magnification from a wide angle end state to a telephoto end state, the second lens group G2 and the third lens group G3 are moved along the optical axis toward the object side such that an interval between the first lens group G1 and the second lens group G2 is decreased and an interval between the second lens group G2 and the third lens group G3 is decreased. At this time, position of the first lens group G1 is fixed.

Further, in the variable magnification optical systems of the present Example, focusing on from an infinite distance object to a close distance object is conducted by moving the first focusing group GN in the first lens group G1 along the optical axis toward the image side and by moving the second focusing group GP along the optical axis toward the object side.

In Table 5 below, various values of the variable magnification optical systems of the present Example are listed.

TABLE 5

Fifth Example

[Surface Data]

| Surface number | r | d | nd | νd |
|---|---|---|---|---|
| Object surface | ∞ | | | |
| 1 | ∞ | 4.383 | 1.67000 | 57.35 |
| 2 | −120.3492 | 0.200 | | |
| 3 | 123.8392 | 8.775 | 1.60300 | 65.44 |
| 4 | −57.5144 | 1.000 | 1.80518 | 25.45 |
| 5 | −2068.4328 | 0.200 | | |
| 6 | 59.4372 | 5.265 | 1.74400 | 44.81 |
| 7 | 346.5097 | Variable | | |
| 8 | −73.6296 | 1.000 | 1.61800 | 63.34 |
| 9 | 58.0987 | 2.119 | | |
| 10 | 803.3224 | 4.248 | 1.84666 | 23.78 |
| 11 | −56.0849 | 0.254 | | |
| 12 | −117.3915 | 1.000 | 1.80400 | 46.60 |
| 13 | 71.0633 | Variable | | |
| 14 | 206.0658 | 6.366 | 1.60300 | 65.44 |
| 15 | −22.2088 | 2.540 | 1.85026 | 32.35 |
| 16 | −33.7361 | Variable | | |
| 17 (Stop S) | ∞ | 3.484 | | |
| 18 | −38.6007 | 3.316 | 1.84666 | 23.78 |
| 19 | −23.0383 | 1.000 | 1.65844 | 50.84 |
| 20 | 77.7892 | Variable | | |
| 21 | 70.1660 | 7.673 | 1.59319 | 67.90 |
| 22 | −27.8116 | 1.000 | 1.62588 | 35.72 |
| 23 | −118.2774 | 2.629 | | |
| 24 | 89.1486 | 10.125 | 1.65844 | 50.84 |
| 25 | −41.4146 | 1.000 | 1.83400 | 37.18 |
| 26 | −199.0265 | Variable | | |
| 27 | 29563.4400 | 5.025 | 1.80518 | 25.45 |
| 28 | −60.0038 | 3.335 | | |
| 29 | −49.7969 | 1.000 | 1.72342 | 38.03 |
| 30 | 56.3390 | BF | | |
| Image plane | ∞ | | | |

[Various Data]
Variable magnification ratio 1.50

| | W | T |
|---|---|---|
| f | 110.01 | 165.27 |
| FNO | 3.85 | 5.79 |

TABLE 5-continued

Fifth Example

| | | |
|---|---|---|
| 2ω | 22.72° | 14.72° |
| Ymax | 21.60 | 21.60 |
| TL | 191.80 | 191.80 |
| BF | 38.53 | 79.34 |

| | W INF | T INF | W INT | T INT | W CLO | T CLO |
|---|---|---|---|---|---|---|
| β | 0 | 0 | −0.333 | −0.500 | −0.666 | −1.000 |
| d0 | ∞ | ∞ | 378.377 | 378.377 | 216.407 | 216.407 |
| d7 | 3.227 | 3.227 | 11.494 | 11.494 | 19.674 | 19.674 |
| d13 | 25.519 | 25.519 | 14.193 | 14.193 | 2.986 | 2.986 |
| d16 | 1.000 | 1.000 | 4.059 | 4.059 | 7.086 | 7.086 |
| d20 | 30.204 | 2.790 | 30.204 | 2.790 | 30.204 | 2.790 |
| d26 | 16.382 | 2.997 | 16.382 | 2.997 | 16.382 | 2.997 |

[Lens Group data]

| Group | Starting surface | f |
|---|---|---|
| 1 | 1 | −417.315 |
| 2 | 21 | 52.315 |
| 3 | 27 | −78.759 |

[Values for Conditional Expressions]

(1-1) (−f1)/f2 = 7.977
(1-2) (−fN)/fP = 0.800
(1-3) (−fR)/fw = 0.716
(1-4) f2/(−f3) = 0.664
(2-1) (−f1)/f11 = 7.228
(2-2) (−fN)/fP = 0.800
(2-3) f2/(−f3) = 0.664

Figure 20A:
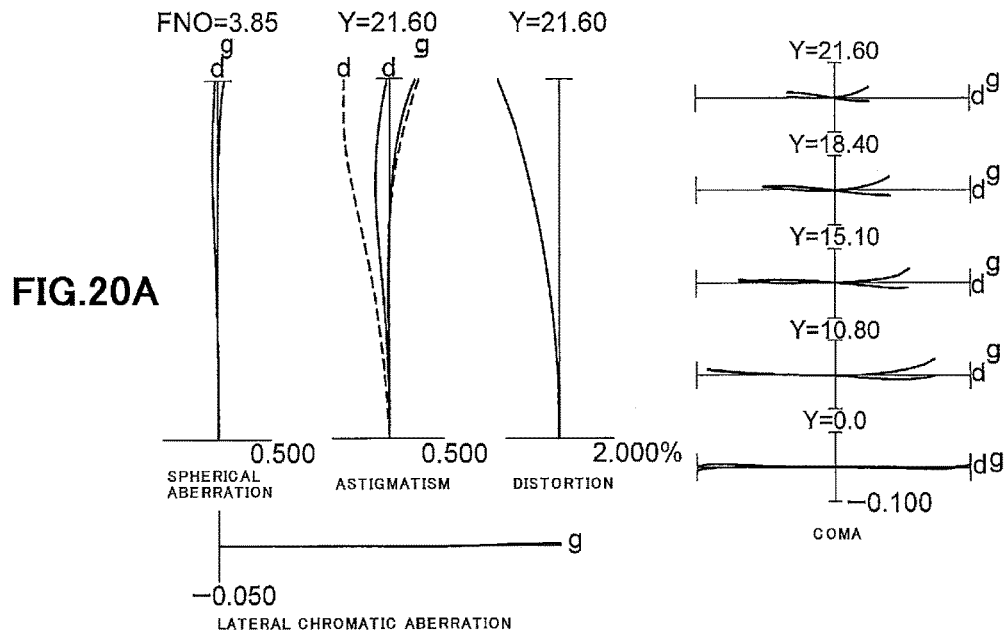
Figure 20B:
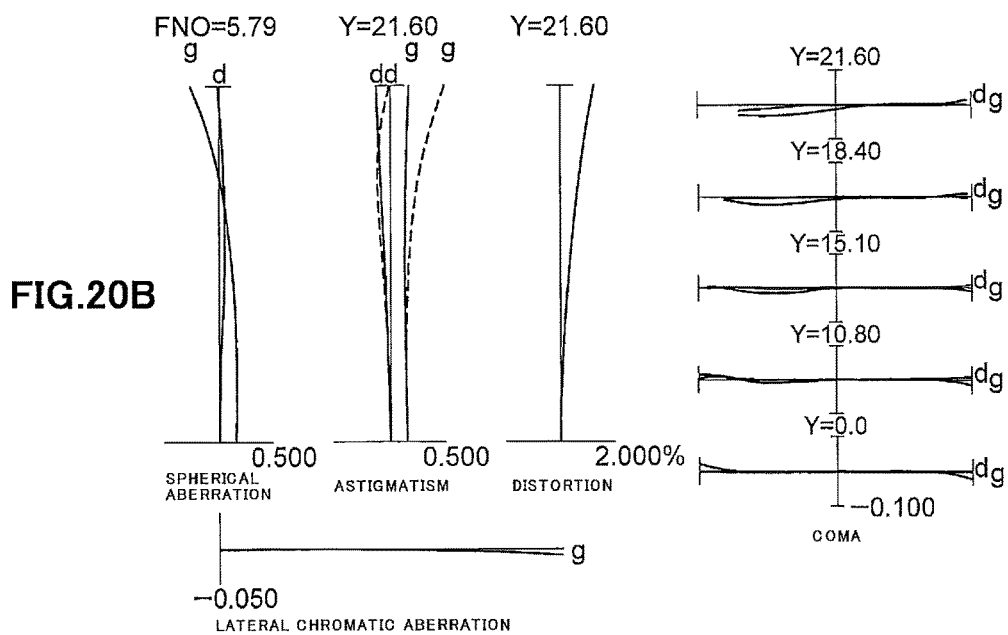

FIGS. 20A and 20B are graphs showing various aberrations of the variable magnification optical system according to the Fifth Example of the present application upon focusing on an infinite distance object in the wide-angle end state and in the telephoto end state.

Figure 21A:
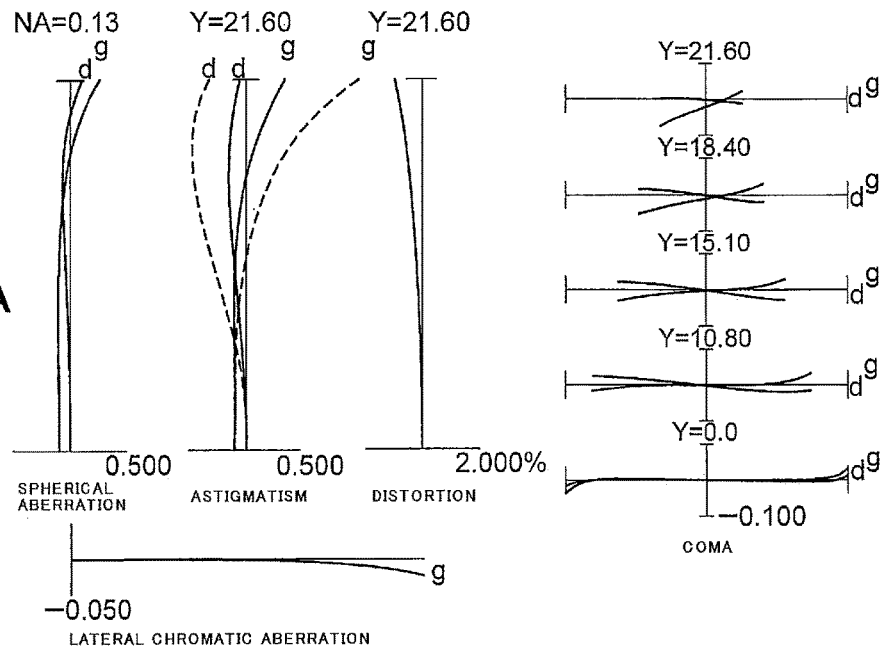
Figure 21B:
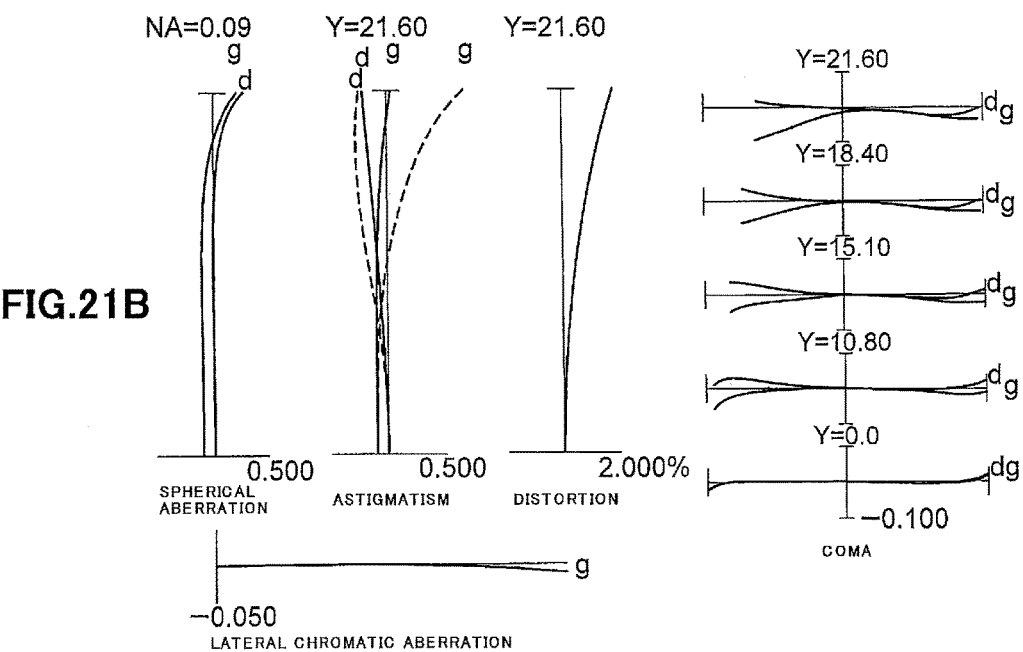

FIGS. 21A and 21B are graphs showing various aberrations of the variable magnification optical system according to the Fifth Example of the present application upon focusing on an intermediate distance object in the wide-angle end state and in the telephoto end state, respectively.

Figure 22A:
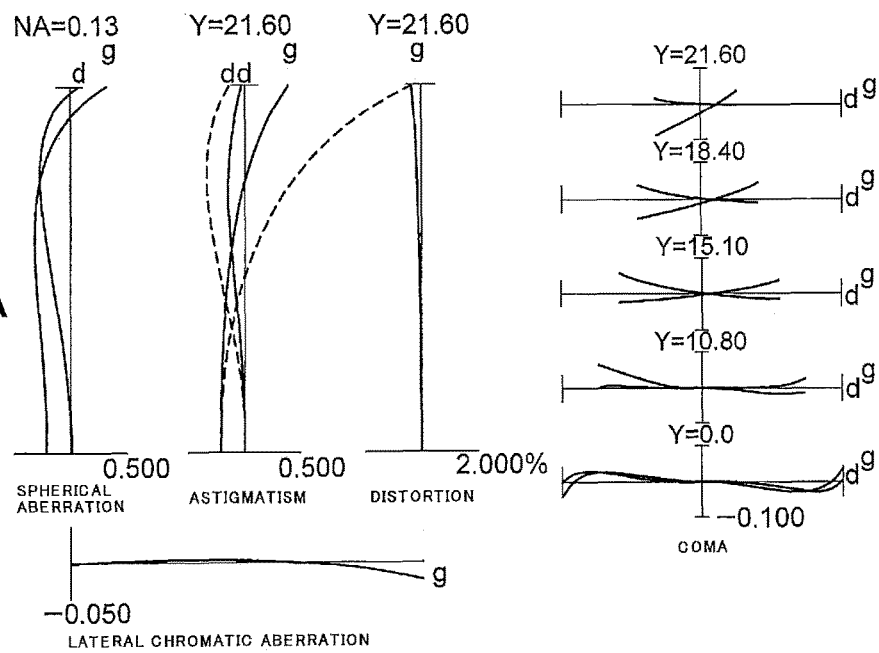
Figure 22B:
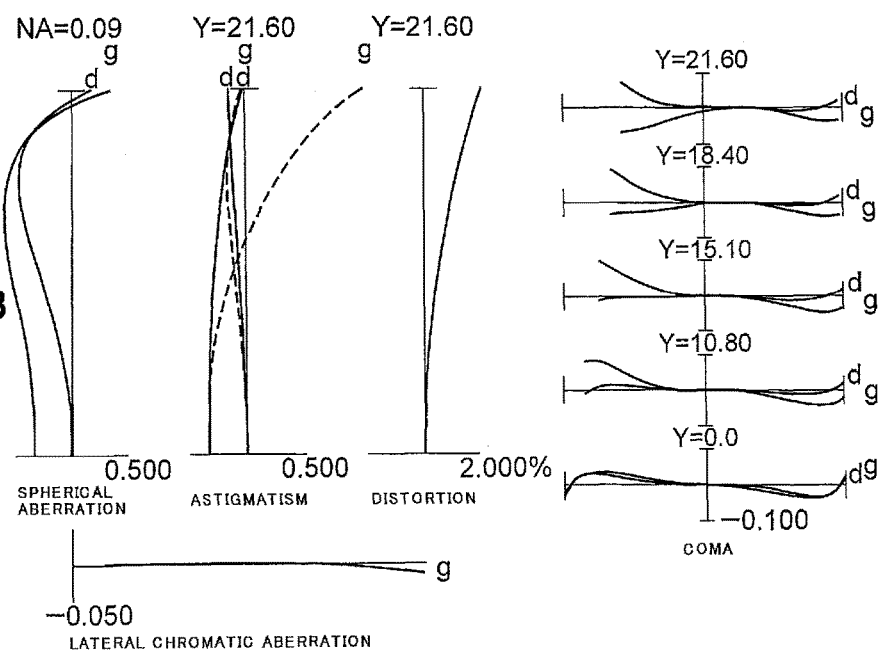

FIGS. 22A and 22B are graphs showing various aberrations of the variable magnification optical system according to the Fifth Example of the present application upon focusing on a close distance object in the wide-angle end state and in the telephoto end state, respectively.

As is apparent from the respective graphs, the variable magnification optical system according to the present Example shows a superb optical performance from upon focusing an infinite distance object to upon focusing on a close distance object.

Sixth Example

Figure 23:
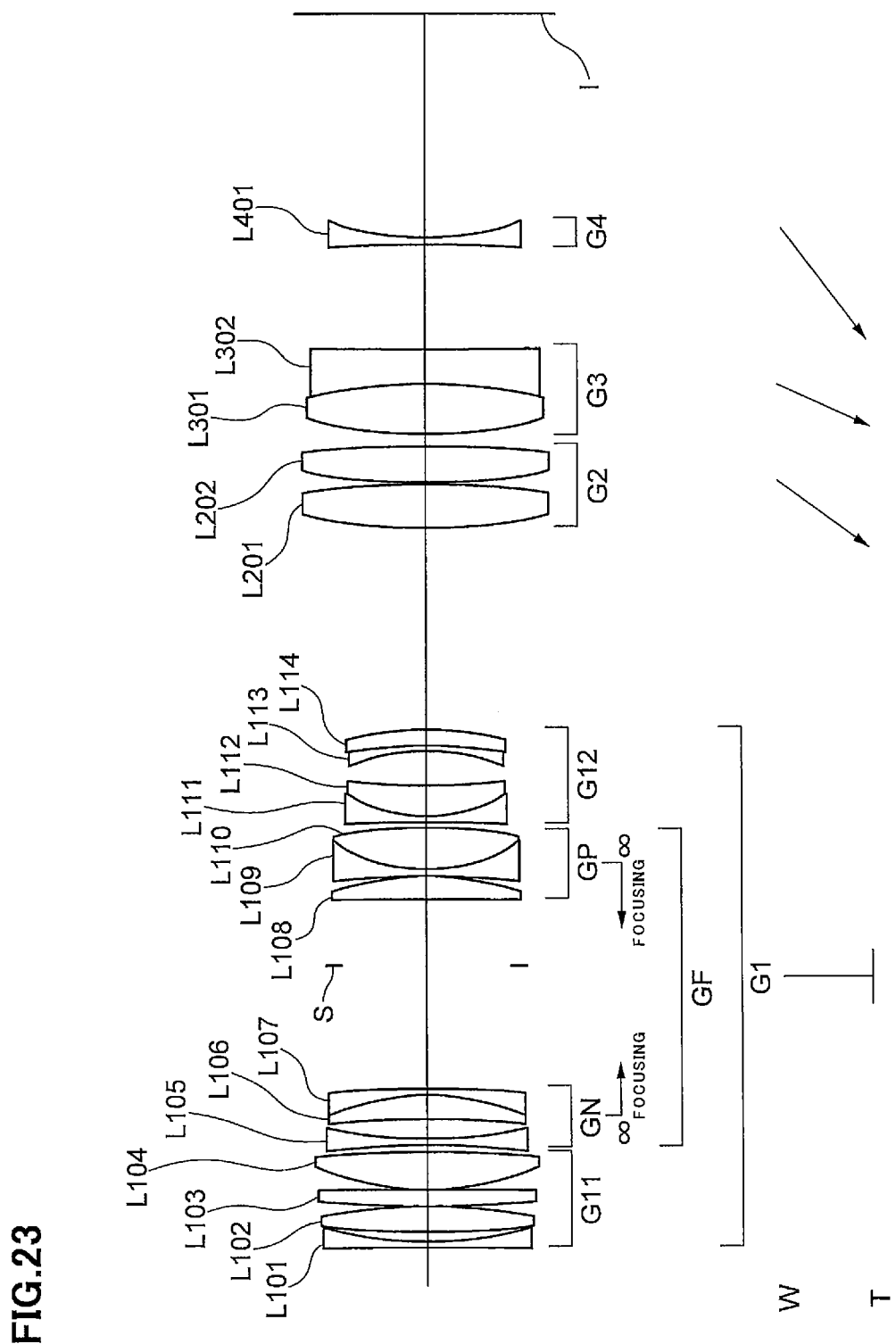
FIG. 23 is a sectional view showing a configuration of a variable magnification optical system in the wide angle end state according to a Sixth Example of the first embodiment of the present application.

FIG. 23 is a sectional view showing a variable magnification optical system according to the Sixth Example of the first embodiment of the present application, in a wide-angle end state.

The variable magnification optical system according to the present Example, is composed of, in order from an object side, a first lens group G1 having negative refractive power, a second lens group G2 having positive refractive power, a third lens group G3 having positive refractive power and a fourth lens group G4 having negative refractive power.

The first lens group G1 consists of, in order from the object side, a first fixed lens group G11 having positive refractive power, a focusing lens group GF having positive refractive power, and a second fixed lens group G12 having negative refractive power.

The first fixed lens group G11 consists of, in order from the object side, a plano-concave negative lens L101 having a concave surface facing the image side, a double convex positive lens L102, a positive meniscus lens L103 having a convex surface facing the object side, and a double convex positive lens L104.

The focusing lens group GF consists of, in order from the object side, a first focusing group GN having negative refractive power, an aperture stop S and a second focusing group GP having positive refractive power.

The first focusing group GN consists of, in order from the object side, a double concave negative lens L105, a cemented positive lens constructed by a positive meniscus lens L106 having a concave surface facing the object side cemented with a negative meniscus lens L107 having a concave surface facing the object side.

The second focusing group GP consists of, in order from the object side, a plano-convex positive lens L108 having a convex surface facing the image side, and a cemented positive lens constructed by a double concave negative lens L109 cemented with a double convex positive lens L110.

The second fixed lens group G12 consists of, in order from the object side, a cemented negative lens constructed by a double concave negative lens L111 cemented with a positive meniscus lens L112 having a convex surface facing the object side and a cemented negative lens constructed by a negative meniscus lens L113 having a concave surface facing the object side cemented with a positive meniscus lens L114 having a concave surface facing the object side.

The second lens group G2 consists of, in order from the object side, a double convex positive lens L201 and a double convex positive lens L202.

The third lens group G3 consists of, in order from the object side, a cemented positive lens constructed by a double convex positive lens L301 and a double concave negative lens L302.

The fourth lens group G4 consists of a double concave negative lens L401.

In the variable magnification optical systems of the present Example, as configured above, upon varying magnification from a wide angle end state to a telephoto end state, the second lens group G2, the third lens group G3 and the fourth lens group G4 are moved along the optical axis toward the object side such that an interval between the first lens group G1 and the second lens group G2 is decreased, an interval between the second lens group G2 and the third lens group G3 is increased and an interval between the third lens group G3 and the fourth lens group G4 is decreased. At this time, position of the first lens group G1 is fixed.

Further, in the variable magnification optical systems of the present Example, focusing from an infinite distance object to a close distance object is conducted by moving the first focusing group GN in the first lens group G1 along the optical axis toward the image side and by moving the second focusing group GP along the optical axis toward the object side.

In Table 6 below, various values of the variable magnification optical systems of the present Example are listed.

TABLE 6

Sixth Example

[Surface Data]

| Surface number | r | d | nd | vd |
|---|---|---|---|---|
| Object surface | ∞ | | | |
| 1 | ∞ | 1.000 | 1.85026 | 32.35 |
| 2 | 56.8883 | 1.649 | | |
| 3 | 124.9181 | 4.379 | 1.60300 | 65.44 |
| 4 | −127.8506 | 0.200 | | |
| 5 | 171.7477 | 2.744 | 1.69680 | 55.52 |
| 6 | 840.2199 | 0.200 | | |
| 7 | 46.5273 | 6.562 | 1.58913 | 61.22 |
| 8 | −246.7529 | Variable | | |
| 9 | −170.8435 | 1.000 | 1.74950 | 35.25 |
| 10 | 64.7889 | 3.527 | | |
| 11 | −252.2897 | 4.446 | 1.84666 | 23.78 |
| 12 | −44.8697 | 1.000 | 1.61772 | 49.81 |
| 13 | −294.6484 | Variable | | |
| 14 (Stop S) | ∞ | Variable | | |
| 15 | ∞ | 3.920 | 1.71300 | 53.96 |
| 16 | −57.5145 | 0.200 | | |
| 17 | −133.5302 | 1.000 | 1.74950 | 35.25 |
| 18 | 26.3766 | 7.203 | 1.72916 | 54.61 |
| 19 | −110.0333 | Variable | | |
| 20 | −305.2666 | 1.000 | 1.80610 | 40.97 |
| 21 | 23.4577 | 5.326 | 1.80518 | 25.45 |
| 22 | 79.5177 | 6.154 | | |
| 23 | −36.1917 | 1.000 | 1.56883 | 56.00 |
| 24 | −90.6448 | 2.774 | 1.84666 | 23.78 |
| 25 | −60.2418 | Variable | | |
| 26 | 85.1915 | 7.561 | 1.51680 | 63.88 |
| 27 | −167.4670 | 0.200 | | |
| 28 | 99.8163 | 6.384 | 1.48749 | 70.31 |
| 29 | −243.9644 | Variable | | |
| 30 | 69.8943 | 8.734 | 1.48749 | 70.31 |
| 31 | −95.2187 | 5.940 | 1.84666 | 23.78 |

TABLE 6-continued

Sixth Example

| 32 | 516.9219 | Variable | | |
|---|---|---|---|---|
| 33 | −267.7912 | 1.000 | 1.69680 | 55.52 |
| 34 | 42.0797 | BF | | |
| Image plane | ∞ | | | |

[Various Data]
Variable magnification ratio 1.49

| | W | T |
|---|---|---|
| f | 119.18 | 177.38 |
| FNO | 3.95 | 5.89 |
| 2ω | 20.54° | 13.66° |
| Ymax | 21.60 | 21.60 |
| TL | 213.72 | 213.72 |
| BF | 38.52 | 78.60 |

| | W INF | T INF | W INT | T INT | W CLO | T CLO |
|---|---|---|---|---|---|---|
| β | 0 | 0 | −0.336 | −0.500 | −0.672 | −1.000 |
| d0 | ∞ | ∞ | 394.838 | 394.838 | 221.194 | 221.194 |
| d8 | 1.225 | 1.225 | 11.420 | 11.420 | 21.911 | 21.911 |
| d13 | 21.864 | 21.864 | 11.668 | 11.668 | 1.177 | 1.177 |
| d14 | 11.373 | 11.373 | 6.275 | 6.275 | 1.030 | 1.030 |
| d19 | 1.000 | 1.000 | 6.098 | 6.098 | 11.343 | 11.343 |
| d25 | 34.553 | 2.000 | 34.553 | 2.000 | 34.553 | 2.000 |
| d29 | 2.000 | 9.140 | 2.000 | 9.140 | 2.000 | 9.140 |
| d32 | 18.080 | 3.422 | 18.080 | 3.422 | 18.080 | 3.422 |

[Lens Group data]

| Group | Starting surface | f |
|---|---|---|
| 1 | 1 | −1958.635 |
| 2 | 26 | 64.093 |
| 3 | 30 | 554.333 |
| 4 | 33 | −52.120 |

[Values for Conditional Expressions]

(1-1) (−f1)/f2 = 30.559
(1-2) (−fN)/fP = 1.077
(1-3) (−fR)/fw = 0.437

Figure 24A:
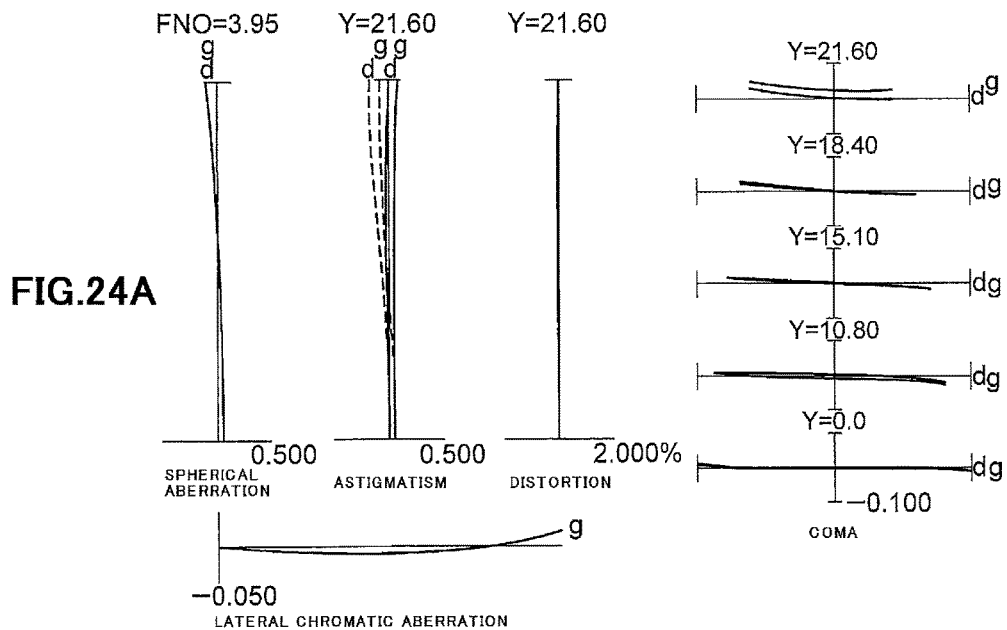
Figure 24B:
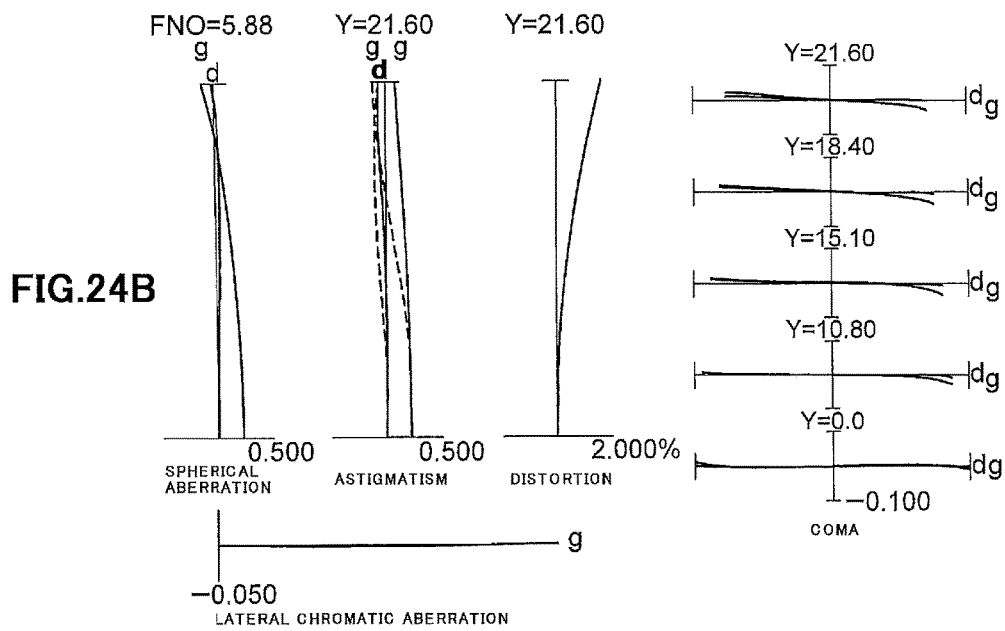

FIGS. 24A and 24B are graphs showing various aberrations of the variable magnification optical system according to the Sixth Example of the present application upon focusing on an infinite distance object in the wide-angle end state and in the telephoto end state.

Figure 25A:
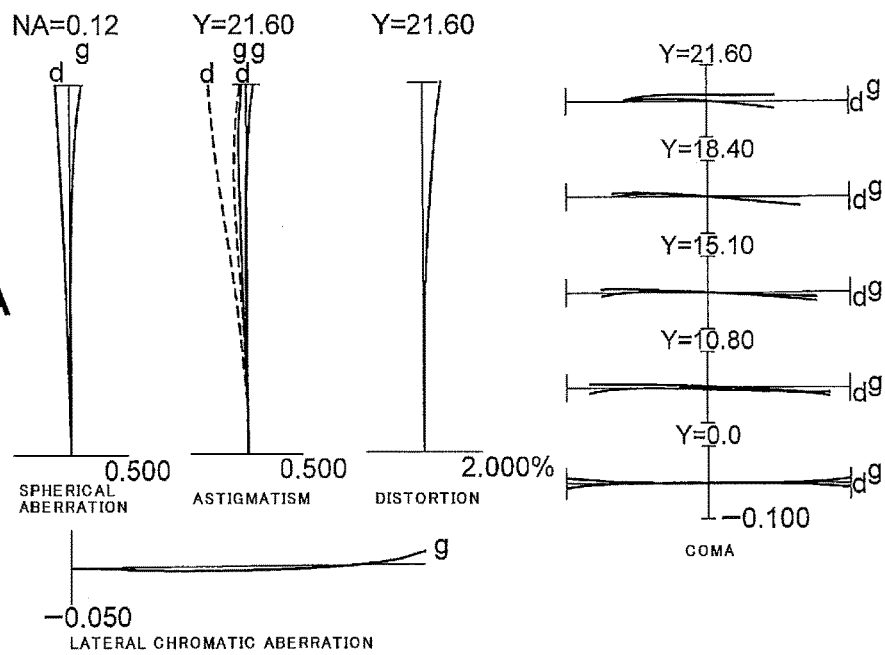
Figure 25B:
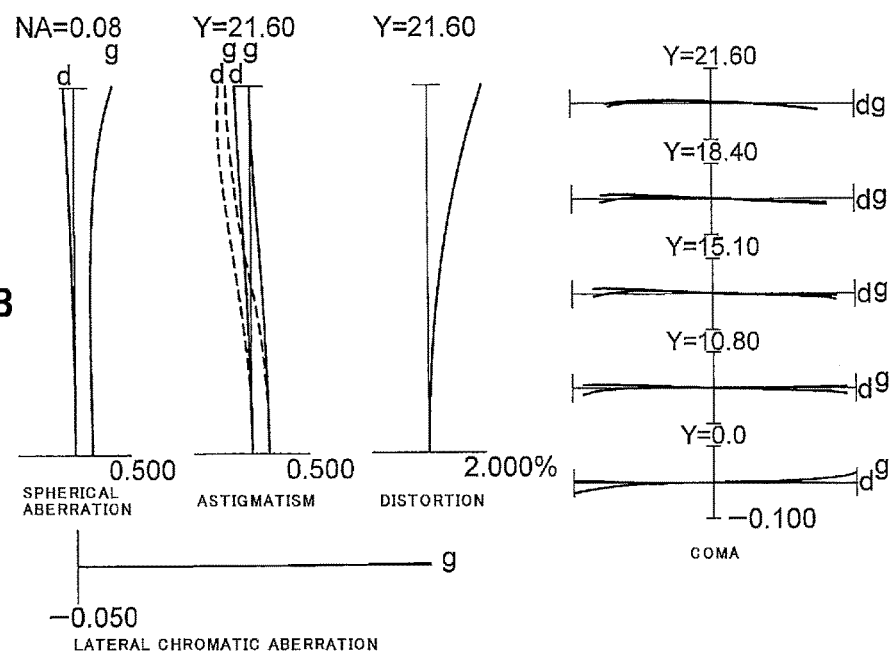

FIGS. 25A and 25B are graphs showing various aberrations of the variable magnification optical system according to the Sixth Example of the present application upon focusing on an intermediate distance object in the wide-angle end state and in the telephoto end state, respectively.

Figure 26A:
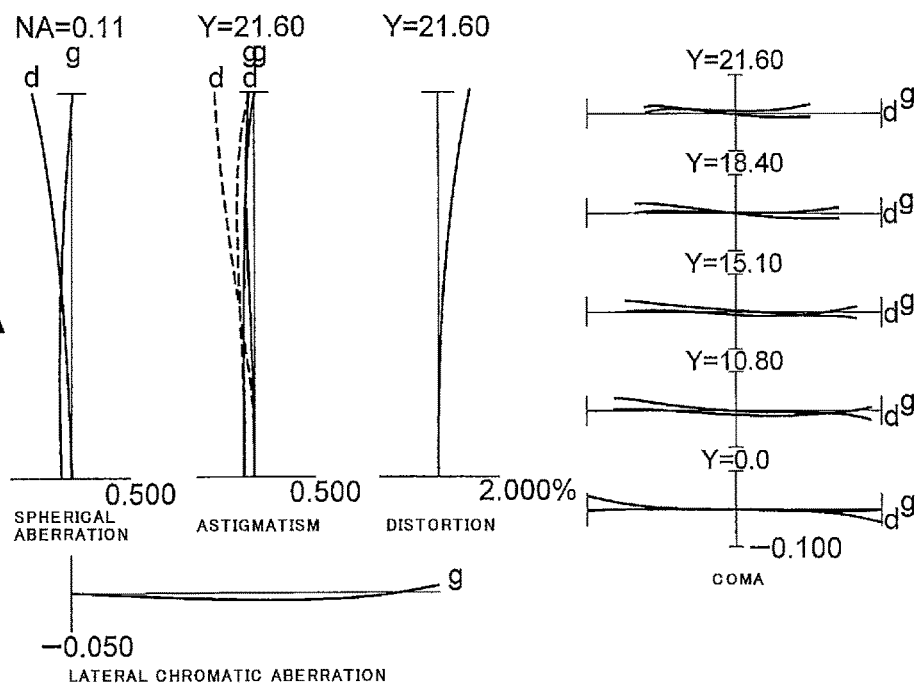
Figure 26B:
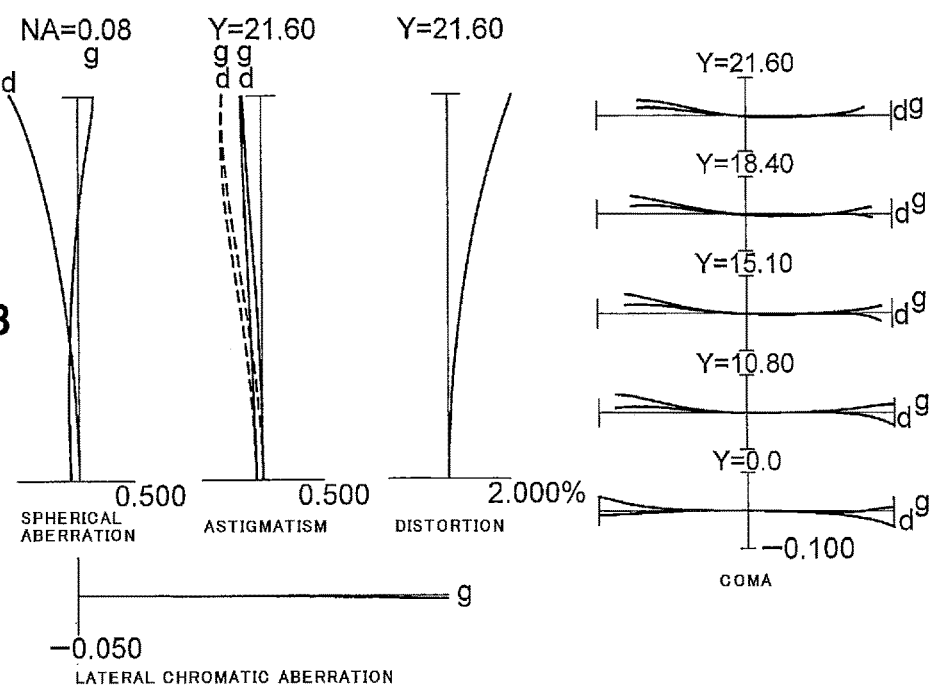

FIGS. 26A and 26B are graphs showing various aberrations of the variable magnification optical system according to the Sixth Example of the present application upon focusing on a close distance object in the wide-angle end state and in the telephoto end state, respectively.

As is apparent from the respective graphs, the variable magnification optical system according to the present Example shows a superb optical performance from upon focusing an infinite distance object to upon focusing on a close distance object.

Seventh Example

FIG. 27 is a sectional view showing a variable magnification optical system according to the Seventh Example of the first embodiment of the present application, in a wide-angle end state.

The variable magnification optical system according to the present Example, is composed of, in order from an object side, a first lens group G1 having negative refractive power, a second lens group G2 having positive refractive power, a third lens group G3 having positive refractive power and a fourth lens group G4 having negative refractive power.

The first lens group G1 consists of, in order from the object side, a first fixed lens group G11 having positive refractive power, a focusing lens group GF having positive refractive power, and a second fixed lens group G12 having negative refractive power.

The first fixed lens group G11 consists of, in order from the object side, a plano-concave negative lens L101 having a concave surface facing the image side, a double convex positive lens L102, a double convex positive lens L103 having a convex surface facing the object side, and a double convex positive lens L104.

The focusing lens group GF consists of, in order from the object side, a first focusing group GN having negative refractive power and a second focusing group GP having positive refractive power.

The first focusing group GN consists of, in order from the object side, a double concave negative lens L105, a cemented negative lens constructed by a double convex positive lens L106 cemented with a double concave negative lens L107.

The second focusing group GP consists of, in order from the object side, a positive meniscus lens L108 having a concave surface facing the object side, and a cemented positive lens constructed by a double concave negative lens L109 cemented with a double convex positive lens L110.

The second fixed lens group G12 consists of, in order from the object side, a cemented negative lens constructed by a double concave negative lens L111 cemented with a positive meniscus lens L112 having a convex surface facing the object side, an aperture stop S and a cemented negative lens constructed by a negative meniscus lens L113 having a concave surface facing the object side cemented with a positive meniscus lens L114 having a concave surface facing the object side.

The second lens group G2 consists of, in order from the object side, a double convex positive lens L201 and a double convex positive lens L202.

The third lens group G3 consists of, in order from the object side, a cemented positive lens constructed by a double convex positive lens L301 and a double concave negative lens L302.

The fourth lens group G4 consists of a negative meniscus lens L401 having a convex surface facing the object side.

In the variable magnification optical systems of the present Example, as configured above, upon varying magnification from a wide angle end state to a telephoto end state, the second lens group G2, the third lens group G3 and the fourth lens group G4 are moved along the optical axis toward the object side such that an interval between the first lens group G1 and the second lens group G2 is decreased, an interval between the second lens group G2 and the third lens group G3 is increased and an interval between the third lens group G3 and the fourth lens group G4 is decreased. At this time, position of the first lens group G1 is fixed.

Further, in the variable magnification optical systems of the present Example, focusing from an infinite distance object to a close distance object is conducted by moving the first focusing group GN in the first lens group G1 along the optical axis toward the image side and by moving the second focusing group GP along the optical axis toward the object side.

In Table 7 below, various values of the variable magnification optical systems of the present Example are listed.

TABLE 7

Seventh Example

[Surface Data]

| Surface number | r | d | nd | vd |
|---|---|---|---|---|
| Object surface | ∞ | | | |
| 1 | ∞ | 1.000 | 1.84666 | 23.78 |
| 2 | 65.7156 | 2.408 | | |
| 3 | 133.1096 | 6.347 | 1.60300 | 65.44 |
| 4 | −123.5925 | 0.200 | | |
| 5 | 132.9251 | 4.230 | 1.61800 | 63.34 |
| 6 | −4863.7382 | 0.200 | | |
| 7 | 49.2419 | 8.193 | 1.59319 | 67.90 |
| 8 | −1419.3583 | Variable | | |
| 9 | −360.7282 | 1.000 | 1.80400 | 46.60 |
| 10 | 67.2891 | 0.984 | | |
| 11 | 98.3174 | 5.536 | 1.84666 | 23.78 |
| 12 | −80.3928 | 1.000 | 1.67003 | 47.14 |
| 13 | 57.3075 | Variable | | |
| 14 | −1099.7948 | 2.910 | 1.74320 | 49.26 |
| 15 | −117.8300 | 0.491 | | |
| 16 | −335.2753 | 1.000 | 1.74950 | 35.25 |
| 17 | 29.7653 | 8.235 | 1.73400 | 51.51 |
| 18 | −59.6194 | Variable | | |
| 19 | −410.0361 | 1.000 | 1.80400 | 46.60 |
| 20 | 25.6785 | 4.226 | 1.80518 | 25.45 |
| 21 | 67.4218 | 3.042 | | |
| 22 (Stop S) | ∞ | 3.998 | | |
| 23 | −34.6979 | 1.000 | 1.54072 | 46.97 |
| 24 | −106.2485 | 2.595 | 1.83400 | 37.18 |
| 25 | −62.3688 | Variable | | |
| 26 | 102.3629 | 5.273 | 1.60300 | 65.44 |
| 27 | −190.8223 | 0.765 | | |

TABLE 7-continued

Seventh Example

| | | | | |
|---|---|---|---|---|
| 28 | 97.0702 | 4.965 | 1.51680 | 63.88 |
| 29 | −516.8391 | Variable | | |
| 30 | 90.0120 | 6.672 | 1.60300 | 65.44 |
| 31 | −89.3631 | 1.000 | 1.84666 | 23.78 |
| 32 | 476.1681 | Variable | | |
| 33 | 960.7503 | 1.000 | 1.74400 | 44.81 |
| 34 | 45.9732 | BF | | |
| Image plane | ∞ | | | |

[Various Data]
Variable magnification ratio 1.50

| | W | T |
|---|---|---|
| f | 115.10 | 172.35 |
| FNO | 3.89 | 5.82 |
| 2ω | 21.52° | 14.10° |
| Ymax | 21.60 | 21.60 |
| TL | 213.33 | 213.33 |
| BF | 38.80 | 83.53 |

| | W INF | T INF | W INT | T INT | W CLO | T CLO |
|---|---|---|---|---|---|---|
| β | 0 | 0 | −0.334 | −0.500 | −0.668 | −1.000 |
| d0 | ∞ | ∞ | 382.821 | 382.821 | 215.475 | 215.475 |
| d8 | 1.358 | 1.358 | 9.848 | 9.848 | 18.392 | 18.392 |
| d13 | 30.568 | 30.568 | 17.068 | 17.068 | 3.483 | 3.483 |
| d18 | 1.000 | 1.000 | 6.010 | 6.010 | 11.050 | 11.050 |
| d25 | 36.928 | 2.000 | 36.928 | 2.000 | 36.928 | 2.000 |
| d29 | 2.861 | 12.520 | 2.861 | 12.520 | 2.861 | 12.520 |
| d32 | 22.554 | 3.086 | 22.554 | 3.086 | 22.554 | 3.086 |

[Lens Group data]

| Group | Starting surface | f |
|---|---|---|
| 1 | 1 | −1741.042 |
| 2 | 26 | 66.220 |
| 3 | 30 | 430.310 |
| 4 | 33 | −64.928 |

[Values for Conditional Expressions]

(1-1) (−f1)/f2 = 26.292
(1-2) (−fN)/fP = 0.982
(1-3) (−fR)/fw = 0.564

Figure 28A:
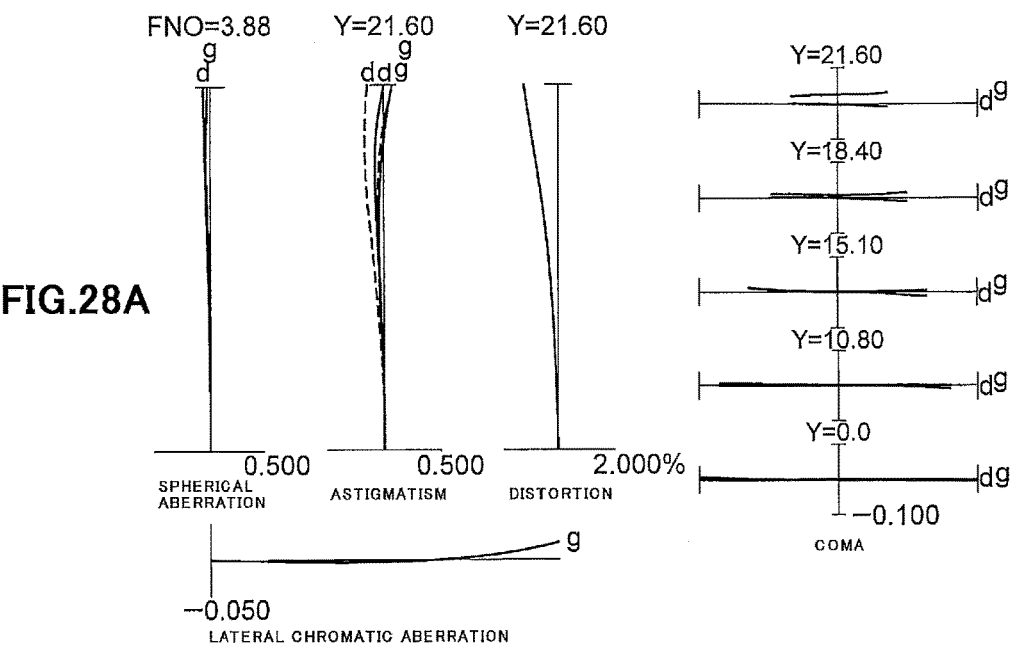
Figure 28B:
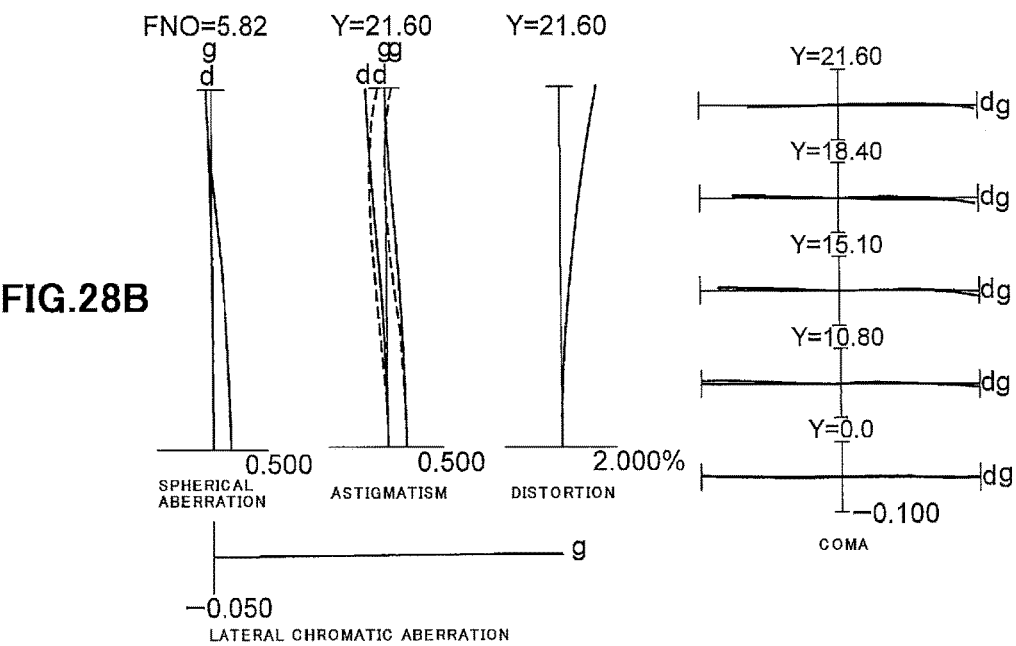

FIGS. 28A and 28B are graphs showing various aberrations of the variable magnification optical system according to the Seventh Example of the present application upon focusing on an infinite distance object in the wide-angle end state and in the telephoto end state.

Figure 29A:
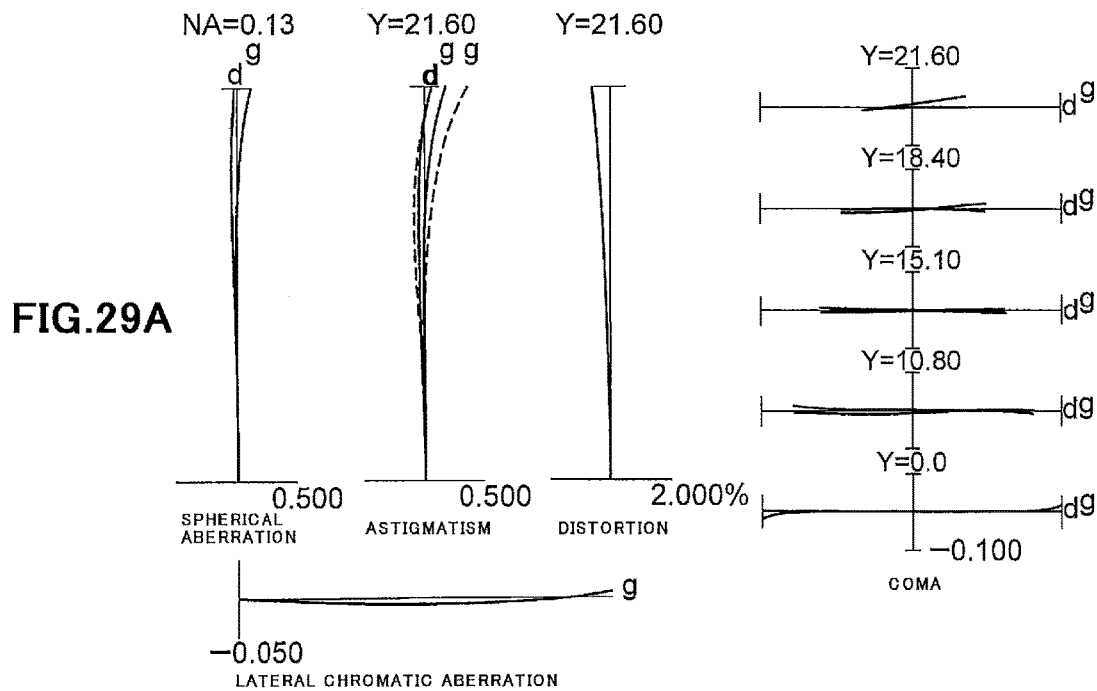
Figure 29B:
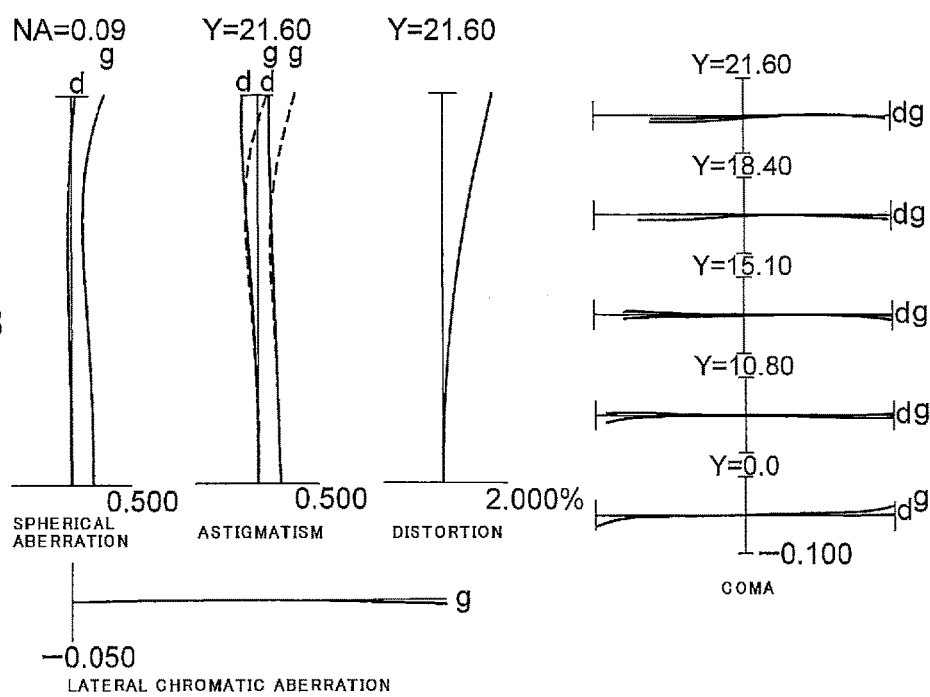

FIGS. 29A and 29B are graphs showing various aberrations of the variable magnification optical system according to the Seventh Example of the present application upon focusing on an intermediate distance object in the wide-angle end state and in the telephoto end state, respectively.

Figure 30A:
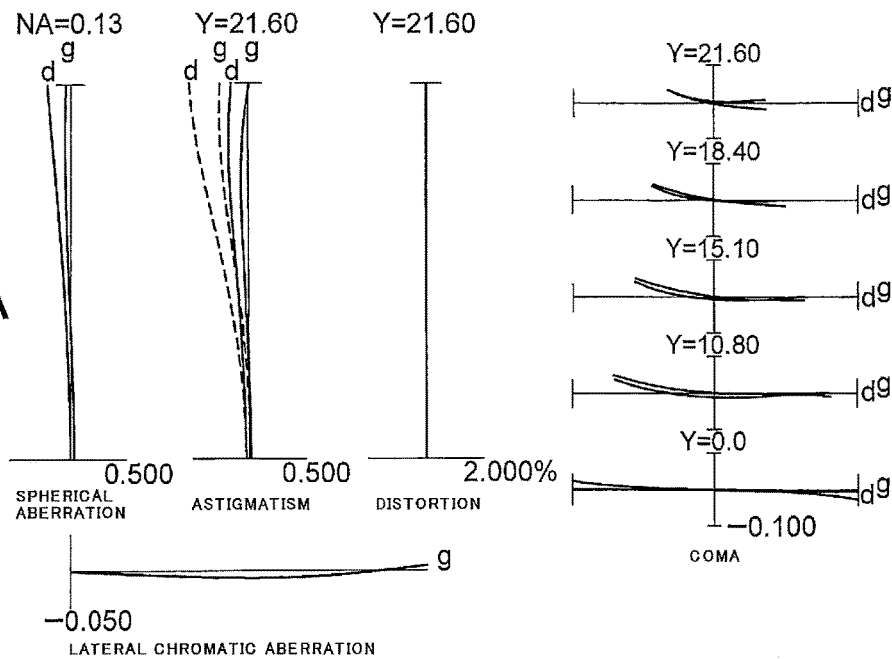
Figure 30B:
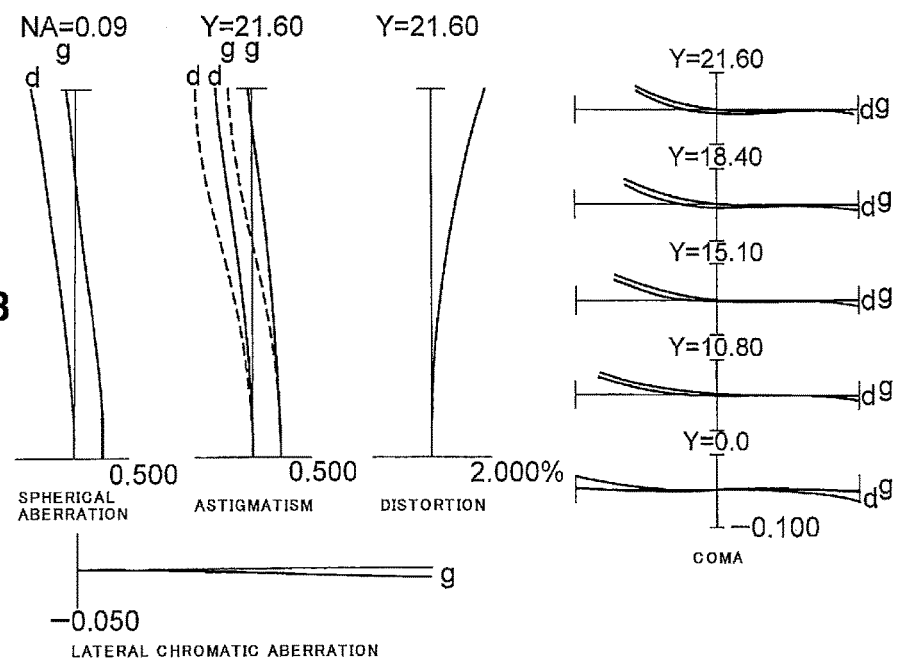

FIGS. 30A and 30B are graphs showing various aberrations of the variable magnification optical system according to the Seventh Example of the present application upon focusing on a close distance object in the wide-angle end state and in the telephoto end state, respectively.

As is apparent from the respective graphs, the variable magnification optical system according to the present Example shows a superb optical performance from upon focusing on an infinite distance object to upon focusing on a close distance object.

According to the respective Examples as above-mentioned, it is possible to realize a variable magnification optical system having a superb optical performance from upon focusing on an infinite distance object to upon focusing on a close distance object.

Note that each of the above described Examples is a concrete example of the invention of the present application, and the invention of the present application is not limited to them. The contents described below can be adopted without deteriorating an optical performance of the variable magnification optical systems according to the first to the third embodiments of the present application.

Although the variable magnification optical systems, each having three as well as four group configuration were illustrated above as numerical examples of the variable magnification optical systems according to the first to the third embodiments of the present application, the present application is not limited to them and the variable magnification optical systems having other configurations (such as five group configuration, six group configuration and the like) can be configured. Concretely, a lens configuration that a lens or a lens group is added to the most object side or to the most image side of the variable magnification optical system according to the first to the third embodiments of the present application, is possible.

Further, in the variable magnification optical system according to the first to the third embodiments of the present application, a portion of a lens group, in order to carry out focusing from an infinite distance object to a close distance object, a single lens group in the entirety thereof, or a plurality of lens groups can be moved in the direction of the optical axis as a focusing lens group. It is particularly preferable that at least a portion of the first lens group is moved as the focusing lens group. The focusing lens group can be used for auto focus, and suitable for being driven by a motor for auto focus such as an ultrasonic motor.

Further, in the variable magnification optical systems according to the first to the third embodiments of the present application, any lens group in the entirety thereof or a portion thereof can be so moved, as a vibration reduction lens group, to have a component in a direction perpendicular to the optical axis, or rotationally moved (swayed) in an in-plane direction including the optical axis for conducting vibration reduction. Particularly, in the variable magnification optical systems according to the first to the third embodiments of the present application, it is preferable that at least a portion of the first lens group is used as a vibration reduction lens group.

Further, in the variable magnification optical systems according to the first to the third embodiments of the present application, a lens surface of a lens may be a spherical surface, a plane surface, or an aspherical surface. When a lens surface is a spherical surface or a plane surface, lens processing, assembling and adjustment become easy, and it is possible to prevent deterioration in optical performance caused by errors in lens processing, assembling and adjustment, so that it is preferable. Moreover, even if an image plane is shifted, deterioration in representation performance is little, so that it is preferable. When a lens surface is an aspherical surface, the aspherical surface may be fabricated by a grinding process, a glass molding process that a glass material is formed into an aspherical shape by a mold, or a compound type process that a resin material on a glass lens surface is formed into an aspherical shape. A lens surface may be a diffractive optical surface, and a lens may be a graded-index type lens (GRIN lens) or a plastic lens.

Meanwhile, in the variable magnification optical systems according to the first to the third embodiments of the present application, a 35 mm equivalent focal length is on the order of 60-80 mm, in a wide angle end state and 60-80 mm in a telephoto end state. Further, in the variable magnification optical systems according to the first to the third embodiments of the present application, the variable magnification ratio is on the order of 1.5 to 4. Furthermore, in the variable magnification optical systems according to the first to the third embodiments of the present application, a maximum shooting magnification in any focal length state is equal to or exceeds −0.5 and equal to or falls below than −1.0, and close distance shooting and varying magnification are compatible.

Next, a camera equipped with the variable magnification optical system according to the first to the third embodiments of the present application, will be explained with referring to FIG. 31.

Figure 31:
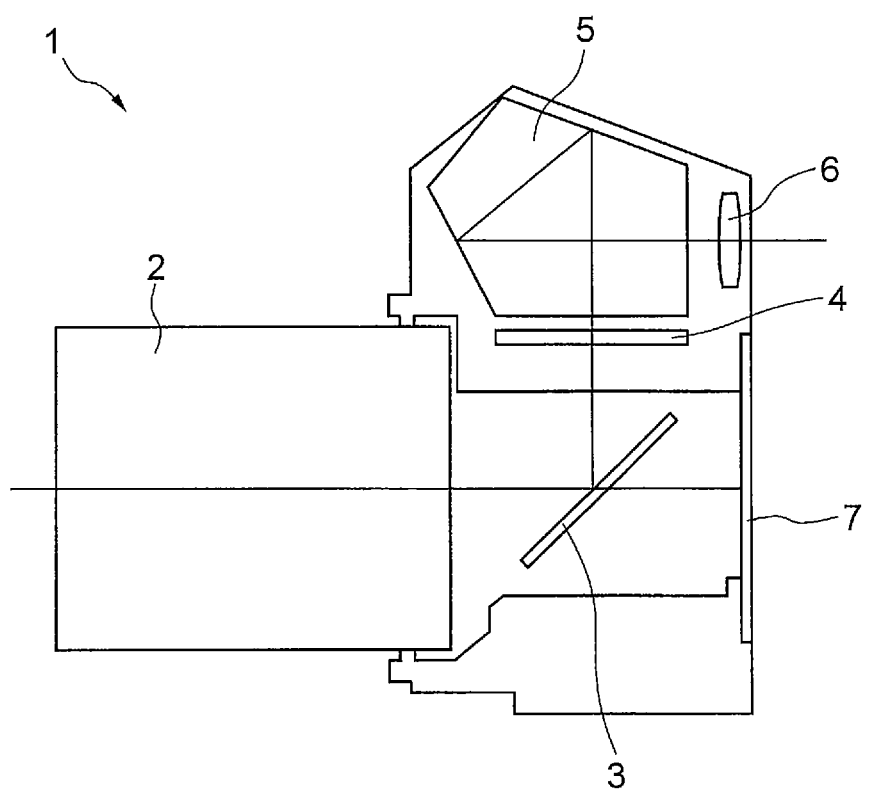
FIG. 31 is a diagram showing a construction of a camera equipped with the variable magnification optical system according to the first to the third embodiments of the present application.

FIG. 31 is a view showing a configuration of a camera equipped with the variable magnification optical system according to the first the third embodiments of the present application.

The present camera 1 is a lens interchangeable type digital camera equipped with the variable magnification optical system according to the first Example as an imaging lens 2.

In the camera 1, light emitted from an unillustrated object (an object to be imaged) is converged by the imaging lens 2, and forms an image of the object to be imaged, through a quick-return mirror 3, on a focusing plate 4. The light focused on the focusing plate is guided, after reflected a plurality of times in a pentagonal prism 5, to an eye piece 6. Thus, a photographer can observe the object image through the eye piece 6 as an elected image.

When the photographer presses an unillustrated release button, the quick return mirror is withdrawn out of the optical path, and the light from the unillustrated object is guided to an imaging device 7. Thus, the light from the object is imaged on the imaging device 7 and is stored in an unillustrated memory. Thus, the photographer can take a picture of the object to be imaged by the camera 1.

The variable magnification optical system according to the First Example mounted on the camera 1 as the imaging lens 2 has a superb optical performance from upon focusing on an infinite distance object to upon focusing on a close distance object, as described above. Accordingly, the camera 1 can realize a superb optical performance from upon focusing on an infinite distance object to upon focusing on a close distance object. Incidentally, even if the camera is so composed that the variable magnification optical system according to the Second to Seventh Examples is mounted on the camera as the imaging lens 2, the same effect can be attained as the camera 1. Moreover, the same effect as the above camera 1 is attained even in the case where the variable magnification optical system according to each of Examples as described, is mounted on a camera having a configuration having no quick return mirror.

Figure 32:
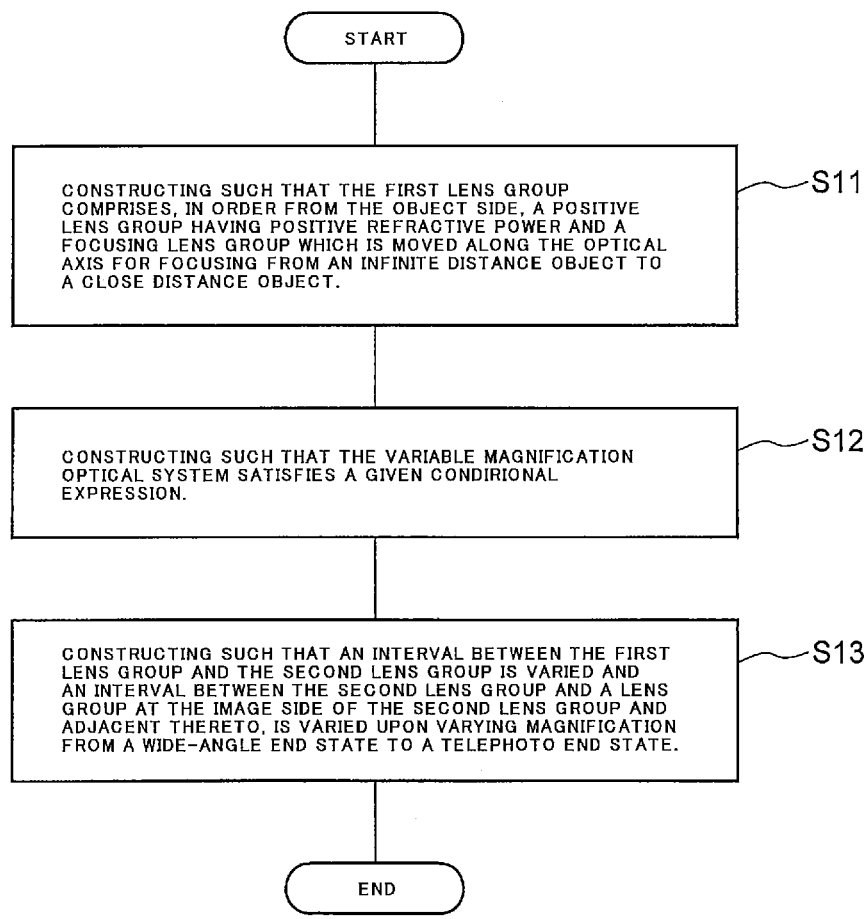
FIG. 32 is a flowchart schematically showing a method for manufacturing the variable magnification optical system according to the first embodiment of the present application.
Figure 33:
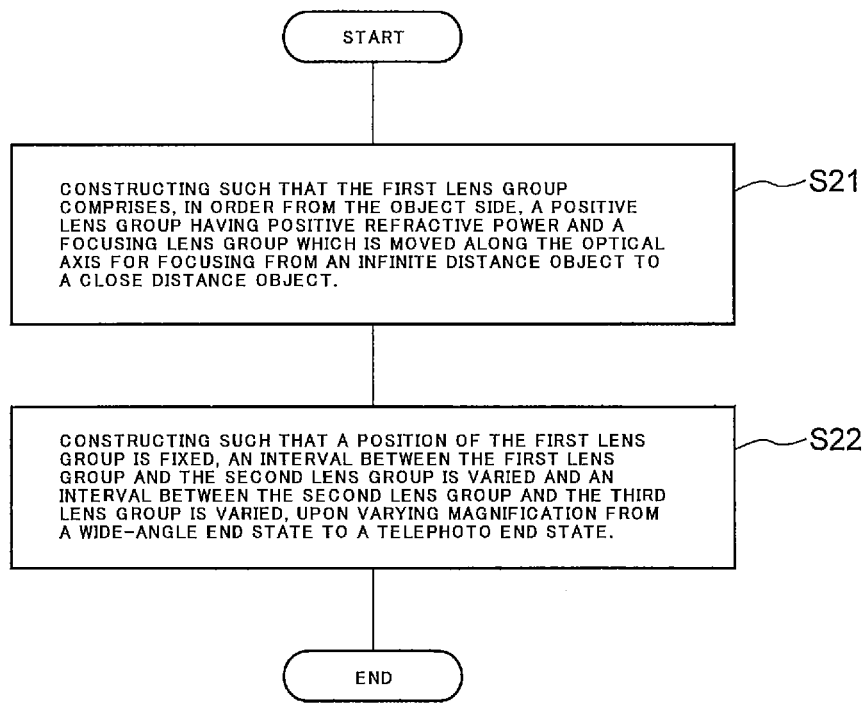
FIG. 33 is a flowchart schematically showing a method for manufacturing the variable magnification optical system according to the second embodiment of the present application.
Figure 34:
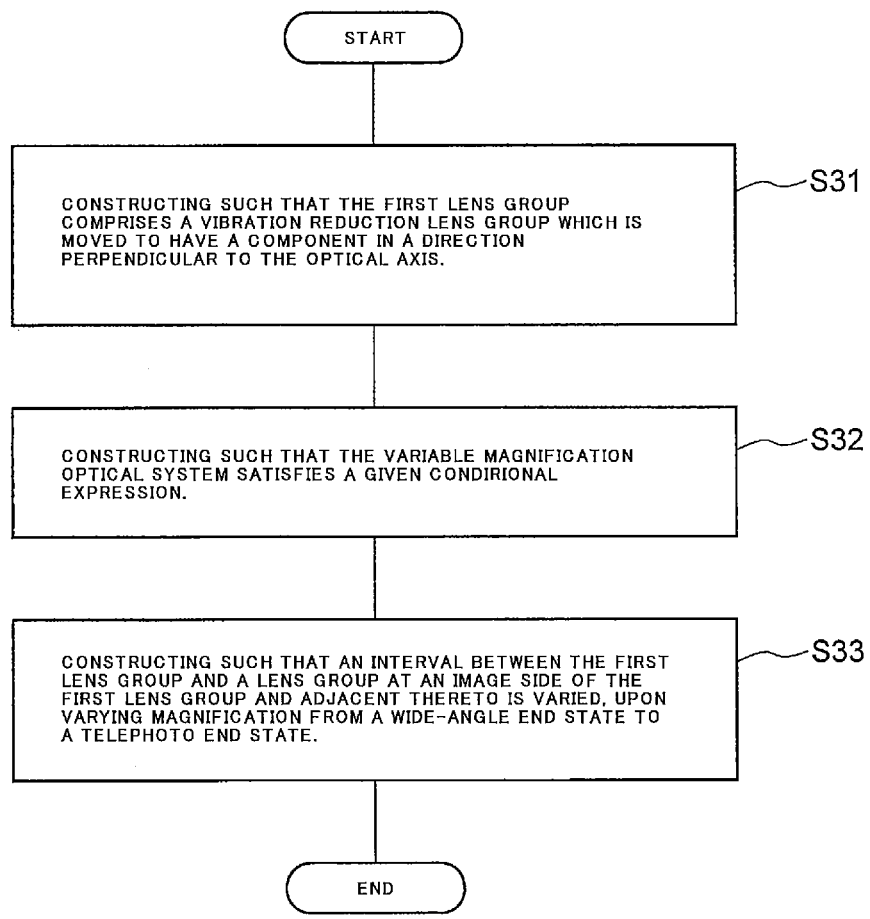
FIG. 34 is a flowchart schematically showing a method for manufacturing the variable magnification optical system according to the third embodiment of the present application.

Finally, an outline of a method for manufacturing a variable magnification optical system according to the first to the third embodiments of the present application is described with referring to FIG. 32 to FIG. 34.

FIG. 32 is a view showing an outline of a method for manufacturing a variable magnification optical system according to the first embodiment of the present application.

In a method for manufacturing a variable magnification optical system according to the first embodiment of the present application, as shown in FIG. 32, the variable magnification optical system comprises, in order from an object side: a first lens group having negative refractive power, a second lens group having positive refractive power, and at least one lens group. The method comprises the following steps of S11 to S13.

Step S11: preparing the first and the second lens groups and the at least one lens groups, and constructing such that the first lens group comprises, in order from the object side, a positive lens group having positive refractive power and a focusing lens group which is moved along the optical axis for focusing from an infinite distance object to a close distance object, and arranging the respective lens groups in a lens barrel in order from the object side.

Step S12: constructing such that the variable magnification optical system satisfies the following conditional expression (1-1):

$$2.00 < (-f1)/f2 < 45.00 \tag{1-1}$$

where f1 denotes a focal length of the first lens group, and f2 denotes a focal length of the second lens group.

Step S13: by providing a known movement mechanism at the lens barrel, constructing such that an interval between the first lens group and the second lens group is varied, and an interval between the second lens group and a lens group at the image side of the image side of and adjacent thereto, is varied upon varying magnification from the wide-angle end state to the telephoto end state.

Thus, the method for manufacturing the variable magnification optical system according to the first embodiment of the present application can manufacture a variable magnification optical system having a superb optical performance from upon focusing on an infinite distance object to upon focusing on a close distance object.

FIG. 33 is a view showing an outline of a method for manufacturing a variable magnification optical system according to the second embodiment of the present application.

In a method for manufacturing a variable magnification optical system according to the second embodiment of the present application, as shown in FIG. 33, the variable magnification optical system comprises, in order from an object side: a first lens group having negative refractive power, a second lens group having positive refractive power, and a third lens group having negative refractive power. The method comprises the following steps of S21 and S22.

Step S21: preparing the first to the third lens groups, and constructing such that the first lens group comprises, in order from the object side, a positive lens group having positive refractive power and a focusing lens group which is moved along the optical axis for focusing on from an infinite distance object to a close distance object, and arranging the respective lens groups in a lens barrel in order from the object side.

Step S22: by providing a known movement mechanism at the lens barrel, constructing such that a position of the first lens group is fixed, an interval between the first lens group and the second lens group is varied and an interval between the second lens group and the third lens group is varied, upon varying magnification from the wide-angle end state to the telephoto end state.

Thus, the method for manufacturing the variable magnification optical system according to the second embodiment of the present application can manufacture a variable magnification optical system having a superb optical performance from upon focusing on an infinite distance object to upon focusing on a close distance object.

FIG. 34 is a view showing an outline of a method for manufacturing a variable magnification optical system according to the third embodiment of the present application.

In a method for manufacturing a variable magnification optical system according to the third embodiment of the present application, shown in FIG. 34, the variable magnification optical system comprises, in order from an object side: a first lens group. The method comprises the following steps of S31 to S31.

Step S31: preparing the first lens group and at least one lens group, and constructing such that the first lens group comprises a vibration reduction lens group which is moved to have a component in a direction perpendicular to the optical axis, and arranging the respective lens groups in a lens barrel in order from the object side.

Step S32: constructing such that the variable magnification optical system satisfies the following conditional expression (3-1):

$$2.00 < |f1/fVR| < 50.00 \qquad (3\text{-}1)$$

where f1 denotes a focal length of the first lens group, and fVR denotes a focal length of the vibration reduction lens group.

Step S33: by providing a known movement mechanism at the lens barrel, constructing such that an interval between the first lens group and a lens group at the image side of the first lens group and adjacent thereto is varied, upon varying magnification from a wide-angle end state to a telephoto end state.

Thus, the method for manufacturing the variable magnification optical system according to the third embodiment of the present application can manufacture a variable magnification optical system having a superb optical performance from upon focusing on an infinite distance object to upon focusing on a close distance object.

What is claimed is:

1. A variable magnification optical system comprising, in order from an object side, a first lens group having negative refractive power, a second lens group having positive refractive power and at least one lens group;

upon varying magnification, an interval between the first lens group and the second lens group being varied, and an interval between the second lens group and a lens group at an image side of the second lens group and adjacent thereto being varied;

the first lens group comprising, in order from the object side, a positive lens group having positive refractive power and a focusing lens group which is moved along the optical axis for focusing; and the following conditional expression being satisfied:

$$2.00 < (-f1)/f2 < 45.00$$

where f1 denotes a focal length of the first lens group, and f2 denotes a focal length of the second lens group.

2. A variable magnification optical system according to claim 1, wherein upon varying magnification, a position of the first lens group relative to an imaging plane is fixed.

3. A variable magnification optical system according to claim 1, wherein a most image side lens group has negative refractive power.

4. A variable magnification optical system according to claim 1, wherein a most image side lens group has negative refractive power, and the following conditional expression is satisfied:

$$0.20 < (-fR)/fW < 1.60$$

where fR denotes a focal length of the most image side lens group, and fW denotes a focal length of the variable magnification optical system upon focusing on an infinite distance object at a wide angle end state.

5. A variable magnification optical system according to claim 1, wherein the first lens group further comprises a focusing lens group that is movable for focusing and at least one lens arranged at an image side of the focusing lens group.

6. A variable magnification optical system according to claim 1, wherein the following conditional expression is satisfied:

$$0.60 < |(1-\beta wvr) \cdot \beta wr| < 1.70$$

where ßwvr denotes a lateral magnification of the vibration reduction lens group at the wide angle end state, and ßwr denotes a composite lateral magnification of all lenses located at the image side of the vibration reduction lens group in the wide angle end state.

7. A variable magnification optical system according to claim 1, wherein the first lens group comprises, in order from the object side, a positive lens group having positive refractive power and a focusing lens group which is moved along the optical axis for focusing.

8. A variable magnification optical system according to claim 1, wherein the first lens group comprises, in order from the object side, a positive lens group having positive refractive power and a focusing lens group which is moved along the optical axis for focusing, and the following conditional expression is satisfied:

$$1.00 < (-f1)/f11 < 30.00$$

where f1 denotes the focal length of the first lens group, and f11 denotes a focal length of the positive lens group.

9. A variable magnification optical system according to claim 1, wherein the variable magnification optical system is provided with a first focusing group and a second focusing group, and that an interval between the first focusing group and the second focusing group is variable for focusing.

10. A variable magnification optical system according to claim 1, wherein the first lens group comprises a first focusing group and a second focusing group, and an interval between the first focusing group and the second focusing group is variable for focusing.

11. A variable magnification optical system according to claim 1, wherein the variable magnification optical system comprises a first focusing group having negative refractive power and a second focusing group having positive refractive power;

an interval between the first focusing group and the second focusing group is variable for focusing; and the following conditional expression is satisfied:

$$0.50 < (-fN)/fP < 1.80$$

where fN denotes a focal length of the first focusing group, and fP denotes a focal length of the second focusing group.

12. A variable magnification optical system according to claim 1, wherein the variable magnification optical system comprises the first lens group, a second lens group having positive refractive power and a third lens group having negative refractive power; and the following conditional expression is satisfied:

$$0.40 < f2/(-f3) < 1.20$$

where f2 denotes a focal length of the second lens group, and f3 denotes a focal length of the third lens group.

13. An optical apparatus comprising the variable magnification optical system according to claim 1.

14. A variable magnification optical system according to claim 1, wherein a shooting magnification in any focal length state is equal to or exceeds −0.5.

15. A variable magnification optical system comprising, in order from an object side, a first lens group having negative refractive power, a second lens group having positive refractive power and a third lens group having negative refractive power;

upon varying magnification, an interval between the first lens group and the second lens group being varied, an interval between the second lens group and the third lens group being varied, and a position of the first lens group relative to an imaging plane being fixed; and the first lens group comprising, in order from the object side, a positive lens group having positive refractive power and a focusing lens group which is moved along the optical axis for focusing.

16. A variable magnification optical system according to claim 15, wherein a most image side lens group has negative refractive power, and the following conditional expression is satisfied:

$$0.20 < (-fR)/fW < 1.60$$

where fR denotes a focal length of the most image side lens group, and fW denotes a focal length of the variable magnification optical system upon focusing on an infinite distance object at a wide angle end state.

17. A variable magnification optical system according to claim 15, wherein the following conditional expression is satisfied:

$$0.60 < |(1-\beta wvr) \cdot \beta wr| < 1.70$$

where ßwvr denotes a lateral magnification of the vibration reduction lens group at the wide angle end state, and ßwr denotes a composite lateral magnification of all lenses located at the image side of the vibration reduction lens group in the wide angle end state.

18. A variable magnification optical system according to claim 15, wherein the first lens group comprises, in order from the object side, a positive lens group having positive refractive power and a focusing lens group which is moved along the optical axis for focusing.

19. A variable magnification optical system according to claim 15, wherein the first lens group comprises, in order from the object side, a positive lens group having positive refractive power and a focusing lens group which is moved along the optical axis for focusing, and the following conditional expression is satisfied:

$$1.00 < (-f1)/f11 < 30.00$$

where f1 denotes the focal length of the first lens group, and f11 denotes a focal length of the positive lens group.

20. A variable magnification optical system according to claim 15, wherein the variable magnification optical system is provided with a first focusing group and a second focusing group, and that an interval between the first focusing group and the second focusing group is variable for focusing.

21. A variable magnification optical system according to claim 15, wherein the first lens group comprises a first focusing group and a second focusing group, and an interval between the first focusing group and the second focusing group is variable for focusing.

22. A variable magnification optical system according to claim 15, wherein the variable magnification optical system comprises a first focusing group having negative refractive power and a second focusing group having positive refractive power;

an interval between the first focusing group and the second focusing group is variable for focusing; and the following conditional expression is satisfied:

$$0.50 < (-fN)/fP < 1.80$$

where fN denotes a focal length of the first focusing group, and fP denotes a focal length of the second focusing group.

23. A variable magnification optical system according to claim 15, wherein
the variable magnification optical system comprises the first lens group, a second lens group having positive refractive power and a third lens group having negative refractive power; and
the following conditional expression is satisfied:

$$0.40<f2/(-f3)<1.20$$

where f2 denotes a focal length of the second lens group, and f3 denotes a focal length of the third lens group.

24. An optical apparatus comprising the variable magnification optical system according to claim 15.

25. A variable magnification optical system according to claim 15, wherein a shooting magnification in any focal length state is equal to or exceeds −0.5.

26. A variable magnification optical system comprising, in order from an object side, a first lens group having negative refractive power and at least one lens group;
upon varying magnification, an interval between the first lens group and a lens group at an image side of the first lens group and adjacent thereto being varied;
the first lens group comprising an A lens group; and
the following conditional expression being satisfied:

$$2.00<|f1/fVR|<50.00$$

where f1 denotes the focal length of the first lens group, and fVR denotes a focal length of the A lens group.

27. A variable magnification optical system according to claim 26, wherein the A lens group is a vibration reduction lens group that is moved to include a component in a direction perpendicular to the optical axis.

28. A variable magnification optical system according to claim 27, wherein
upon varying magnification, a position of the first lens group relative to an imaging plane is fixed.

29. A variable magnification optical system according to claim 27, wherein
a most image side lens group has negative refractive power.

30. A variable magnification optical system according to claim 27, wherein
a most image side lens group has negative refractive power, and
the following conditional expression is satisfied:

$$0.20<(-fR)/fW<1.60$$

where fR denotes a focal length of the most image side lens group, and fW denotes a focal length of the variable magnification optical system upon focusing on an infinite distance object at a wide angle end state.

31. A variable magnification optical system according to claim 27, wherein
the first lens group further comprises a focusing lens group that is movable for focusing and at least one lens arranged at an image side of the focusing lens group.

32. A variable magnification optical system according to claim 27, wherein
the following conditional expression is satisfied:

$$0.60<|(1-\beta wvr)\cdot \beta wr|<1.70$$

where βwvr denotes a lateral magnification of the vibration reduction lens group at the wide angle end state, and βwr denotes a composite lateral magnification of all lenses located at the image side of the vibration reduction lens group in the wide angle end state.

33. A variable magnification optical system according to claim 27, wherein
the first lens group comprises, in order from the object side, a positive lens group having positive refractive power and a focusing lens group which is moved along the optical axis for focusing.

34. A variable magnification optical system according to claim 27, wherein
the first lens group comprises, in order from the object side, a positive lens group having positive refractive power and a focusing lens group which is moved along the optical axis for focusing, and
the following conditional expression is satisfied:

$$1.00<(-f1)/f11<30.00$$

where f1 denotes the focal length of the first lens group, and f11 denotes a focal length of the positive lens group.

35. A variable magnification optical system according to claim 27, wherein
the variable magnification optical system is provided with a first focusing group and a second focusing group, and that an interval between the first focusing group and the second focusing group is variable for focusing.

36. A variable magnification optical system according to claim 27, wherein
the first lens group comprises a first focusing group and a second focusing group, and
an interval between the first focusing group and the second focusing group is variable for focusing.

37. A variable magnification optical system according to claim 27, wherein
the variable magnification optical system comprises a first focusing group having negative refractive power and a second focusing group having positive refractive power;
an interval between the first focusing group and the second focusing group is variable for focusing; and
the following conditional expression is satisfied:

$$0.50<(-fN)/fP<1.80$$

where fN denotes a focal length of the first focusing group, and fP denotes a focal length of the second focusing group.

38. A variable magnification optical system according to claim 27, wherein
the variable magnification optical system comprises the first lens group, a second lens group having positive refractive power and a third lens group having negative refractive power; and
the following conditional expression is satisfied:

$$0.40<f2/(-f3)<1.20$$

where f2 denotes a focal length of the second lens group, and f3 denotes a focal length of the third lens group.

39. An optical apparatus comprising the variable magnification optical system according to claim 27.

40. A variable magnification optical system according to claim 27, wherein a shooting magnification in any focal length state is equal to or exceeds −0.5.

41. A variable magnification optical system according to claim 26, wherein
the variable magnification optical system is provided with a first focusing group and a second focusing group, and that an interval between the first focusing group and the second focusing group is variable for focusing.

42. A variable magnification optical system according to claim 26, wherein
the first lens group comprises a first focusing group and a second focusing group, and
an interval between the first focusing group and the second focusing group is variable for focusing.

43. A variable magnification optical system according to claim 26, wherein
the variable magnification optical system comprises a first focusing group having negative refractive power and a second focusing group having positive refractive power;
an interval between the first focusing group and the second focusing group is variable for focusing; and
the following conditional expression is satisfied:

$$0.50 < (-fN)/fP < 1.80$$

where fN denotes a focal length of the first focusing group, and fP denotes a focal length of the second focusing group.

44. A variable magnification optical system according to claim 26, wherein
the variable magnification optical system comprises the first lens group, a second lens group having positive refractive power and a third lens group having negative refractive power; and
the following conditional expression is satisfied:

$$0.40 < f2/(-f3) < 1.20$$

where f2 denotes a focal length of the second lens group, and f3 denotes a focal length of the third lens group.

45. An optical apparatus comprising the variable magnification optical system according to claim 26.

46. A variable magnification optical system according to claim 26, wherein a shooting magnification in any focal length state is equal to or exceeds −0.5.

47. A variable magnification optical system according to claim 26, wherein
upon varying magnification, a position of the first lens group relative to an imaging plane is fixed.

48. A variable magnification optical system according to claim 26, wherein
a most image side lens group has negative refractive power.

49. A variable magnification optical system according to claim 26, wherein
a most image side lens group has negative refractive power, and
the following conditional expression is satisfied:

$$0.20 < (-fR)/fW < 1.60$$

where fR denotes a focal length of the most image side lens group, and fW denotes a focal length of the variable magnification optical system upon focusing on an infinite distance object at a wide angle end state.

50. A variable magnification optical system according to claim 26, wherein
the first lens group further comprises a focusing lens group that is movable for focusing and at least one lens arranged at an image side of the focusing lens group.

51. A variable magnification optical system according to claim 26, wherein
the following conditional expression is satisfied:

$$0.60 < |(1-\beta wvr)\cdot \beta wr| < 1.70$$

where ßwvr denotes a lateral magnification of the vibration reduction lens group at the wide angle end state, and ßwr denotes a composite lateral magnification of all lenses located at the image side of the vibration reduction lens group in the wide angle end state.

52. A variable magnification optical system according to claim 26, wherein
the first lens group comprises, in order from the object side, a positive lens group having positive refractive power and a focusing lens group which is moved along the optical axis for focusing.

53. A variable magnification optical system according to claim 26, wherein
the first lens group comprises, in order from the object side, a positive lens group having positive refractive power and a focusing lens group which is moved along the optical axis for focusing, and
the following conditional expression is satisfied:

$$1.00 < (-f1)/f11 < 30.00$$

where f1 denotes the focal length of the first lens group, and f11 denotes a focal length of the positive lens group.

54. A method for manufacturing a variable magnification optical system comprising, in order from an object side, a first lens group having negative refractive power, a second lens group having positive refractive power and at least one lens group,
the method comprising the steps of:
constructing the first lens group to comprise, in order from the object side, a positive lens group having positive refractive power and a focusing lens group which is moved along the optical axis for focusing;
constructing such that, upon varying magnification, an interval between the first lens group and the second lens group is varied and an interval between the second lens group and a lens group at the image side of the second lens group and adjacent thereto is varied;
constructing such that a shooting magnification in any focal length state is equal to or exceeds −0.5; and
constructing such that the following conditional expression is satisfied:

$$2.00 < (-f1)/f2 < 45.00$$

where f1 denotes a focal length of the first lens group, and f2 denotes a focal length of second lens group.

55. A method for manufacturing a variable magnification optical system comprising, in order from an object side, a first lens group having negative refractive power, a second lens group having positive refractive power and a third lens group having negative refractive power,
the method comprising the steps of:
constructing such that the first lens group comprises, in order from the object side, a positive lens group having positive refractive power and a focusing lens group which is moved along the optical axis for focusing;
constructing such that, upon varying magnification, an interval between the first lens group and the second lens group is varied, and an interval between the second lens group and the third lens group is varied; and
constructing such that a shooting magnification in any focal length state is equal to or exceeds −0.5.

56. A method according to claim 55, further comprising the step of constructing such that, upon varying magnification, a position of the first lens group relative to an imaging plane is fixed.

57. A method according to claim 55, further comprising the step of constructing such that, the first lens group further comprises at least one lens arranged at an image side of the focusing lens group.

58. A method according to claim 55, further comprising the step of constructing such that a most image side lens group has negative refractive power.

59. A method for manufacturing a variable magnification optical system comprising, in order from an object side, a first lens group having negative refractive power and at least one lens group, the method comprising the steps of:

constructing such that the first lens group comprises a vibration reduction lens group that is movable to include a component in a direction perpendicular to the optical axis;

constructing such that, upon varying magnification, an interval between the first lens group and a lens group at an image side of the first lens group and adjacent thereto is varied;

constructing such that a shooting magnification in any focal length state is equal to or exceeds −0.5; and constructing such that the following conditional expression is satisfied:

$$2.00 < |f1/fVR| < 50.00$$

where f1 denotes the focal length of the first lens group, and fVR denotes a focal length of the vibration reduction lens group.

60. A variable magnification optical system comprising, in order from an object side, a first lens group having negative refractive power, a second lens group having positive refractive power and a third lens group having negative refractive power;

upon varying magnification, an interval between the first lens group and the second lens group being varied, and an interval between the second lens group and the third lens group being varied; and the first lens group comprising, in order from the object side, a positive lens group having positive refractive power, a focusing lens group which is moved along the optical axis for focusing, and at least one lens which is arranged at an image side of the focusing lens group.

61. A variable magnification optical system comprising, in order from an object side, a first lens group having negative refractive power, a second lens group having positive refractive power and a third lens group having negative refractive power;

upon varying magnification, an interval between the first lens group and the second lens group being varied, and an interval between the second lens group and the third lens group being varied;

the first lens group comprising, in order from the object side, a positive lens group having positive refractive power and a focusing lens group which is moved along the optical axis for focusing; and a most image side lens group having negative refractive power.

* * * * *